(12) United States Patent
Maya et al.

(10) Patent No.: US 12,273,933 B2
(45) Date of Patent: Apr. 8, 2025

(54) METHOD AND SYSTEM FOR RESOURCE ALLOCATION AND TIMING ALIGNMENT IN INTEGRATED ACCESS AND BACKHAUL (IAB) NETWORK

(71) Applicants: Centre of Excellence in Wireless Technology, Chennai (IN); Indian Institute of Technology Madras (IIT Madras), Chennai (IN)

(72) Inventors: Deepak Padmanabhan Maya, Chennai (IN); Chandrasekaran Mohandoss, Chennai (IN); Thirunageswaram Ramachandran Ramya, Chennai (IN); Jeniston Deviraj Klutto Milleth, Chennai (IN); Bhaskar Ramamurthi, Chennai (IN)

(73) Assignees: CENTRE OF EXCELLENCE IN WIRELESS TECHNOLOGY, Chennai (IN); INDIAN INSTITUTE OF TECHNOLOGY, MADRAS (IITM), Chennai (IN)

( * ) Notice: Subject to any disclaimer, the term of this patent is extended or adjusted under 35 U.S.C. 154(b) by 257 days.

(21) Appl. No.: 17/420,632

(22) PCT Filed: Mar. 27, 2020

(86) PCT No.: PCT/IN2020/050292
§ 371 (c)(1),
(2) Date: Jan. 21, 2022

(87) PCT Pub. No.: WO2020/202190
PCT Pub. Date: Oct. 8, 2020

(65) Prior Publication Data
US 2023/0345553 A1    Oct. 26, 2023

(30) Foreign Application Priority Data

Mar. 29, 2019  (IN) .............................. 201941012661
Aug. 16, 2019  (IN) .............................. 201941033193

(51) Int. Cl.
H04W 72/04     (2023.01)
H04W 72/27     (2023.01)
(Continued)

(52) U.S. Cl.
CPC ........... *H04W 76/10* (2018.02); *H04W 72/04* (2013.01); *H04W 72/27* (2023.01); *H04W 72/51* (2023.01)

(58) Field of Classification Search
CPC ..... H04B 7/15; H04B 7/15542; H04W 16/26; H04W 28/16; H04W 56/0015;
(Continued)

(56) References Cited

U.S. PATENT DOCUMENTS 10,979,132 B2 *   4/2021   Nam ....................... H04L 5/14
11,589,214 B2 *   2/2023   Abedini ................ H04W 92/20
(Continued)

OTHER PUBLICATIONS

LG Electronics, Discussions on resource multiplexing among backhaul and access links, 3GPP TSG RAN WG1 #96, R1-1902080, 6 pages, Feb. 25 to Mar. 1, 2019.*

*Primary Examiner* — Frank Duong

(57) ABSTRACT

A method includes receiving at least one parameter associated with the each of at least one IAB node (100), determining a resource configuration comprising of resources to be allocated to the DU of each of the at least one IAB node (100) based on at least one resource allocation criteria and the at least one parameter, indicating the resource configuration for the DU of each of the at least one IAB node (100). The method includes signaling a timing advance (TA) value to at least one IAB node (100) based on a plurality of
(Continued)

parameters, evaluating at least one of a UL-Tx timing and a DL-Tx timing based on the TA value signaled, configuring a cell-specific signal and channel (CSSC) to the DU of the reference node based on the at least one parameter, and timing alignment in a IAB network (1000).

75 Claims, 31 Drawing Sheets

(51) Int. Cl.
*H04W 72/51* (2023.01)
*H04W 76/10* (2018.01)

(58) Field of Classification Search
CPC . H04W 56/0045; H04W 72/04; H04W 72/27; H04W 72/51; H04W 76/10; H04W 88/085
See application file for complete search history.

(56) References Cited

U.S. PATENT DOCUMENTS

| | | | |
|---|---|---|---|
| 11,653,367 B2* | 5/2023 | Cudak | H04B 7/15542 455/449 |
| 11,659,482 B2* | 5/2023 | Dey | H04L 5/0062 370/329 |
| 11,711,141 B2* | 7/2023 | Shimezawa | H04L 5/26 370/329 |
| 2020/0145997 A1* | 5/2020 | Luo | H04W 16/02 |
| 2021/0092674 A1* | 3/2021 | Hampel | H04W 48/16 |
| 2021/0345321 A1* | 11/2021 | Wu | H04W 16/10 |
| 2021/0359827 A1* | 11/2021 | Huang | H04L 5/0094 |

* cited by examiner a) Configuring s along with H when DU of IAB node 100 with higher numerology b) Configuring NA along with H/S when DU of IAB node 100 with higher numerology a) Simultaneous Tx capability and DU with higher numerology than MT b) Simultaneous Rx capability and DU with higher numerology than MT c) Simultaneous Tx capability and MT with higher numerology than DU d) Simultaneous Rx capability and MT with higher numerology than DU

METHOD AND SYSTEM FOR RESOURCE ALLOCATION AND TIMING ALIGNMENT IN INTEGRATED ACCESS AND BACKHAUL (IAB) NETWORK

FIELD OF INVENTION

The present disclosure relates to a wireless communication system, and more specifically related to a method and system for resource allocation and timing alignment in integrated access and backhaul (IAB) network. The present application is based on, and claims priority from Indian Provisional Application Numbers 201941012661 filed on 29 Mar. 2019, 201941033193 filed on 16 Aug. 2019 and PCT/IN2020/050292 filed on 27 Mar. 2020 the disclosure of which is hereby incorporated by reference herein.

BACKGROUND OF INVENTION

The fascination of the modern society towards high data rate applications in the high mobility scenario is continuously pushing the borders of wireless communication systems. The fifth generation (5G) and beyond communication is expected to address these data rate demands by improving the spectral efficiency of existing spectrum, and by exploring new spectrum in millimeter wave (mmWave) frequency bands. Densification of an IAB network has a major role in improving the spectral efficiency by increasing the spatial reuse of spectrum using frequency reuse one. mmWave communication is a significant development in frequencies much higher than 6 GHz where a large amount of spectrum is available.

Multiple antenna techniques and frequency reuse along with transmitter and receiver algorithms are the major developments in improving the efficiency of spectrum, whereas millimetre wave (mmWave) communication is a significant development in exploring new spectrum. In mmWave communication higher frequencies above 6 GHz are used. Since large amount of bandwidth is available in the mmWave range, it can be utilized in supporting very high data rate to the users.

Further, mmWaves are characterized by high directivity and it accounts for improving the spatial reuse with significantly reduced co-channel interference (CCI). Moreover, the mmWaves are subject to high attenuation, and this along with its directivity results in smaller and sparse cell coverage, at least in urban and semi-urban scenarios. This necessitates network densification to cover the entire coverage area using many transmission points. However, backhauling these densified networks is a major challenge. Deployment and maintenance of optical fibre to many small cells may not be an economically viable option, and self-backhauling is a possible alternative. Self-backhauling is defined as when the access and the backhaul share the same wireless channel. Here, access denotes the link from base station (BS) also known as (a.k.a) gNB in 5G and eNB in 4G or a relay to the user equipment (UE), whereas, backhaul accounts for the link between BS to another BS or BS to core network or BS to relay. The sharing of this wireless channel resource for access and backhaul can be done using at least one of time, frequency, code and space, and this type of network is called as integrated access and backhaul (IAB) network (1000).

The IAB network (1000) can be used for extending the coverage of an existing cell, known as coverage extension, or for improving the capacity by reusing the same frequency by overlaying small cells over the regular macro cell coverage area. This is a.k.a heterogeneous network. The coverage extension IAB node (100) is placed in a region where the coverage of original gNB is weaker for UE's to detect the data or there is no coverage due to blockages, for e.g., inside a building. An IAB node (100), generally expected to be line of sight (LoS) with the gNB can communicate efficiently in those scenarios. Now, the UE's can get associated with the IAB node (100) and get services, thereby extending the coverage area. On the other hand, in capacity enhancement scenario, when a gNB is heavily loaded, an IAB node (100) can act as an alternate gNB and provide service to a set of UEs associated with it, thereby improving the capacity and/or can act as an alternate IAB for balancing the load. FIG. 1 illustrates the basic IAB deployment and its use cases.

FIG. 2 illustrates the basic block diagram of a multi-hop IAB network (1000). The node which has wired connection to the core network is called donor node (100d), and the other nodes are called IAB nodes (100). The IAB nodes (100) are connected to the donor node (100d) wirelessly. Similarly, an IAB node (100) can further connected to other child nodes (100c), leading to a multi hop scenario. The donor node (100d) and IAB nodes (100) can have UEs attached to them. Hence, an IAB node (100) has dual functionality: the unit that act like BS to the UEs and IAB nodes (100) connected to it, called as distributed unit (DU), and the unit that act like a mobile terminal (MT) for a parent node (100b) to which it is connected. In FIG. 2, if IAB node 2 is considered as reference node (100a), then IAB node 1 is the parent node (100b) and IAB node 3 is the child node (100c). Again, an access UE is connected to IAB node 2. Therefore, there are three links associated with an IAB node (100): backhaul link for communicating with the parent node (100b), child link for communicating to the child nodes (100c), and access link for serving the UEs.

Unlike the previous generations the 5G radio access technology (RAT) support a wide range of carrier frequencies, deployment scenarios and use cases. At one end of the scale use cases like Enhanced mobile broadband (eMBB) require very high data rates and large bandwidths, whereas Ultra-reliable low-latency communications (URLLC) require very low latency, very high reliability and availability. Again, the frequency ranges currently under consideration for 5G are frequency range1 (FR1) from 0.410 GHz to 7.125 GHz, and frequency range2 (FR2) from 24.25 GHz to 52.6 GHz, which vary widely in the transmission and propagation characteristics. Therefore, the NR deployment scenario vary from large cells with FR1 to small cells with FR2. Increasing the flexibility at various layers is a key factor in serving this diverse use cases and deployment scenarios. Employing multiple numerologies and bringing adaptivity for the transmitted waveform according to the use case is the most outstanding feature of 5G NR. Here, numerology refers to the subcarrier spacing, and symbol length used by the gNB/UE to transmit its signal. For example, lower subcarrier spacing is beneficial for larger cells using FR1 bands. Moreover, higher subcarrier spacing reduces symbol duration, which benefits low latency applications like URLLC. In NR, the numerology is usually denoted by the factor $\mu$, which takes values from 0 to 4. The subcarrier spacing corresponding to the numerology is obtained as $2^\mu \times 15$ KHz. Thus, an NR device can support subcarrier spacing ranging from 15 KHz to 240 KHz. Since the number of symbols per slot is fixed at 14, the slot length will also decrease and the number of slots per frame increase as the $\mu$ value increases.

The available time-frequency resources in the IAB network (1000) need to be efficiently shared among access and backhaul links at least one of semi-statically and dynamically. Proper resource allocation strategies between the MT and DU portion of the IAB node (100) is necessary to avoid interference between transmissions. The resources can be multiplexed between parent and child links in at least one of time, frequency, space and code and are called time division multiplexing (TDM), frequency division multiplexing (FDM), space division multiplexing (SDM) and code division multiplexing (CDM), respectively, or a combination of the above. For illustration, TDM case is considered in which either parent or child link is active at a time. The MT of an IAB node (100) can be configured with downlink (DL), uplink (UL), and flexible (F) resources. The flexible resources are configured with a combination of DL and UL resources, based on the available traffic in DL and UL directions. It is also used to handle the necessary guard period in half-duplex schemes. However, the DU of an IAB node (100) has UL, DL, F and not available (NA) type of resources. The NA time resource implies that it should not be used for communication on the DU child links. Further, each of the UL, DL and F time resources of the DU can be configured as hard (H) and soft (S) resources. The resource configured as hard is always made available for the child node (100c)'s DU link, while the resource configured as soft is made available to the child node (100c)'s DU link controlled by the parent link. If the parent node (100b) is not using the resource, it is indicated implicitly or explicitly to its child node (100c), enabling the child node (100c) to use the resource. Hence, the soft resource ensures efficient use of the spectrum.

The resource allocation for MT and DU portion of an IAB nodes (100) is done using semi-static signaling and/or through dynamic signaling. In semi-static case, the central unit (CU) of the donor node (100d) assign resources to all the DU's through F1-AP (F1 Application Protocol) signaling and parent node (100b)'s DU allocate resources to child node (100c)'s MT through RRC (Radio Resource Control) signaling. Here, F1-AP interface provide means for interconnecting a CU and a DU of a gNB or an IAB node (100), whereas RRC is the control mechanism between parent node (100b)'s DU and child node (100c)'s MT. The dynamic resource allocation is performed by corresponding parent node (100b) and has two functionalities: allocating UL or DL for the F slots, and the indication of availability of the soft resource. A soft resource is indicated as available (IA) and indicated as not available (INA) for IAB child link when its parent link is not using the resource and using the resource, respectively. The availability of soft resource can be indicated to the child node (100c) in an implicit or explicit manner. In the implicit method, the child node (100c) derives the IA using the following information like,
  i. The lack of UL scheduling grant at the MT.
  ii. No data available for MT transmission/reception.
  iii. No configured MT search space.
  iv. No configured reference signal (RS) measurement occasions (e.g. synchronization signal (SS)/channel state information (CSI)).

However, in the explicit method, parent node (100b) provides exclusive indication about the availability of the resource to the child node (100c)'s DU through child node (100c)'s MT.

Further, in TDM, either backhaul or access link will be active at a time, whereas in FDM/SDM, an IAB node (100) has different frequencies/beams for transmission (Tx)/reception (Rx) in MT and DU. Thus, in FDM/SDM the parent and child links can co-exist simultaneously.

The duplexing capability of an IAB node (100) play a vital role in determining the direction of Tx/Rx. An IAB node (100) with full duplexing (FD) capability can simultaneously Tx and Rx in backhaul and child/access links in the same time and frequency resources, thereby reducing the delay in multi-hop scenario. An IAB node (100) with FD capability is capable of at least one of the following:
  i. Simultaneous Tx at DU and Rx at MT of the said IAB node (100).
  ii. Simultaneous Rx at DU and Tx at MT of the said IAB node (100).
  iii. Simultaneous Tx and Rx at DU of the said IAB node (100).
  iv. Simultaneous Tx and Rx at MT of the said IAB node (100).

The nodes with half duplexing (HD) constraint, on the other hand, cannot perform simultaneous Tx and Rx in backhaul and child/access links. A node with HD constraint can either transmit in one or both links or receive in one or both links. This leads to two conditions:
  i. HD constraint with simultaneous Tx from DU and MT of the IAB node (100).
  ii. HD constraint with simultaneous Rx at DU and MT of the IAB node (100).

As far as timing of the Tx/Rx at an IAB node (100) is concerned, three constraints are defined, out of which only two can be satisfied at a time, at least in case of IAB nodes (100) with HD constraint.
  i. Constraint 1: The DL Tx start time of all the IAB nodes (100) should be aligned.
  ii. Constraint 2: The timing of access DL Tx and backhaul UL Tx should be aligned at an IAB node (100).
  iii. Constraint 3: The timing of access UL Rx and backhaul DL Rx should be aligned at an IAB node (100).

The first constraint is mandatory for maintaining proper synchronization and to avoid cross link interference (CLI) in an IAB network (1000), whereas second and third constraints ensure simultaneous transmission and reception, respectively, in an IAB node (100). In TDM mode of operation, constraint 1 is satisfied along with perfect alignment of DL Tx and UL Rx timings at an IAB node (100). In FDM/SDM mode, an IAB node (100) can either satisfy constraint 2 (i.e., simultaneous Tx) or constraint 3 (i.e., simultaneous Rx) along with constraint 1. The combination of constraint 1 and constraint 2 is denoted as HD constraint with simultaneous Tx from DU and MT of the IAB node (100), while the combination of constraint 1 and constraint 3 is denoted as HD constraint with simultaneous Rx at DU and MT of the IAB node (100). In an IAB network (1000), each IAB node (100) can have different duplexing capabilities such as TDM, FDM/SDM with HD constraint with simultaneous Tx/HD constraint with simultaneous Rx and FD. It is expected that the central unit (CU) of donor node (100d) manages the IAB topology and interworking of IAB nodes (100) with different capabilities.

For the sake of brevity, the term "STxDM" will be used to denote HD constraint with simultaneous Tx from DU and MT of the IAB node (100) and the term "SRxDM" will be used to denote HD constraint with simultaneous Rx at DU and MT of the IAB node (100), throughout the disclosure. The term "capability" refers to any one of TDM, STxDM, SRxDM and FD, throughout the disclosure.

FIG. 3 illustrates the timing diagram in TDM, STxDM and SRxDM scenarios. FIG. 3a illustrates a single hop IAB scenario with both parent node (100b) and IAB node (100) with TDM capability alone. In this case, the IAB node (100) must advance its UL Tx, such that DL Tx and UL Rx at the parent node (100b) will be time aligned. The parent node (100b) will signal the factor by which the IAB node (100) need to advance its UL Tx timing from the DL Rx timing and is known as the timing advance (TA). For a parent node (100b) with TDM capability, the TA will be equal to twice the propagation delay (T1). Further, the DL Tx time among the nodes should be time aligned in order to maintain synchronization across the network (1000) (constraint 1). The IAB node (100) must evaluate the DL Tx time from the TA value signaled by the parent node (100b). In case of parent node (100b) and IAB node (100) with TDM capability, the DL Tx time is given by TDL=TA/2, as illustrated in FIG. 3a. The timing of various Tx/Rx in an IAB node (100) when both IAB node (100) and its parent node (100b) with STxDM is presented in FIG. 3b. Here, the UL and DL transmissions are time aligned at an IAB node (100). Therefore, the DL Tx time is equal to the TA value and is given by the propagation delay between the nodes. Since the Tx from the IAB nodes (100) are tied, the UL Rx from the IAB node (100) occur after a delay of T1 from the DL Tx at the parent node (100b). Timing of various transmissions or receptions at an IAB node (100) with SRxDM is presented in FIG. 3c. In case of an IAB node (100) with SRxDM, UL Rx should be aligned with the DL Rx at the parent node (100b). Thus, the TA value signaled to the IAB node (100) depends on the DL reception time at the parent node (100b) (T0), and it can be calculated as TA=2T1−T0. Thus, the IAB node (100) must advance its UL Tx by factor TA=2T1−T0 from the DL Rx time.

From resource allocation point of view, the MT and DU of an IAB node (100) have downlink (DL), uplink (UL) and flexible (F) resources. In 5G, the central unit (CU) of the donor node (100d) allocate resources for DU of an IAB node (100) semi-statically through F1-AP signaling, whereas the semi-static resource allocation for MT is done by corresponding parent node (100b) through radio resource control (RRC) signaling. F1-AP is a network interface which defines inter-connection of a gNB-CU and a gNB-DU. The DU of an IAB node (100) has hard (H) and soft (S) flavors on each of its DL, UL and F resources. The hard resource is always available for DU of an IAB node (100), whereas the soft resource is conditionally available for an IAB node (100) under the control of parent node (100b). The IAB node (100) can use the soft resource only when it is indicated as available (IA) by the parent node (100b). The signaling of IA is explicitly done by the parent node (100b), or derived implicitly by the IAB node (100) under following conditions,
  i. The lack of uplink scheduling grant at the MT.
  ii. No data available for MT transmission.
  iii. No configured MT search space.
  iv. No configured reference signal (RS) measurement occasions.

In addition, not available (NA) resource is defined for DU of an IAB node (100), which implies that the resource cannot be used for Tx/Rx in child/access link. Throughout this disclosure, the term "configuration" refers to at least one of DL, UL, F, H, S and NA.

In practice, IAB nodes (100) with various capabilities will co-exist in a network (1000), for example, IAB nodes (100) with FD, STxDM, SRxDM and TDM capabilities. Also, there can be difference between the numerology used in parent node (100b) and child node (100c). Number of conflicts arises when IAB nodes (100) with various capabilities and numerologies co-exist in a network (1000), and the resource allocation must consider various factors to avoid these conflicts. Various conflicting scenarios in the IAB network (1000), and the measures to overcome the same are discussed in this invention.

OBJECT OF INVENTION

The principal object of the embodiments herein is to provide a method and system for resource allocation in an IAB network.

Another object of the embodiments herein is to establish a connection with a distributed unit (DU) of at least one IAB node in the IAB network wherein the at least one IAB node comprises at least one of a reference node, at least one parent node, and at least one child node, and receive at least one parameter associated with each of the at least one IAB node.

Another object of the embodiments herein is to determine a resource configuration comprising of resources to be allocated to the DU of each of the at least one IAB node based on at least one of a resource allocation criteria and the at least one parameter, wherein the resources comprising of at least one of a downlink (DL) resource, an uplink (UL) resource and a flexible (F) resource.

Another object of the embodiments herein is to indicate the resource configuration for the DU of each of the at least one IAB node.

Another object of the embodiments herein is to evaluate time instants at which one of a FD mode, a simultaneous transmission from the DU and a mobile terminal (MT) (STxDM) mode, a simultaneous Rx at the DU and a MT (SRxDM) mode, and a time division multiplexing (TDM) mode is active in each of the IAB nodes based on the at least one parameter and a resource configuration of each of the IAB nodes.

Another object of the embodiments herein is to determine a reference node from the plurality of IAB nodes that has at least one of the TDM mode, the STxDM mode for which a half duplexing (HD) constraint is not met and the SRxDM mode for which the HD constraint is not met, based on the at least one parameter and the resource configuration.

Another object of the embodiments herein is to indicate one of a hard (H) resource, a soft (S) resource and a not available (NA) resource for the DU of the reference node.

Another object of embodiment herein is to signal an indication of availability by the parent node to the child node, when the parent node is not communicating with the MT of the child node.

Another object of the embodiments herein is to signaling at least one of a resource allocation information of the at least one child node and a capability information of the at least one child node to the at least one parent node of the at least one child node.

Another object of the embodiments herein is to determine whether at least one of the resource allocation information of the at least one child node and the capability information of the at least one child node is received from at least one of the CU of the donor node and the at least one child node.

Another object of the embodiments herein is to configure a cell-specific signal and channel (CSSC) to the DU of the reference node based on the at least one parameter, or configuring, by the DU of the reference node, a CSSC for itself based on the at least one parameter.

Another object of the embodiments herein is to determine one of transmission and reception of the CSSC is configured in any one of H resource and S resource with available (IA) and not available (NA) resource/S resource without IA of the DU of the reference node.

Another object of the embodiments herein is to configure the CSSC to the DU of the reference node with one of a STxDM capability or a SRxDM capability based on the at least one parameter, or configuring, by the DU of the reference node with one of a STxDM capability or a SRxDM, a CSSC for itself based on the at least one parameter.

Another object of the embodiments herein is to determine whether the MT of the reference node is configured with the CSSC.

Another object of the embodiments herein is to receive the resources allocated from the CU of the donor node, wherein the resources is the F resource, detect occurrence of one a DL condition and a UL condition, and configure the F resource as DL when the DL condition is satisfied based on capability of the reference node or F resource as UL when the UL condition is satisfied based on capability of the reference node.

Another object of the embodiments herein is to receive the resource allocated by the CU of the donor node, and configure an F resource at a MT of the at least child node based on the allocated resource.

Another object of the embodiments herein is to detect occurrence of one a DL condition and a UL condition, and configure the F resource as DL when the DL condition is occurred based on capability of the at least one child node or the F resource as UL when the UL condition is occurred based on capability of the at least one child node.

Another object of the embodiments herein is to signal a timing advance (TA) value to at least one child node of the at least reference node based on a plurality of parameters associated with the at least child node.

Another object of the embodiments herein is to evaluate at least one of a UL-Tx timing and a DL-Tx timing based on the TA value signaled by the at least one reference node.

Another object of the embodiments herein is to configure resources for a DU of a reference node, or configuring, by a DU of at least one parent node, resources for a MT of a reference node.

Another object of the embodiments herein is to detect a transition between the MT to the DU or the DU to the MT across time slots at the reference node.

Another object of the embodiments herein is to configure a guard period for transmission or reception at the MT of the reference node at start or end of the time slots.

BRIEF SUMMARY OF THE INVENTION

Accordingly, the embodiments herein provide a method for resource allocation in an Integrated Access Backhaul (IAB) network. The method includes establishing, by a central unit (CU) of a donor node, a connection with a distributed unit (DU) of at least one IAB node in the IAB network, wherein the at least one IAB node comprises at least one of a reference node, at least one parent node, and at least one child node. Further, the method includes receiving, by the CU of the donor node from at least one IAB node, at least one parameter associated with each of the at least one IAB node. Further, the method includes determining, by the CU of the donor node, a resource configuration comprising of resources to be allocated to the DU of each of the at least one IAB node based on at least one of a resource allocation criteria and the at least one parameter, wherein the resources comprising of at least one of a downlink (DL) resource, an uplink (UL) resource and a flexible (F) resource. Further, the method includes indicating, by the CU of the donor node, the resource configuration for the DU of each of the at least one IAB node.

Accordingly, the embodiments herein provide a method for timing alignment in a Integrated Access Backhaul (IAB) network. A plurality of IAB nodes, in the IAB network, with same capability and different capability is considered. The method includes signaling, by a DU of at least one reference node, a timing advance (TA) value to at least one child node of the at least reference node based on a plurality of parameters associated with the at least child node. Further, the method includes evaluating, by the at least one child node, at least one of a UL-Tx timing and a DL-Tx timing based on the TA value signaled by the at least one reference node. Further, the method includes detecting, by the at least one parent nodes, the reference node is connected with the at least one parent node with varying capability. Further, the method includes scheduling, by the at least one parent node, UL grant to the reference node in non-overlapping time slots. Further, the method includes transmitting, by the reference node, UL transmission to the at least one parent node in the non-overlapping time slots.

Accordingly, the embodiments herein provide a method for timing alignment in an Integrated Access Backhaul (IAB) network. The method includes configuring, by a CU of a donor node, resources for a DU of a reference node, or configuring, by a DU of at least one parent node, resources for a MT of a reference node. Further, the method includes detecting, by the at least one parent node, a transition between the MT to the DU or the DU to the MT across time slots at the reference node. Further, the method includes configuring, by the at least one parent node, a guard period for transmission or reception at the MT of the reference node at start or end of the time slots.

Accordingly, the embodiments herein provide an Integrated Access Backhaul (IAB) node. The IAB node includes a memory, a communicator, a processor, a resource allocation engine, and a timing alignment engine. The resource allocation engine is configured to establish a connection with a distributed unit (DU) of at least one IAB node in the IAB network where the at least one IAB node comprises a reference node, at least one parent node and at least one child node. Further, the resource allocation engine is configured to receive at least one parameter associated with each of the IAB nodes from each of the at least one IAB node. Further, the resource allocation engine is configured to determine a resource configuration comprising of resources to be allocated to the DU of each of the at least one IAB node based on at least one of a resource allocation criteria and the at least one parameter, wherein the resources comprise at least one of a downlink (DL) resource, a uplink (UL) resource and a flexible (F) resource. Further, the resource allocation engine is configured to indicate the resources for the DU of each of the at least one IAB node.

The timing alignment engine is configured to signal a timing advance (TA) value to at least one child node of the at least reference node based on a plurality of parameters associated with the at least child node. Further, the timing alignment engine is configured to evaluate at least one of a UL-Tx timing and a DL-Tx timing based on the TA value signaled by the at least one reference node. Further, the timing alignment engine is configured resources for a DU of a reference node, or configuring, by a DU of at least one parent node, resources for a MT of a reference node. Further, the timing alignment engine is configured to detect a transition between the MT to the DU or the DU to the MT across time slots at the reference node. Further, the timing alignment engine is configured a guard period for transmission or reception at the MT of the reference node at start or end of the time slots.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
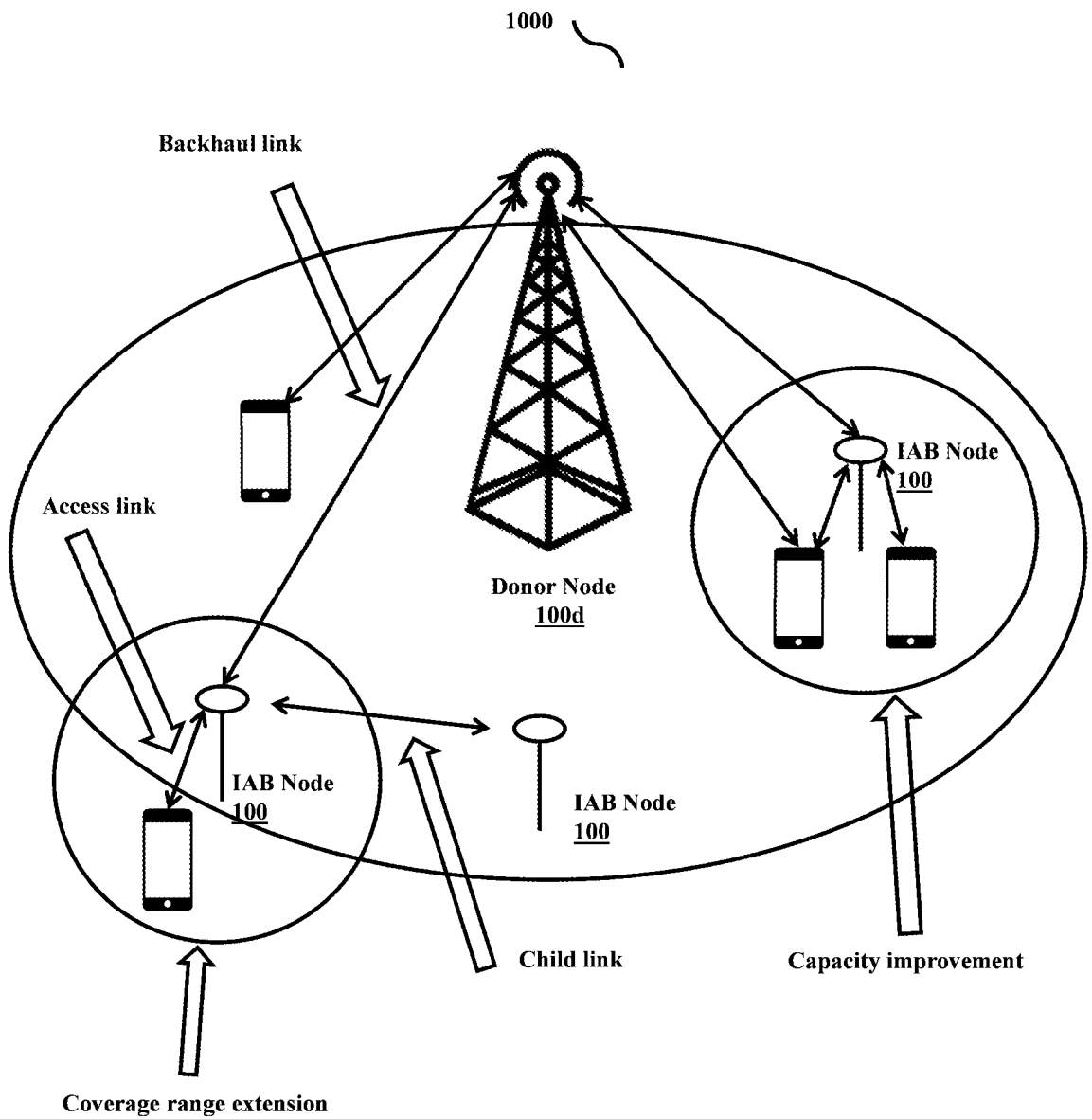
FIG. 1 illustrates a basic Integrated Access Backhaul (IAB) deployment and its use cases, according to a prior art.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The resource allocation in IAB node (100) is a challenging task depending on various scenarios subject to various constraints. In general, an IAB node (100) has varying capabilities such as full duplexing (FD), simultaneous Tx from MT and DU (STxDM), simultaneous Rx at MT and DU (SRxDM) and time division multiplexing (TDM). An IAB node with STxDM, SRxDm and TDM capability is subject to half duplexing constraint, i.e., an IAB node (100) cannot transmit and receive simultaneously in parent and child links. e.g., if MT of an IAB node (100) is configured for DL reception from the parent node (100b), then the corresponding DU should be in UL reception mode from its child node (100c), and vice versa. Again, the resource need to be shared dynamically between the parent and the child links is based on TDM, FDM, CDM, SDM or a combination of the above. In TDM case, the parent and child link cannot be active simultaneously. An IAB network (1000) irrespective of whether deployed for coverage extension or capacity enhancement or both, can be based on complex topologies such as multi-hop, mesh, multi-parent etc. Resource allocation in such scenarios without considering the device capability like half duplex and TDM constraint leads to interference between links. The conflicts within or between IAB nodes (100) are basically classified into two types:
  i. Intra IAB conflicts: Between MT and DU of same IAB node (100).
  ii. Inter IAB conflicts: Between different IAB nodes (100) in multi-hop deployment.
    a. Between DU's of different IAB nodes (100).
    b. Between MT and DU of different IAB nodes (100).

If resource allocation is not done carefully, it may also lead to resource wastage and increase latency. Therefore, certain set of rules need to be defined in assigning resources semi-statically and/or dynamically to MT and DU of an IAB node (100). This is the major motivation for this invention.

Transmission of cell specific signal and channel (CSSC): DL synchronization and UL random access procedures are mandatory in IAB network (1000) for initial access to attach a UE/child node (100c) to the parent node (100b). Inter IAB measurements, after connection establishment are also essential. Signals such as synchronization signal blocks (SSB) used for DL synchronization, random access signals used for UL synchronization, system information block (SIB) used to provide essential information about the gNB to the newly introduced node etc., are defined for these purposes. These are cell specific signal and channel that have high priority compared to the data signals or certain control signals. Therefore, in an IAB scenario, certain set of resources must be reserved for transmitting/receiving these CSSC. However, there can be conflicting scenarios, despite an IAB node (100) being allocated with hard resources. For e.g. consider a case when the child node (100c)'s DU is configured as a soft resource but needs to transmit/receive CSSC, and the parent link is also active. Such conflicts need to be handled. Similarly, conflict occurs when the child node (100c)'s DU have hard resource and MT has some CSSC for transmission/reception. In general, cell specific signal and channel (CSSC) are mandatory/high priority signal/channel.

In an embodiment, a resource allocation strategy for transmission/reception of cell specific signal and channel (CSSC) is presented, wherein it is mandatory for the CU associated with the donor node (100d) to configure slots as hard for every IAB node (100) periodically. Hard resource is either a DL resource or an UL resource. The configuration of making the hard resource to be DL or UL is based on the associated CSSC.

In an embodiment, a resource allocation strategy for transmission/reception of cell specific signal and channel (CSSC) is presented, wherein the CU associated with the donor node (100d) configures CSSC for every IAB node (100) on the corresponding hard resources. Hard resource is either a DL resource or an UL resource. The configuration of making the hard resource to be DL or UL is based on the associated CSSC.

In another embodiment, the resource allocation strategy when parent node (100b)'s DU is configured as hard and has some CSSC for transmission/reception is presented, wherein the child node (100c)'s DU is configured as NA. Hard resource is either a DL resource or an UL resource. The configuration of making the hard resource to be DL or UL is based on the associated CSSC.

In another embodiment, the resource allocation strategy to simultaneously transmit/receive cell specific signal and channel (CSSC) in alternate hops is presented, wherein the DUs of alternate hops are configured as hard and an intermediate DU is configured as NA. Hard resource is either a DL resource or an UL resource. The configuration of making the hard resource to be DL or UL is based on the associated CSSC.

In another embodiment, strategy to avoid inter IAB conflict when the parent node (100b)'s DU is configured as hard, and child node (100c)'s DU is configured as soft and needs to transmit/receive cell specific signal and channel (CSSC) is presented, wherein the parent node (100b)'s DU has no mandatory/high priority signal to be transmitted/received and scheduled child node (100c)'s MT to transmit/receive in the backhaul link, the child node (100c)'s MT is informed of the CSSC in child node (100c)'s DU and subsequently the child node (100c)'s MT indicates the parent node (100b)'s DU about no transmission/no reception in the backhaul link, and child node (100c)'s DU transmits/receives the CSSC in the soft resource. Soft resource is either a DL or an UL resource. The configuration of DL and UL is based on the associated CSSC.

In another embodiment, strategy to avoid inter IAB conflict when the parent node (100b)'s DU is configured as hard, and child node (100c)'s DU is configured as soft and needs to transmit/receive cell specific signal and channel (CSSC) is presented, wherein the parent node (100b)'s DU has no CSSC to be transmitted/received and scheduled child node (100c)'s MT to transmit/receive in the backhaul link, wherein the child node (100c)'s MT is informed of the CSSC in DU and subsequently the child node (100c)'s MT stops transmission/reception in the backhaul link, and child node (100c)'s DU transmits/receives the CSSC in the soft resource. Soft resource is either a DL or an UL resource. The configuration of DL and UL is based on the associated CSSC. The data loss due to the child node (100c)'s MT stopping transmission/reception in the backhaul link is handled using retransmissions.

In another embodiment, strategy to avoid inter IAB conflict when the parent node (100b)'s DU is configured as hard, and child node (100c)'s DU is configured as soft and needs to transmit/receive cell specific signal and channel (CSSC) is presented, wherein the parent node (100b)'s DU has no CSSC to be transmitted/received and not scheduled child node (100c)'s MT to transmit/receive in the backhaul link, and child node (100c)'s DU transmits/receives the CSSC in the soft resource. Soft resource is either a DL or an UL resource. The configuration of DL and UL is based on the associated CSSC.

In another embodiment, strategy to avoid inter IAB conflict when parent node (100b)'s DU and child node (100c)'s DU have some cell specific signal and channel (CSSC) to be transmitted/received is presented, wherein the CSSC transmission/reception is time division multiplexed between parent node (100b)'s DU and child node (100c)'s DU.

In another embodiment, a strategy to avoid intra IAB conflict when the child node (100c)'s DU is configured as hard and the child node (100c)'s MT needs to transmit/receive cell specific signal and channel (CSSC) is presented, wherein the child node (100c)'s DU has no CSSC signal to be transmitted/received, the child node (100c)'s DU should not schedule any child nodes (100c)/access UEs to transmit/receive in the child/access links, the child node (100c)'s MT transmits/receives the CSSC in backhaul link. Hard resource is any one of DL, UL and F resource. The CSSC is either DL or UL signal.

In another embodiment, strategy to avoid intra IAB conflict when the child node (100c)'s DU is configured as soft and the child node (100c)'s MT needs to receive cell specific signal and channel (CSSC) is presented, wherein the child node (100c)'s MT instead of monitoring the IA/INA signaling, it performs reception of the CSSC using the same resource. Soft resource is any one of the DL resource, UL resource and F resource. The configuration of child node (100c)'s MT is either DL or UL, which is based on the associated CSSC.

In another embodiment, strategy to avoid intra IAB conflict when DU and MT of the same IAB node (100) have some cell specific signal and channel (CSSC) to be transmitted/received is presented, wherein the CSSC transmission/reception is time division multiplexed between DU and MT.

The resource allocation in an IAB node (100) is a challenging task, especially in a multi-hop network (1000) with varying node capabilities, like full duplex and half duplex. In half duplex, the resources are shared statically, semi-statically or dynamically between the backhaul and the child/access links based on at least one of TDM, FDM, CDM and SDM. An IAB network (1000) irrespective of whether deployed for coverage extension or capacity enhancement or both, can be based on complex topologies such as multi-hop, multi-child, multi-parent, mesh etc. Resource allocation in such scenarios without considering the device capability and multiplexing pattern leads to loss of throughput, wastage of resource, signalling overhead, increase in latency and interference in the network (1000). Additionally, the IAB nodes (100) in the network (1000) can use same or different numerologies, which results in different slot duration across the IAB nodes (100) and/or between MT and DU of any IAB node (100). Therefore, resource allocation should handle the issues arising due to different slot duration. Hence, the primary objective of this invention is to provide a method and system for resource allocation in IAB network (1000) with nodes having varying capabilities and numerologies Again, the invention formulates a set of rules for resource allocation that effectively reduce latency, and avoid conflicts, interference and resource wastage for various IAB network (1000) topologies and configurations.

For the sake of brevity, the term "STxDM" will be used to denote HD constraint with simultaneous Tx from DU and MT of the IAB node (100) and the term "SRxDM" will be used to denote HD constraint with simultaneous Rx at DU and MT of the IAB node (100), throughout this disclosure. The term "capability" refers to any one of TDM, STxDM, SRxDM and FD and the term "configuration" refers to at least one of DL, UL, F, H, S and NA throughout this disclosure. The embodiments in this disclosure apply for both same and different numerologies between the backhaul and access links unless stated otherwise.

The numerology defines the slot duration of the transmit signal. Higher numerology leads to decrease in symbol duration, which helps in achieving lower latency. Large coverage area is characterized by longer channel delay spread. In OFDM system, cyclic prefix (CP) is used to prevent inter symbol interference caused by delay spread. The CP duration should be higher than delay spread. Therefore, the DU of an IAB node (100) should select the numerology and CP duration based on the latency and coverage requirements.

In an embodiment, an IAB node (100) selects the numerology and cyclic prefix length for one of child and access link based on at least one of the latency requirements and coverage depending on the capability of one of child node (100c) and access UE, where
  i. FD is at least one of the following:
    a. Simultaneous Tx at DU and Rx at MT of the said IAB node (100).
    b. Simultaneous Rx at DU and Tx at MT of the said IAB node (100).
    c. Simultaneous Tx and Rx at DU of the said IAB node (100).
    d. Simultaneous Tx and Rx at MT of the said IAB node (100).
  ii. STxDM is simultaneous Tx at MT and DU of the said IAB node (100), and there will not be any Rx during this period of Tx.
  iii. SRxDM is simultaneous Rx at MT and DU of the said IAB node (100), and there will not be any Tx during this period of Rx.

In semi-static resource allocation, the DL/UL/F resources for MT of an IAB node (100) is semi-statically configured by parent node (100b) through RRC signalling, whereas the DL/UL/F resources and the H/S/NA configurations for DU of an IAB node (100) are configured by the CU of the donor node (100d) through F1-AP signalling. In a multi-hop IAB scenario with varying node capabilities, the semi-static configuration needs to be done carefully such that all the nodes utilize their capabilities and the net throughput of the system is maximum. Certain considerations for efficient semi-static resource allocation are presented in semi-static resource allocation.

As mentioned earlier, IAB nodes (100) in the network (1000) can have different capabilities. However, an IAB node (100) cannot decide to operate with its capability independently. Using a capability in an IAB node (100) depends on other factors as well. In case of an IAB node (100) with FD capability, full duplex mode of operation depends on the capability and configuration of its parent node (100b) and child nodes (100c).

Consider a scenario in which an IAB node (100) has FD capability and its parent has TDM capability. When the DU of parent node (100b) is configured as soft without IA/NA, then the MT of the IAB node (100) (with FD capability) cannot be active. Thus, FD capability of an IAB node (100) will be active only when its parent node (100b)`s DU and child node (100c)`s MT/access UE can transmit and/or receive.

Accordingly, the embodiments herein provide a method for resource allocation in an Integrated Access Backhaul (IAB) network (1000). The method includes establishing, by a central unit (CU) of a donor node (100d), a connection with a distributed unit (DU) of at least one IAB node (100) in the IAB network (1000), where the at least one IAB node (100) comprises at least one of a reference node (100a), at least one parent node (100b), and at least one child node (100c). Further, the method includes receiving, by the CU of the donor node (100d) from at least one IAB node (100), at least one parameter associated with each of the at least one IAB node (100). Further, the method includes determining, by the CU of the donor node (100d), a resource configuration comprising of resources to be allocated to the DU of each of the at least one IAB node (100) based on at least one of a resource allocation criteria and the at least one parameter, where the resources comprising of at least one of a downlink (DL) resource, an uplink (UL) resource and a flexible (F) resource. Further, the method includes indicating, by the CU of the donor node (100d), the resource configuration for the DU of each of the at least one IAB node (100).

The donor node act as parent node for a first IAB node in at least one of a single hop IAB network and a multi hop IAB network. The reference node act as parent of the at least one child node and a child of the at least one parent node.

Accordingly, the embodiments herein provide a method for timing alignment in a multi-hop Integrated Access Backhaul (IAB) network (1000) with varying node capability. The method includes signaling, by a DU of at least one reference node, a timing advance (TA) value to at least one child node (100c) of the at least reference node based on a plurality of parameters associated with the at least child node (100c). Further, the method includes evaluating, by the at least one child node (100c), at least one of a UL-Tx timing and a DL-Tx timing based on the TA value signaled by the at least one reference node. Further, the method includes detecting, by the at least one parent node (100b), the reference node is connected with the at least one parent node (100b) with varying capability. Further, the method includes scheduling, by the at least one parent node (100b), UL grant to the reference node in non-overlapping time slots. Further, the method includes transmitting, by the reference node, UL transmission to the at least one parent node (100b) in the non-overlapping time slots.

Accordingly, the embodiments herein provide a method for timing alignment in an Integrated Access Backhaul (IAB) network (1000). The method includes configuring, by a CU of a donor node (100d), resources for a DU of a reference node, or configuring, by a DU of at least one parent node (100b), resources for a MT of a reference node. Further, the method includes detecting, by the at least one parent node (100b), a transition between the MT to the DU or the DU to the MT across time slots at the reference node. Further, the method includes configuring, by the at least one parent node (100b), a guard period for transmission or reception at the MT of the reference node at start or end of the time slots.

In the case of IAB nodes (100) with STxDM and SRxDM, the activation of simultaneous Tx/simultaneous Rx capability at an IAB node (100) depends on factors such as (1) HD constraint is satisfied (2) Timing alignment strategy followed by the node and its parent node (100b) and child nodes (100c) (3) Capability/mode of parent and child nodes (100c) etc.

Referring now to the drawings, and more particularly to FIGS. 4a through 26, there are shown preferred embodiments.

FIGS. 4a-4j and FIGS. 5-6 illustrates are flow diagram (400) illustrating a method for resource allocation in the IAB network (1000), according to an embodiment as disclosed herein. The operations are performed by the IAB node (100).

Figure 4A:
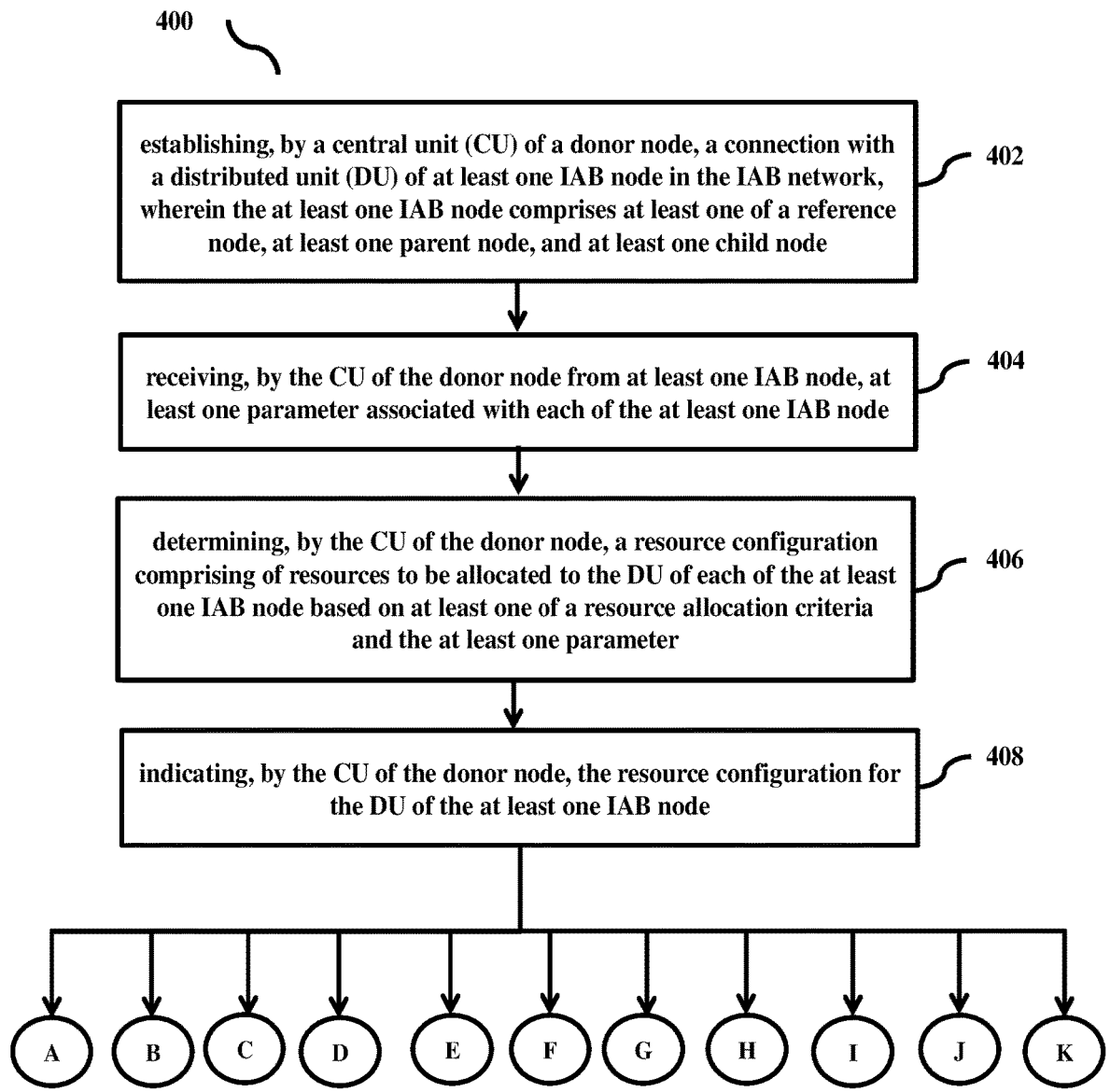
FIGS. 4a-4j and FIGS. 5-6 illustrates are flow diagrams illustrating a method for resource allocation in the IAB network, according to an embodiment as disclosed herein.

For FIG. 4a: At 402, the method includes establishing, by a central unit (CU) of a donor node (100d), a connection with a distributed unit (DU) of at least one IAB node (100) in the IAB network (1000). The at least one IAB node (100) comprises at least one of a reference node (100a), at least one parent node (100b), and at least one child node (100c). At 404, the method includes receiving, by the CU of the donor node (100d) from at least one IAB node (100), at least one parameter associated with each of the at least one IAB node (100). At 406, the method includes determining, by the CU of the donor node (100d), a resource configuration comprising of resources to be allocated to the DU of each of the at least one IAB node (100) based on at least one of a resource allocation criteria and the at least one parameter. The resources comprising of at least one of a downlink (DL) resource, an uplink (UL) resource and a flexible (F) resource. At 408, the method includes indicating, by the CU of the donor node (100d), the resource configuration for the DU of each of the at least one IAB node (100).

The DL resource is at least one of a hard (H) resource, a soft (S) resource, and a not available (NA) resource, wherein the UL resource is at least one of a H resource, a S resource, and a NA resource, and wherein the F resource is at least one of a H resource, a S resource, and a NA resource.

The at least one parameter comprises a multiplexing capability between a mobile terminal (MT) and the DU of the at least one IAB node (100), a numerology followed in the DU of the at least one IAB node (100), a numerology followed in the MT of the at least one IAB node (100), a traffic load at the at least one IAB node (100), and an interference level at the at least one IAB node (100).

The multiplexing capability between the MT and the DU of the at least one IAB node (100) indicates at least one of a support for a full duplex (FD), a support of at least one of space division multiplexing (SDM), frequency division multiplexing (FDM) and code division multiplexing (CDM) with simultaneous transmission in both the DU and the MT, a support of at least one of a SDM, a FDM, and a CDM with simultaneous reception in both the DU and the MT, and a support of time division multiplexing (TDM).

The resource configuration for the DU of each of the at least one IAB node (100) is performed based on a reference numerology.

The reference numerology corresponds to a lowest among all configured numerologies of at least one of a first carrier frequency range and a second carrier frequency range in the IAB network (1000).

The resource allocation criteria comprises at least one of a conflict avoidance criteria, a resource wastage avoidance criteria, an energy efficient criteria, and a latency reduction criteria.

The conflict avoidance criteria indicates at least one of:
 a. the DU of the reference node (100a) to be configured as one of a S resource and a NA resource, when the DU of the at least one parent node (100b) of the reference node (100a) is configured as a H resource;
 b. the DU of the reference node (100a) to be configured as H resource when DU of the at least one parent node (100b) of the reference node (100a) is configured as NA resource; and
 c. a resource configuration of a MT of the reference node (100a) to be in line with the resource configuration of the DU of the at least one parent node (100b) of the reference node (100a).

The resource wastage avoidance criteria and latency reduction criteria in multi-hop IAB network (1000) comprises at least one of:
 a. the CU of the donor node (100d) should not allocate S resource to the DU's of a plurality of IAB nodes (100) in adjacent hops;
 b. the CU of the donor node (100d) allocates NA resource to the DU of the reference node (100a) and H resource to a DU of the at least one child node (100c) of the reference node (100a), when a DU of the at least one parent node (100b) of the reference node (100a) is configured as S resource;
 c. the DU of the reference node (100a) to be configured as NA resource, by CU of the donor node (100d), when the DU of the at least one parent node (100b) of the reference node (100a) is configured with cell specific signal and channel (CSSC); and
 d. IAB nodes (100) with the STxDM capability and the SRxDM capability alternates between hops to ensure all links are active without reduction in throughput in a multi-hop IAB network (1000).

The energy efficient criteria indicates that a MT of the reference node (100a) is configured as F when a DU of the at least one parent node (100b) of the reference node (100a) is configured as one of a S resource and a NA resource to avoid transmission and reception of one of UL and DL reference signals.

Figure 4B:
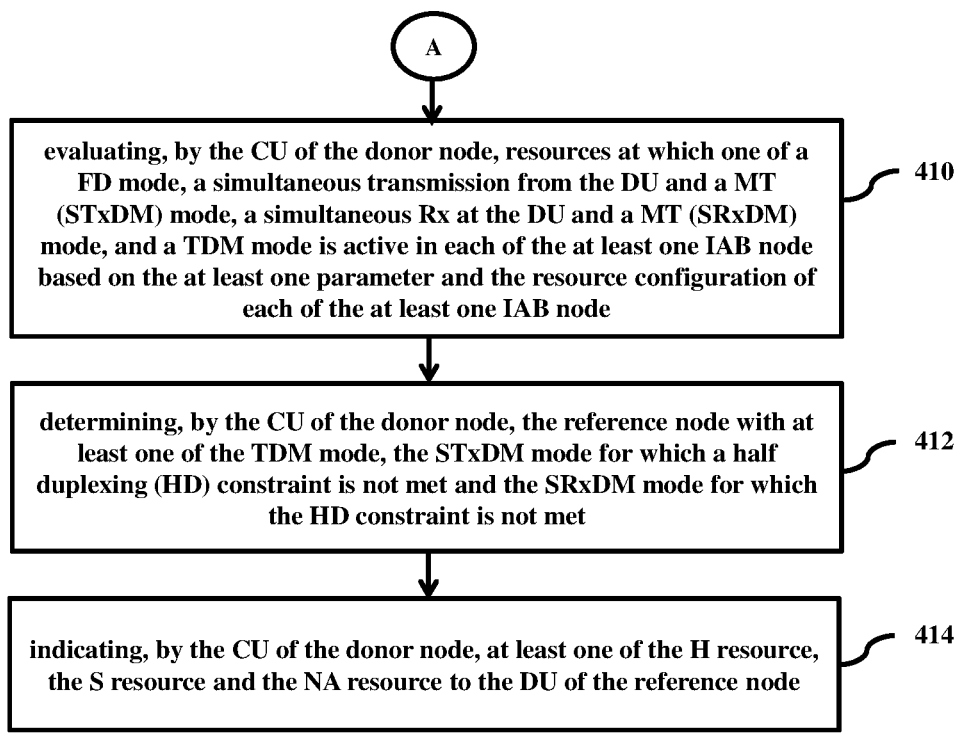

For FIG. 4b: At 410, the method includes evaluating, by the CU of the donor node (100d), resources at which one of a FD mode, a simultaneous transmission from the DU and a MT (STxDM) mode, a simultaneous Rx at the DU and a MT (SRxDM) mode, and a TDM mode is active in each of the at least one IAB node (100) based on the at least one parameter and the resource configuration of each of the at least one IAB node (100). At 412, the method includes determining, by the CU of the donor node (100d), the reference node (100a) with at least one of the TDM mode, the STxDM mode for which a half duplexing (HD) constraint is not met and the SRxDM mode for which the HD constraint is not met. At 414, the method includes indicating, by the CU of the donor node (100d), at least one of the H resource, the S resource and the NA resource to the DU of the reference node (100a).

At least one of the FD mode, the STxDM mode, the SRxDM mode and the TDM mode is activated in the reference node (100a) based on at least one of the interference level, a capability of at least one of the reference node (100a), the at least one parent node (100b) and the at least one child node (100c), and the resource configuration of at least one of the reference node (100a), the at least one parent node (100b) and the at least one child node (100c).

The FD mode is activated at the reference node (100a) at least one of when the DU of the reference node (100a) is transmitting and the MT of the reference node (100a) is receiving, when the DU of the reference node (100a) is receiving and the MT of the reference node (100a) is transmitting, when the DU of the reference node (100a) is simultaneously transmitting and receiving and when the MT of the reference node (100a) is simultaneously transmitting and receiving.

The STxDM mode is activated at the reference node (100a) when both the MT and the DU of the reference node (100a) are simultaneously transmitting. The SRxDM mode is activated at the reference node (100a) when both the MT and the DU of the reference node (100a) are simultaneously receiving. The TDM mode is activated at the reference node (100a) when any one of the MT and the DU of the reference node (100a) is performing one of transmission and reception. The TDM mode is activated at the reference node (100a) with at least one of the STxDM capability, the SRxDM capability and the FD capability when the interference level is above a threshold at the reference node (100a), wherein the threshold is at least one of a fixed value and a configured value.

Figure 4C:
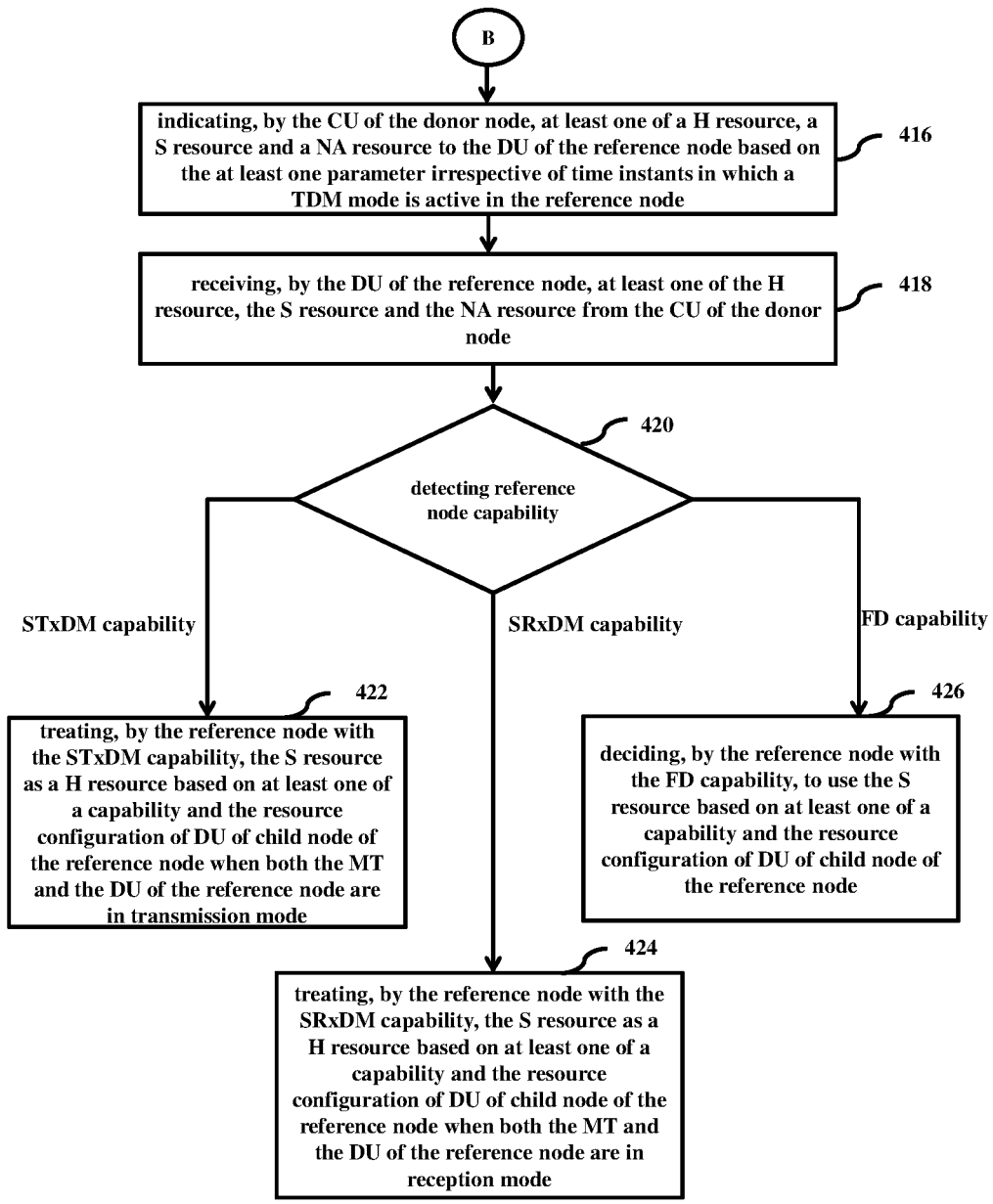

For FIG. 4c: At 416, the method includes indicating, by the CU of the donor node (100d), at least one of a H resource, a S resource and a NA resource to the DU of the reference node (100a) based on the at least one parameter irrespective of time instants in which a TDM mode is active in the reference node (100a). At 418, the method includes receiving, by the DU of the reference node (100a), at least one of the H resource, the S resource and the NA resource from the CU of the donor node (100d). The reference node (100a) comprises one of STxDM capability, SRxDM capability and FD capability. At 420, the method includes detecting the reference node (100a) capability. At 422, the method includes treating, by the reference node (100a) with the STxDM capability, the S resource as a H resource based on at least one of a capability and the resource configuration of DU of child node (100c) of the reference node (100a) when both the MT and the DU of the reference node (100a) are in transmission mode. At 424, the method includes treating, by the reference node (100a) with the SRxDM capability, the S resource as a H resource based on at least one of a capability and the resource configuration of DU of child node (100c) of the reference node (100a) when both the MT and the DU of the reference node (100a) are in reception mode. At 426, the method includes deciding, by the reference node (100a) with the FD capability, to use the S resource based on at least one of a capability and the resource configuration of DU of child node (100c) of the reference node (100a).

Figure 4D:
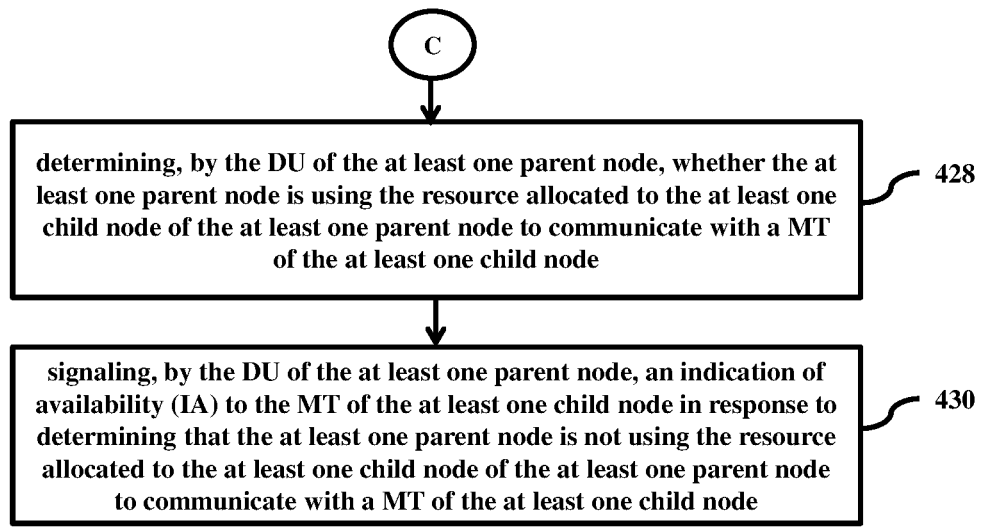

For FIG. 4d: At 428, the method includes determining, by the DU of the at least one parent node (100b), whether the at least one parent node (100b) is using the resource allocated to the at least one child node (100c) of the at least one parent node (100b) to communicate with a MT of the at least one child node (100c). At 430, the method includes signaling, by the DU of the at least one parent node (100b), an indication of availability (IA) to the MT of the at least one child node (100c) in response to determining that the at least one parent node (100b) is not using the resource allocated to the at least one child node (100c) of the at least one parent node (100b) to communicate with a MT of the at least one child node (100c).

The IA is signaled using a downlink control information (DCI) format, and wherein the DCI format comprises at least one field used as an index in a Radio Resource Control (RRC) configured Availability Indicator (AI). The index in the RRC configured AI indicates availability of at least one of DL, UL and F resource.

The at least one parent node (100b) signals the IA for S resources of the DU of the at least one child node (100c) in form of F resource in a slot format indicator (SFI). The at least one parent node (100b) explicitly signals the IA to the MT of the at least one child node (100c), and wherein the IA signal is based on a timing of the resource configuration of the DU of the at least one child node (100c). The IA is explicitly signaled when the DU of the at least one parent node (100b) is configured as a DL resource with at least one of the H resource and the S resource with the IA signal.

The IA signal is independent of a resource configuration of the MT of the at least one child node (100c) and overrides the resource configuration of the MT of the at least one child node (100c). The DU of the at least one child node (100c) performs one of a non-slot based transmission and a non-slot based reception on the resources indicated as the IA by the at least one parent node (100b). The IA signal is associated with a validity duration, wherein the validity duration is determined based on at least one of numerology of the MT and numerology of the DU of the at least one child node (100c).

The validity duration is at least one of a fixed value and a configured value, wherein the configuration is at least one of semi-static and dynamic. The IA is indicated to one of a group of the plurality of child nodes (100c) for per-DU resource allocation and the reference child node (100c) for per-link resource allocation.

Figure 4E:
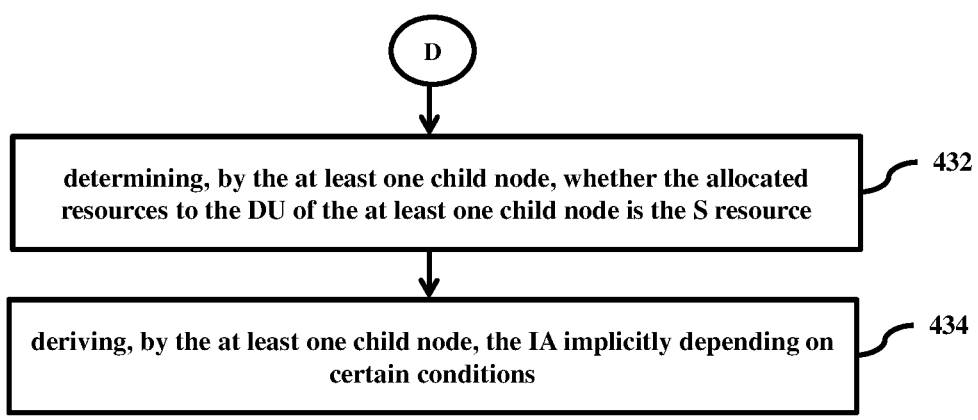

For FIG. 4e: At 432, the method includes determining, by the at least one child node (100c), whether the allocated resources to the DU of the at least one child node (100c) is the S resource. At 434, the method includes deriving, by the at least one child node (100c), the IA implicitly depending on certain conditions.

the certain conditions are at least one of:
a. lack of UL scheduling grant at a MT of the at least one child node (100c);
b. no data available for one of transmission and reception at a MT of the at least one child node (100c);
c. no control data available for one of transmission and reception at a MT of the at least one child node (100c); and
d. no reference signal available for one of transmission and reception at a MT of the at least one child node (100c).

Figure 4F:
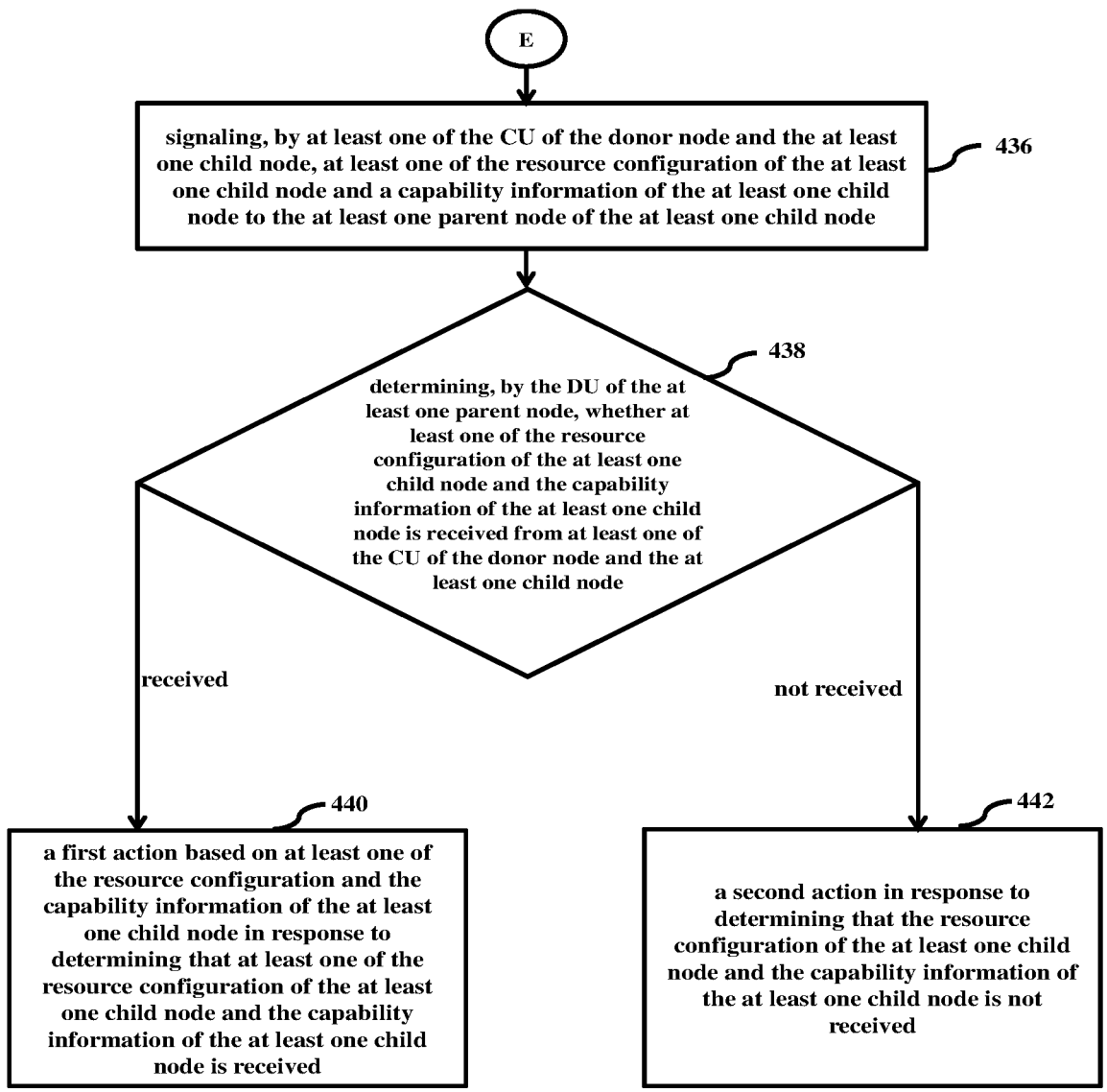

For FIG. 4f: At 436, the method includes signaling, by at least one of the CU of the donor node (100d) and the at least one child node (100c), at least one of the resource configuration of the at least one child node (100c) and a capability information of the at least one child node (100c) to the at least one parent node (100b) of the at least one child node (100c). At 438, the method includes determining, by the DU of the at least one parent node (100b), whether at least one of the resource configuration of the at least one child node (100c) and the capability information of the at least one child node (100c) is received from at least one of the CU of the donor node (100d) and the at least one child node (100c).

At 440, the method includes performing, by the DU of the at least one parent node (100b), a first action based on at least one of the resource configuration and the capability information of the at least one child node (100c) in response to determining that at least one of the resource configuration of the at least one child node (100c) and the capability information of the at least one child node (100c) is received.

At 442, the method includes performing, by the DU of the at least one parent node (100b), a second action in response to determining that the resource configuration of the at least one child node (100c) and the capability information of the at least one child node (100c) is not received.

Where the first action comprises at least one of,
a. detecting that the resource configuration comprises a H resource and a direction of the H resource at the DU of the at least one child node (100c), and disabling communication with a MT of the at least one child node (100c) irrespective of a slot configuration;
b. detecting that the resource configuration comprises a S resource and a direction of the S resource at the DU of the at least one child node (100c), and signaling an indication of available (IA) signal to the at least one child node (100c) when the at least one parent node (100b) is not using a corresponding resource to communicate with a MT of the at least one child node (100c);
c. detecting that the resource configuration comprises a S resource at the DU of the at least one child node (100c), and configuring the MT of child node (100c) as F to avoid transmission of reference signal from MT of the at least one child node (100c) when the at least one parent node (100b) signal an IA;
d. detecting that the resource configuration comprises a NA resource at the DU of the at least one child node (100c), and avoiding IA signal to the at least one child node (100c);
e. detecting that the resource configuration comprises one of DL and UL configuration of the DU of the at least one child node (100c), and scheduling a MT of the at least one child node (100c) such that a HD constraint is satisfied in the at least one child node (100c) to allow at least one of simultaneous transmission at the MT and the DU of the at least one child node (100c) with STxDM capability and simultaneous reception at the MT and the DU of the at least one child node (100c) with SRxDM capability;
f. detecting the resource configuration and the capability information, and evaluating the time instances in which a TDM mode is active in the at least one child node (100c) and signaling an IA to the at least one child node (100c) when the at least one parent node (100b) is not using a corresponding resource to communicate with a MT of the at least one child node (100c);
g. detecting that the resource configuration and the capability information, and evaluating the time instances in which a HD constraint is not met in the at least one child node (100c) with at least one of STxDM and SRxDM capability and signaling an IA to the at least one child node (100c) in the time instances in which a HD constraint is not met in the at least one child node (100c) with at least one of STxDM and SRxDM capability, when the at least one parent node (100b) is not using a corresponding resource to communicate with the MT of the at least one child node (100c);
h. detecting that the resource configuration comprises one of DL, UL and F configuration of the DU of the at least one child node (100c), and signaling an IA in advance based on a processing delay, where the processing delay depends on the direction of S resource at the DU of the at least one child node (100c); and
i. detecting that the resource configuration comprises a CSSC configuration of the DU of the at least one child node (100c) and configuring MT of the at least one child node (100*c*) as F and not scheduling the MT of the at least one child node (100*c*).

Where second action comprises at least one of, a. allocating resources to a MT of the at least one child node (100*c*) irrespective of a HD constraint at the at least one child node (100*c*); and b. signaling an IA to the at least one child node (100*c*) when the at least one parent node (100*b*) is not communicating with a MT of the at least one child node (100*c*), irrespective of the resource configuration of the DU of the at least one child node (100*c*), where signaling of the IA in advance is done by assuming that the DU of the at least one child node (100*c*) is configured as UL resource.

Figure 4G:
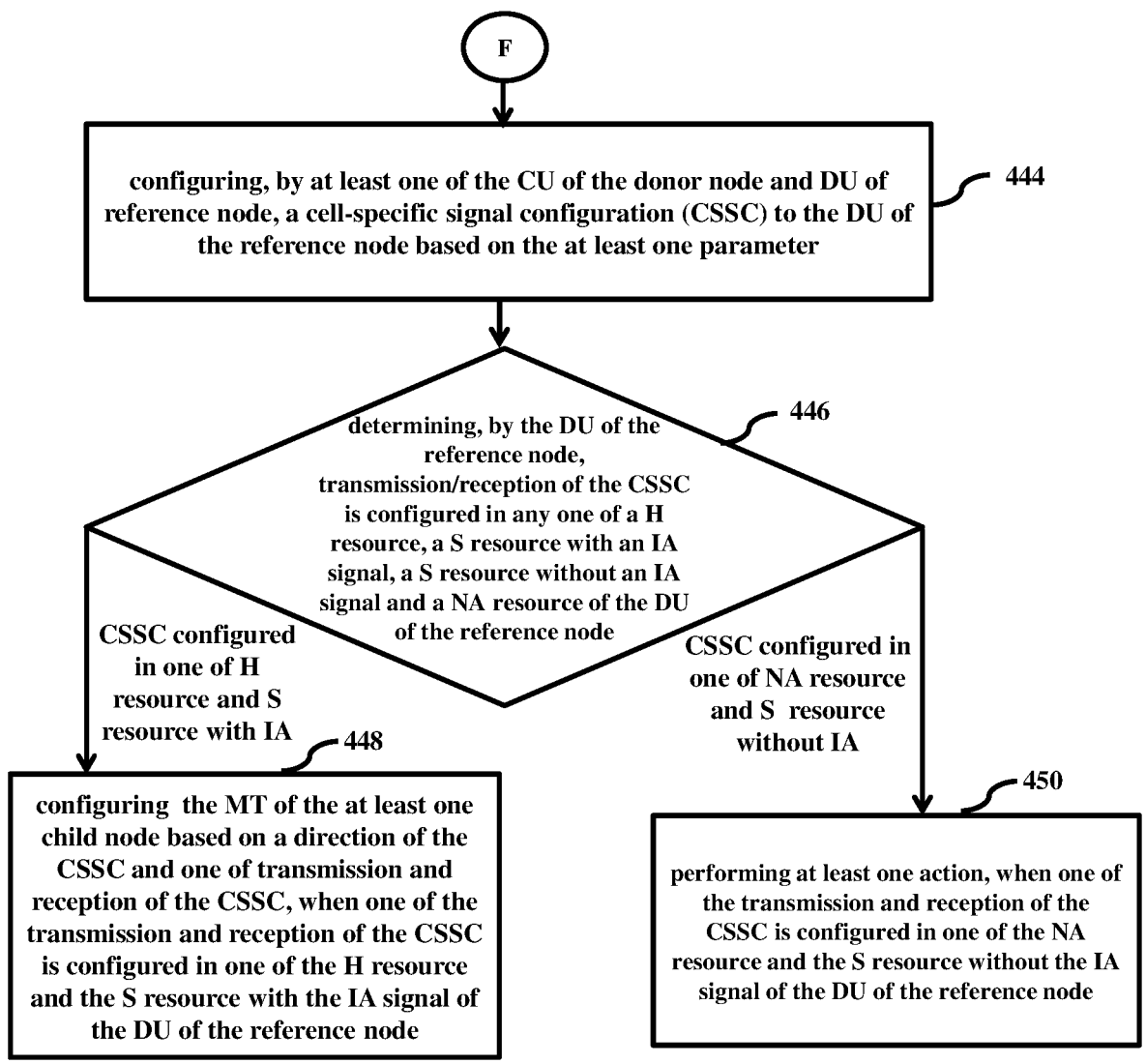

For FIG. 4*g*: At 444, the method includes configuring, by at least one of the CU of the donor node (100*d*) and DU of reference node (100*a*), a cell-specific signal and channel (CSSC) configuration to the DU of the reference node (100*a*) based on the at least one parameter. At 446, the method includes determining, by the DU of the reference node (100*a*), transmission/reception of the CSSC is configured in any one of a H resource, a S resource with an IA signal, a S resource without an IA signal and a NA resource of the DU of the reference node (100*a*). At 448, the method includes configuring the MT of the at least one child node (100*c*) based on a direction of the CSSC and one of transmission and reception of the CSSC, when one of the transmission and reception of the CSSC is configured in one of the H resource and the S resource with the IA signal of the DU of the reference node (100*a*). At 450, the method includes performing at least one action, when one of the transmission and reception of the CSSC is configured in one of the NA resource and the S resource without the IA signal of the DU of the reference node (100*a*).

Where performing the at least one action comprises treating the at least one of the S resource without the IA signal and the NA resource as H resource, and configuring the MT of the at least one child node (100*c*) based on a direction of the CSSC and performing one of transmitting and receiving the CSSC.

Further, where performing the at least one comprising, determining whether the MT of the reference node (100*a*) is configured with the CSSC; and in response to determining that the MT of the reference node (100*a*) is not configured with the CSSC, performing by the reference node (100*a*) one of:

a. informing the at least one parent node (100*b*) of the reference node (100*a*), disabling a backhaul link, treating at least one of the S resource without the IA signal and the NA resource as H resource, and configuring the MT of the at least one child node (100*c*) based on a direction of the CSSC and performing one of transmitting and receiving the CSSC, and b. b. disabling a backhaul link without informing the at least one parent node (100*b*) of the reference node (100*a*), treating at least one of the S resource without the IA signal and the NA resource as H resource, and configuring the MT of the at least one child node (100*c*) based on a direction of the CSSC and performing one of transmitting and receiving the CSSC; and where the backhaul link is a link between the DU of the at least one parent node (100*b*) and the MT of the reference node (100*a*).

In response to determining that the MT of the reference node (100*a*) is configured with the CSSC, performing by the reference node (100*a*) one of:

a. TDM between the MT and the DU of at the reference node (100*a*), b. informing the at least one parent node (100*b*) of the reference node (100*a*), disabling a backhaul link, treating at least one of the S resource without the IA signal and the NA resource as H, and configuring the MT of the at least one child node (100*c*) based on a direction of the CSSC and one of transmitting and receiving the CSSC, and c. disabling a backhaul link without informing the at least one parent node (100*b*) of the reference node (100*a*), treating at least one of the S resource without the IA signal and the NA resource as H resource, and configuring the MT of the at least one child node (100*c*) based on a direction of the CSSC and performing one of transmitting and receiving the CSSC, where the backhaul link is a link between the DU of the at least one parent node (100*b*) and the MT of the reference node (100*a*).

Figure 4H:
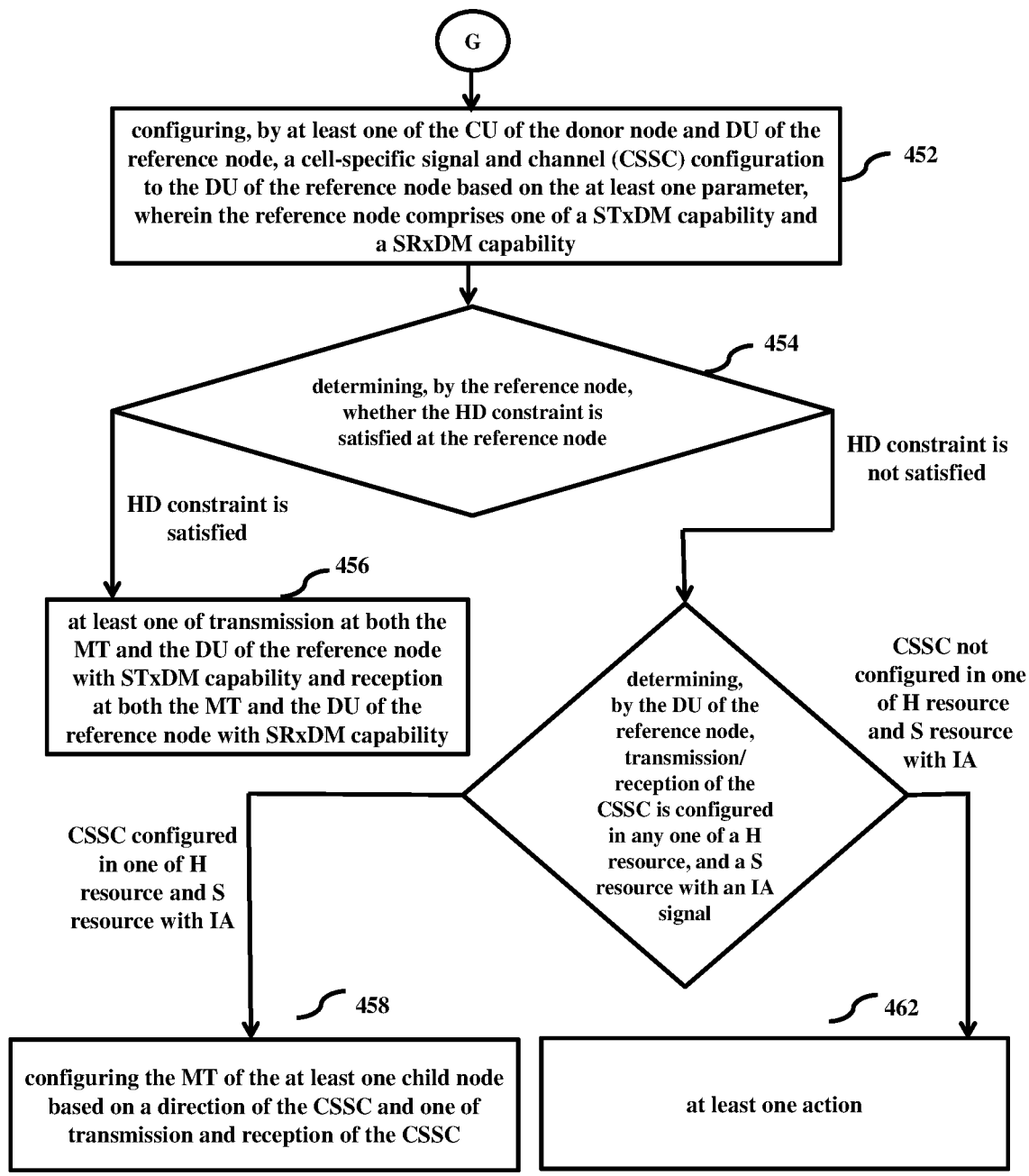

For FIG. 4*h*: At 452, the method includes configuring, by at least one of the CU of the donor node (100*d*) and DU of the reference node (100*a*), a cell-specific signal and channel (CSSC) configuration to the DU of the reference node (100*a*) based on the at least one parameter, where the reference node (100*a*) comprises one of a STxDM capability and a SRxDM capability. At 454, the method includes determining, by the reference node (100*a*), whether the HD constraint is satisfied at the reference node (100*a*). At 456, the method includes at least one of transmission at both the MT and the DU of the reference node (100*a*) with STxDM capability and reception at both the MT and the DU of the reference node (100*a*) with SRxDM capability, when HD constraint is satisfied at the reference node (100*a*).

At 458, the method includes configuring the MT of the at least one child node (100*c*) based on a direction of the CSSC and one of transmission and reception of the CSSC, when HD constraint is not satisfied at the reference node (100*a*). At 460, the method includes one of transmission and reception of the CSSC is configured in one of the H resource and the S resource with the IA signal of the DU of the reference node (100*a*).

At 462, the method includes at least one action when HD constraint is not satisfied at the reference node (100*a*). At 464, the method includes one of transmission and reception of the CSSC is configured in one of the NA resource or the S resource without the IA signal of the DU of the reference node (100*a*).

Figure 4I:
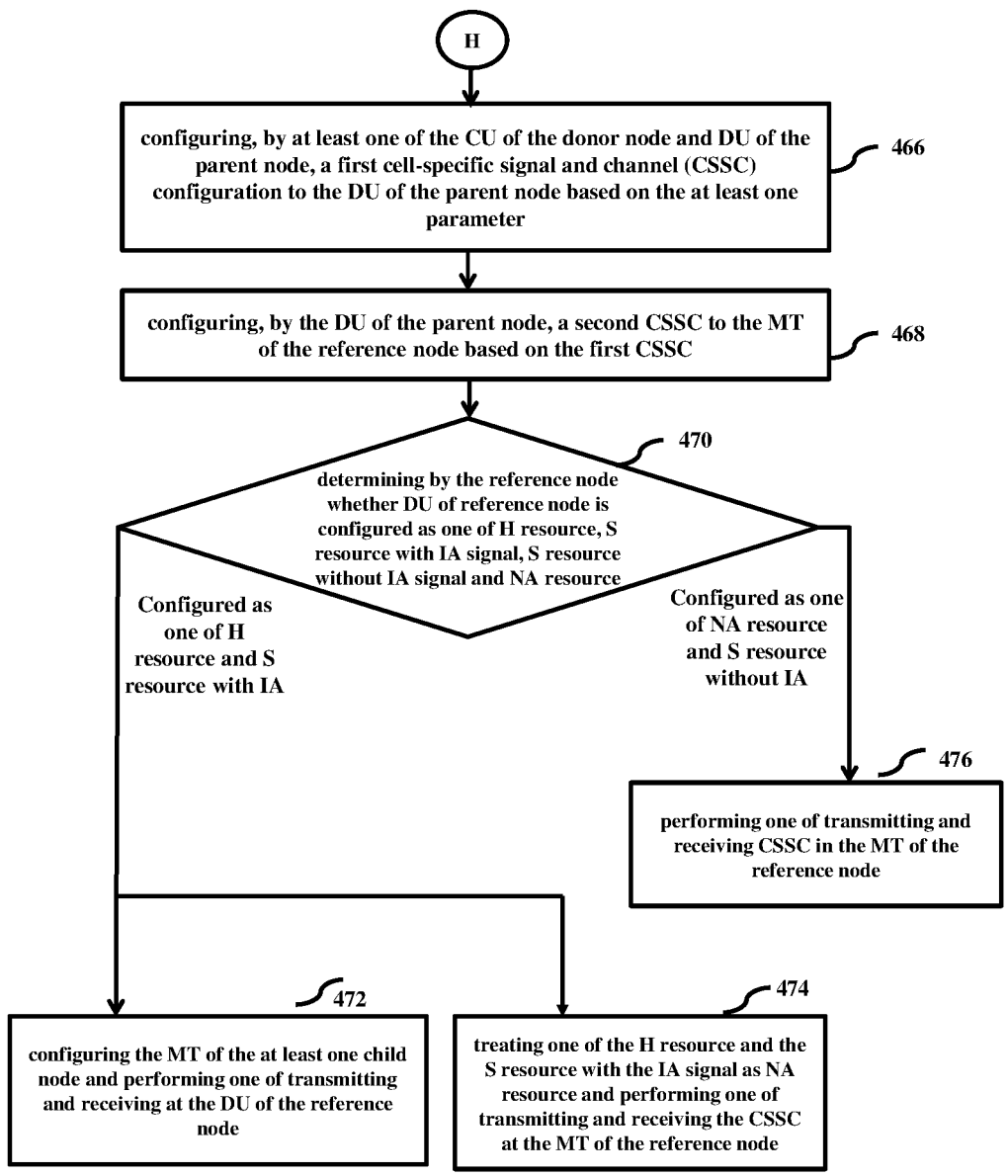

For FIG. 4*i*: At 466, the method includes configuring, by at least one of the CU of the donor node (100*d*) and DU of the parent node (100*b*), a first cell-specific signal and channel (CSSC) configuration to the DU of the parent node (100*b*) based on the at least one parameter. At 468, the method includes configuring, by the DU of the parent node (100*b*), a second CSSC to the MT of the reference node (100*a*) based on the first CSSC. At 470, the method includes determine DU of the reference node (100*a*) configuration.

At 472, the method includes configuring the MT of the at least one child node (100*c*) and performing one of transmitting and receiving at the DU of the reference node (100*a*), when the DU of the reference node (100*a*) is configured as one of the H resource or the S resource with the IA signal. At 474, the method includes treating one of the H resource and the S resource with the IA signal as NA resource and performing one of transmitting and receiving the CSSC at the MT of the reference node (100a), when the DU of the reference node (100a) is configured as one of the H resource or the S resource with the IA signal. At 476, the method includes performing one of transmitting and receiving CSSC in the MT of the reference node (100a), when the DU of the reference node (100a) is configured as one of the NA resource and the S resource without the IA signal.

Figure 4J:
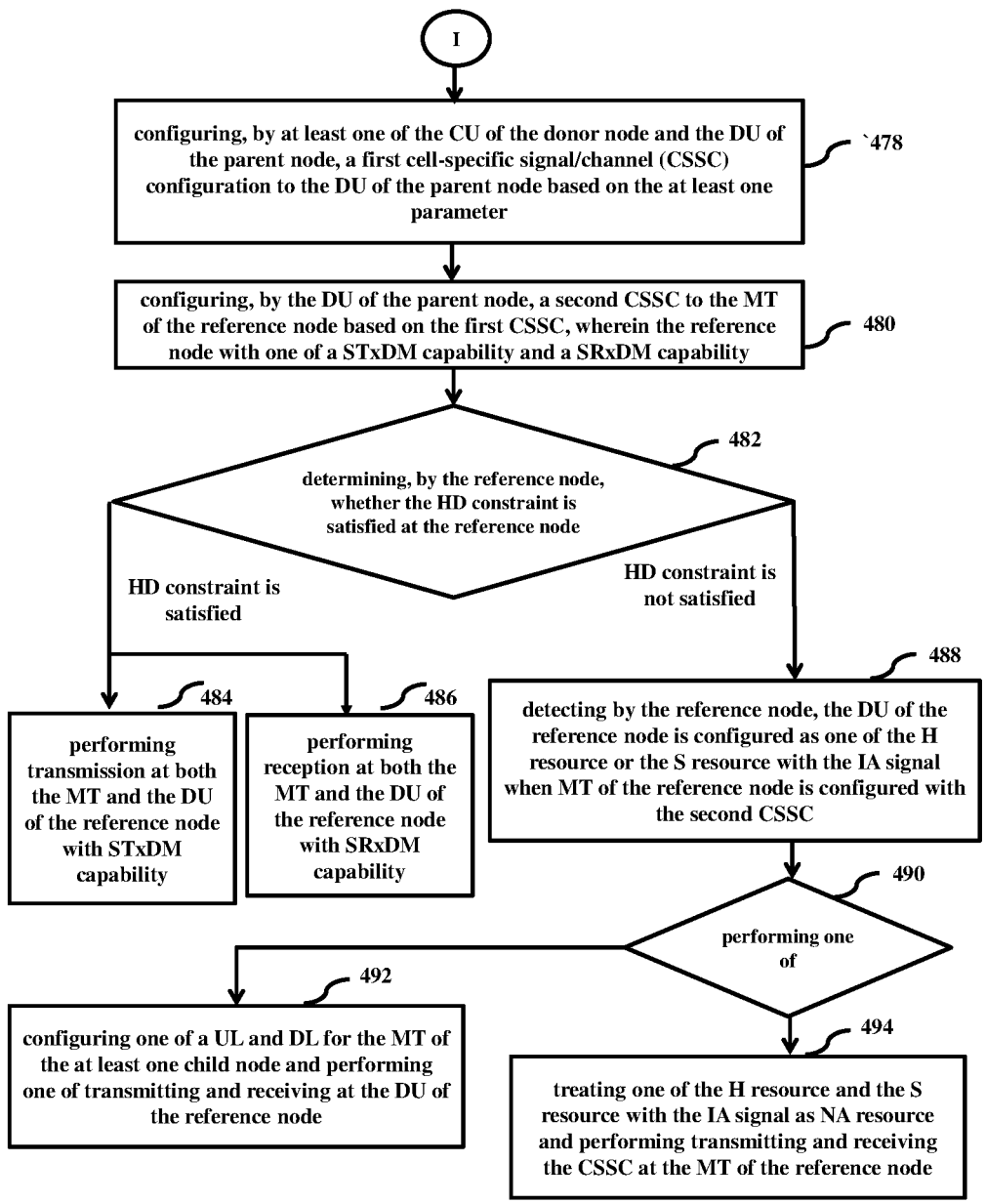

For FIG. 4j: At 478, the method includes configuring, by at least one of the CU of the donor node (100d) and the DU of the parent node (100b), a first cell-specific signal and channel (CSSC) configuration to the DU of the parent node (100b) based on the at least one parameter. At 480, the method includes configuring, by the DU of the parent node (100b), a second CSSC to the MT of the reference node (100a) based on the first CSSC, where the reference node (100a) with one of a STxDM capability and a SRxDM capability. At 482, the method includes determining, by the reference node (100a), whether the HD constraint is satisfied at the reference node (100a).

At 484, the method includes in response to determining that the HD constraint is satisfied at the reference node (100a), performing at least one of transmission at both the MT and the DU of the reference node (100a) with STxDM capability. At 486, the method includes reception at both the MT and the DU of the reference node (100a) with SRxDM capability.

At 488, the method includes in response to determining that the HD constraint is not satisfied at the reference node (100a), and detecting by the reference node (100a), the DU of the reference node (100a) is configured as one of the H resource or the S resource with the IA signal when MT of the reference node (100a) is configured with the second CSSC. At 490, the method includes performing step 492 or 494. At 492, the method includes configuring one of a UL and DL for the MT of the at least one child node (100c) and performing one of transmitting and receiving at the DU of the reference node (100a). At 494, the method includes treating one of the H resource and the S resource with the IA signal as NA resource and performing transmitting and receiving the CSSC at the MT of the reference node (100a).

The CSSC include at least one of:
a. synchronization signal blocks (SSB) including both cell-defining SSB (CD-SSB) and non-CD-SSB;
b. random access channel (RACH);
c. periodic Channel State Information Reference Signal (CSI-RS); and
d. scheduling request (SR).

The parameter comprises at least one of multiplexing capability between a MT and the DU of the reference node (100a), and a numerology followed in the DU by the reference node (100a).

Figure 5:
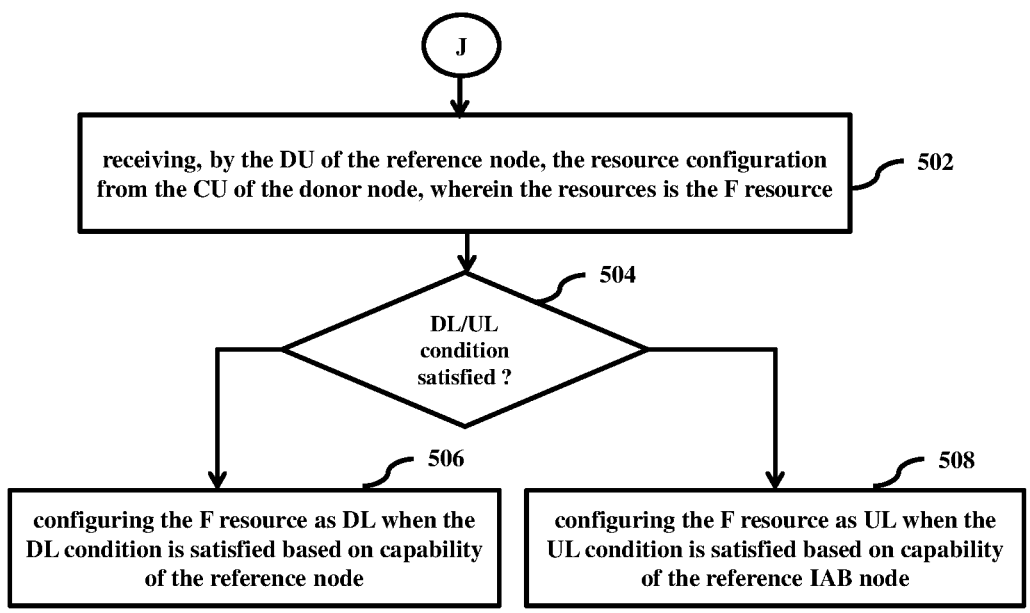

For FIG. 5: At 502, the method includes receiving, by the DU of the reference node (100a), the resource configuration from the CU of the donor node (100d), where the resources is the F resource. At 504, the method includes determining DL/UL condition. At 506, the method includes configuring the F resource as DL when the DL condition is satisfied based on capability of the reference node (100a). At 508, the method includes configuring the F resource as UL when the UL condition is satisfied based on capability of the reference node (100a).

Figure 6:
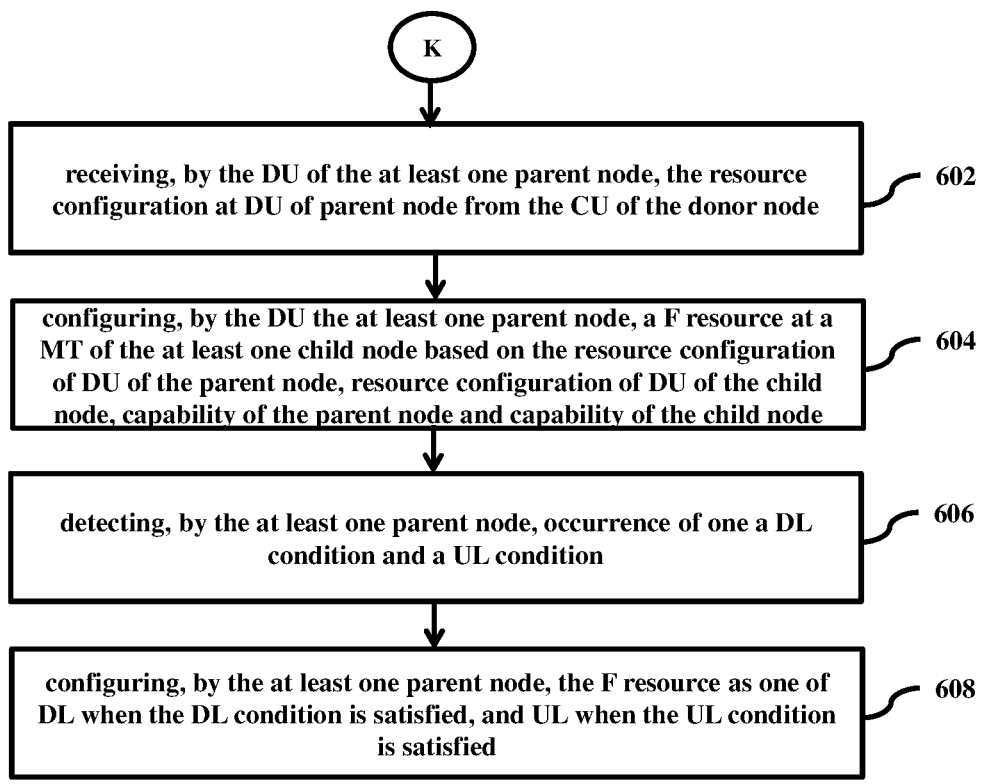

For FIG. 6: At 602, the method includes receiving, by the DU of the at least one parent node (100b), the resource configuration at DU of parent node (100b) from the CU of the donor node (100d). At 604, the method includes configuring, by the DU the at least one parent node (100b), a F resource at a MT of the at least one child node (100c) based on the resource configuration of DU of the parent node (100b), resource configuration of DU of the child node (100c), capability of the parent node (100b) and capability of the child node (100c). At 606, the method includes detecting, by the at least one parent node (100b), occurrence of one a DL condition and a UL condition. At 608, the method includes configuring, by the at least one parent node (100b), the F resource as one of
a. DL when the DL condition is satisfied, and
b. UL when the UL condition is satisfied;
Where the DL condition and UL condition depends on the capability of the at least one child node (100c).

Figure 7:
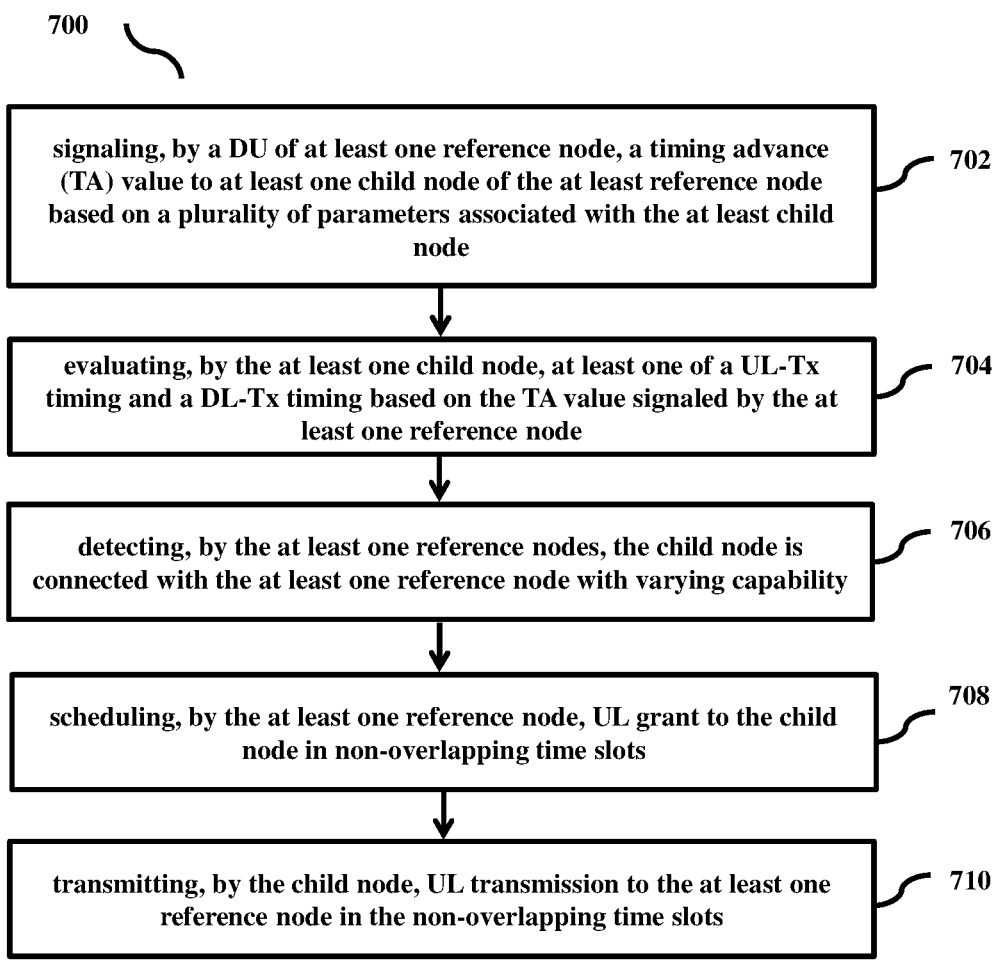
FIG. 7 illustrates is a flow diagram illustrating a method for timing alignment in the multi-hop IAB network with varying node capability, according to an embodiment as disclosed herein.

FIG. 7 illustrates is a flow diagram (700) illustrating a method for timing alignment in the multi-hop IAB network (1000) with varying node capability, according to an embodiment as disclosed herein. The operations (702-704) are performed by the IAB node (100).

At 702, the method includes signaling, by a DU of at least one reference node (100a), a timing advance (TA) value to at least one child node (100c) of the at least reference node (100a) based on a plurality of parameters associated with the at least child node (100c). At 704, the method includes evaluating, by the at least one child node (100c), at least one of a UL-Tx timing and a DL-Tx timing based on the TA value signaled by the at least one reference node (100a). At 706, the method includes detecting, by the at least one parent nodes (100b), the reference node (100a) is connected with the at least one parent node (100b) with varying capability. At 708, the method includes scheduling, by the at least one parent node (100b), UL grant to the reference node in non-overlapping time slots. At 710, the method includes transmitting, by the reference node (100a), UL transmission to the at least one parent node (100b) in the non-overlapping time slots.

Figure 8:
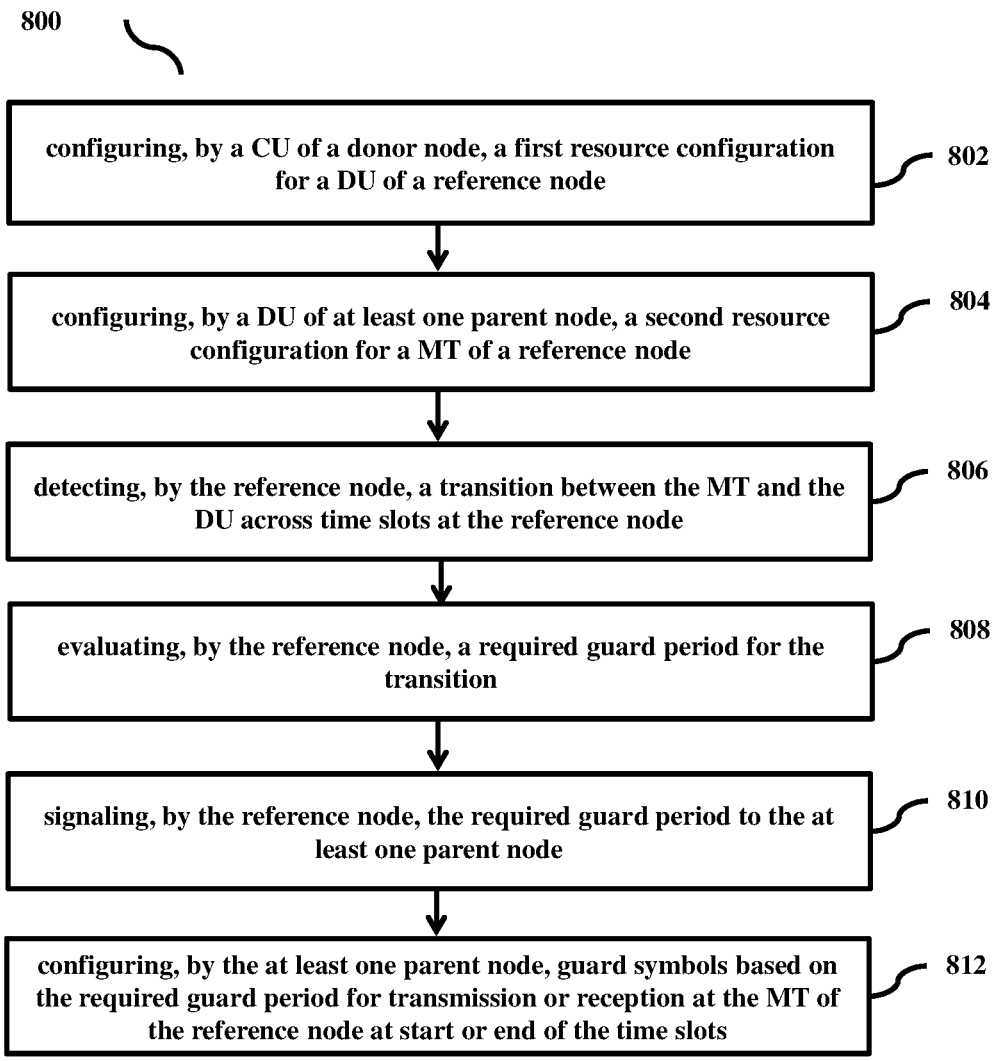
FIG. 8 illustrates is a flow diagram illustrating a method for timing alignment in the IAB network, according to an embodiment as disclosed herein.

FIG. 8 illustrates is a flow diagram (800) illustrating a method for timing alignment in the IAB network (1000), according to an embodiment as disclosed herein. The operations (802-812) are performed by the IAB node (100).

At 802, the method includes configuring, by a CU of a donor node (100d), a first resource configuration for a DU of a reference node (100a). At 804, the method includes configuring, by a DU of at least one parent node (100b), a second resource configuration for a MT of a reference node (100a). At 806, the method includes detecting, by the reference node (100a), a transition between the MT and the DU across time slots at the reference node (100a). At 808, the method includes evaluating, by the reference node (100a), a required guard period for the transition. At 810, the method includes signaling, by the reference node (100a), the required guard period to the at least one parent node (100b). At 812, the method includes configuring, by the at least one parent node (100b), guard symbols based on the required guard period for transmission or reception at the MT of the reference node (100a) at start or end of the time slots.

Figure 9:
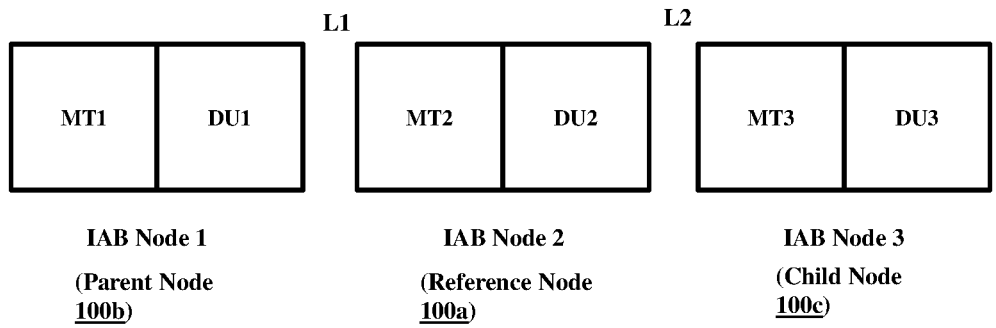
FIG. 9 illustrates the multi-hop IAB scenario involving 3 IAB nodes, where the donor node (IAB1: parent node) is connected to IAB node (IAB2: reference node), which is in turn connected to a child node (IAB3), according to an embodiment as disclosed herein.

FIG. 9 illustrates the multi-hop IAB scenario involving 3 IAB nodes (100), where the donor node (100d) (IAB1: parent node (100b)) is connected to IAB node (100) (IAB2: reference node (100a)), which is in turn connected to a child node (100c) (IAB3), according to an embodiment as disclosed herein.

Resource Allocation Rules in Multi-Hop IAB Scenario: IAB network (1000) that has multiple hops between the donor node (100d) and access UE is called a multi-hop network (1000). For e.g., a two-hop IAB scenario involving three IAB nodes (100) is illustrated in FIG. 9. The node IAB2 is considered as a reference node (100a). Therefore, IAB1 and IAB3 are parent node (100b) and child node (100c) of IAB2, respectively.

Figure 10:
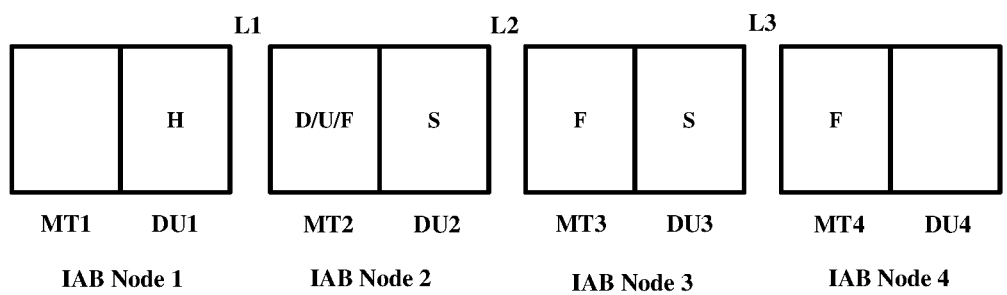
FIG. 10 illustrates a particular case in multi-hop IAB scenario, where a time resource is configured as soft for two consecutive IAB nodes, according to an embodiment as disclosed herein.

FIG. 10 illustrates a particular case in multi-hop IAB scenario, where a time resource is configured as soft for two consecutive IAB nodes (100), according to an embodiment as disclosed herein.

Rules for semi static resource allocation: Consider the following cases:

i. If DU2 is configured as hard, then:
   a. By definition, the resource is always available for link L2. Thus, the link L1 will not be active and DU1 will be NA.
   b. The MT3 will be configured depending on whether DU2 is DL/UL/F.
   c. If DU3 is configured as soft, the availability of soft resource for DU3 depends on the L2.
   d. If DU2 has some CSSC for transmission/reception, then the resource cannot be shared with child node (100c)`s DU3. Hence, DU3 will be NA. In the absence of any CSSC at DU2, the DU3 can be configured as soft, and DU2 can share the hard resource with child node (100c) whenever there is no data/reference signal to transmit/receive.

ii. If DU2 is configured as soft, then:
   a. The availability of soft resource depends on the back-haul link and it will be handled using dynamic signaling.
   b. MT2 can take any one of DL, UL and F, depending on the configuration of DU1.
   c. Since the link L2 is conditionally available, MT3 should not transmit/receive anything unless instructed by its parent node (100b). Therefore, MT3 is configured as F to avoid periodic transmission of UL reference signals or periodic reception of DL reference signals.
   d. DU3 cannot be configured as hard, as that leads to violation of TDM between parent and child links when L2 become active. However, configuring DU3 as soft also leads to certain limitations as shown in FIG. 10. Since DU3 is soft, its availability depends on the release of the resource by DU2, which in turn is controlled by DU1. However, the links L1 and L3 can be active simultaneously, as they belong to non-adjacent hops. Thus, allocation of soft resources for adjacent DUs results in resource wastage. Again, the permission to use the resource should bring down the hop, resulting in aggregated delay. Further, the wastage and the delay increase down the hops. Two solutions are proposed for avoiding this scenario:
       a) Allocate DU3 as NA, then DU4 can be allocated as hard and resource wastage can be avoided down the hops.
       b) DU3 is configured as soft and IAB3 is dynamically deriving the permission to use the resource.

iii. If DU2 is configured as NA, then:
   a. By definition link L2 is inactive, thus DU1 can be configured as hard.
   b. Since L2 is inactive, MT3 is configured as F to avoid transmission/reception of UL/DL reference signals.
   c. DU3 can be configured as hard.

The above observations are summarized in Table. 1 below,

TABLE 1

| Resource allocation pattern in multi-hop IAB | | | |
|---|---|---|---|
| MT1 | DL/UL/F | F | F |
| DU1 | NA | H | H |
| MT2 | F | DL/UL/F depending on DU1 configuration | DL/UL/F depending on DU1 configuration |
| DU2 | H | S | NA |
| MT3 | DL/UL/F depending on DU2 configuration | F | F |
| DU3 | S/NA | S/NA | H |

In an embodiment, conflicts in multi-hop IAB scenario are avoided by allocating the resources using following rules:

i. When the parent node (100b)'s DU is hard, the child node (100c)'s DU is configured as soft or NA.
ii. When the child node (100c)'s DU needs to be configured as hard, the parent node (100b)'s DU is NA.
iii. Configuration of the MT of the child node (100c) is in line with the configuration of parent node (100b)'s DU.

In another embodiment following rule is proposed to avoid resource wastage and incremental delay in multi-hop IAB scenario, where DU's in adjacent hops should not be allocated soft resource. Instead, allocate NA after first soft resource and allocate hard to the grandchild. Soft resource is any one of DL, UL and F resource.

In another embodiment strategy to improve energy efficiency is proposed, where child node (100c)`s MT is configured as F when parent node (100b)`s DU is soft/NA, to avoid transmission/reception of UL/DL reference signals. Soft resource is either a DL, UL or F resource.

Figure 11:
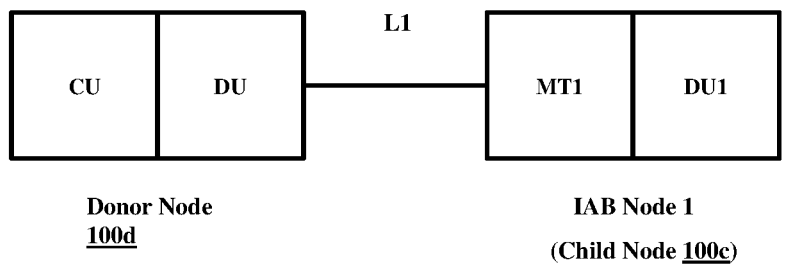
FIG. 11 illustrates a single hop IAB network, where a donor is serving one IAB child node which in turn serves access UEs, according to an embodiment as disclosed herein.

FIG. 11 illustrates a single hop IAB network (1000), where a donor is serving one IAB child node (100c) which in turn serves access UEs, according to an embodiment as disclosed herein.

The single-hop IAB scenario is a special case of multi-hop scenario and is presented in FIG. 11, where a donor node (100d) is serving one child node (100c). In TDM scenario where the parent link and child link are time multiplexed, if DU of the donor node (100d) is configured as hard, then link L1 is active and hence DU1 cannot be hard. Therefore, parent node (100b) and child node (100c)`s DU's cannot be hard at the same time. In other words, when parent node (100b)`s DU is configured as hard, the child node (100c)`s DU should be soft or NA. The configuration of child node (100c)`s MT should be in line with the parent node (100b)`s DU, for e.g., if parent node (100b)`s DU is hard-DL then MT1 should be configured as DL. Similarly, if a child node (100c)`s DU is configured as hard, then the parent node (100b)`s DU should be NA, in order to make the link L1 inactive.

Rules for dynamic resource allocation: In dynamic resource allocation, a parent node (100b) configures resources for its child node (100c). There are two aspects of dynamic resource allocation. In the first case parent node (100b) assigns DL/UL allocation for the F slots at the child nodes (100c). Indication of IA and INA for the soft resource of the child node (100c) is the second aspect of dynamic allocation, and it can be done in different ways like implicit and explicit.

In case of explicit signaling, parent node (100b) provides exclusive indication about the availability of the resource.

The signaling, which is used to indicate the availability of soft resource to child node (100c), will override the resource allocation of child node (100c)'s MT. The explicit signaling is possible only when parent node (100b) has a hard resource available with it, otherwise IAB node (100) must derive the information using implicit method. Consider the case when the parent node (100b)'s DU is configured as soft/NA and child node (100c)'s DU is soft. Since the parent node (100b)'s DU is soft, it cannot send any IA to the child node (100c) explicitly. Similarly, the parent node (100b)'s cannot send any scheduling grant to the MT as well. In the absence of scheduling grant at the MT, the DU will derive the availability of resource by implicit means. Similarly, the availability of soft resource is derived by the IAB-DU implicitly when the IAB-MT is not scheduled in DL and UL for data transmission/reception. Thus, implicit IA of the resource is derived by the child node (100c) by monitoring the control channel that carries scheduling information of DL and UL and is available only in the current slot. In other words, implicit IA is not possible for the future slot.

In an embodiment, the rules for explicit and implicit signaling of availability of soft resource are proposed:
i. The explicit signaling is possible only when parent node (100b) has a hard resource available with it and is for the current slot, aggregated slots or future slot.
ii. The signaling, which is used to indicate the availability of soft resource to child node (100c), will override the resource allocation of child node (100c)'s MT.
iii. The IA is derived by the IAB node (100) implicitly when the parent node (100b) is configured soft/NA and it will be available only for the current slot.
iv. Hard and soft resources can be any one of DL, UL and F resources.

In another embodiment, the strategy to avoid child node (100c)'s MT from transmitting periodic UL reference signal or receiving the periodic DL reference signal when parent node (100b)'s DU wanted to release the link to child node (100c)'s DU and is having periodic DL reference signal transmitting occasion/UL reference signal receiving occasion is presented, where parent node (100b)'s DU should signal explicit IA to child node (100c)'s MT.

In case the child node (100c)'s DU is configured as soft-UL, the child node (100c)'s DU should schedule the resource for its child nodes (100c) apriori, in order to account for the UL preparation time, so that the UL transmission can take place. If IA for the soft resource is received in the same slot, then DU cannot communicate with its child node (100c) and schedule the resource, as it is an UL slot. Thus, IA is required before hand in case of the soft-UL resource. Based on the above discussion, implicit indication cannot be available beforehand. Thus, only explicit signaling can be used for the IA of soft-UL slot at the child node (100c) and the location of Soft-UL slots at the child node (100c) should be known to the parent node (100b) beforehand. Explicit signaling should be for the current slot, aggregated slots or future slot.

In an embodiment, the slots where child node (100c)'s DU is configured as soft-UL should be known to parent node (100b)'s DU apriori, in order to provide the explicit signaling of availability in advance.

In another embodiment, the rules to indicate IA or INA for soft-UL resource is proposed:
i. The indication of availability of the resource is made in advance to account for the UL preparation time which depends on the capability of the IAB node (100).
ii. Explicit signaling is used.

If hard resource is available with the parent node (100b) then, it is used for communicating with the child node (100c), or can be shared with the child node (100c), if parent link is free. However, if child node (100c)'s DU is configured as NA, then child node (100c) cannot use the resource shared by parent node (100b). Hence, IA signaling from parent node (100b) is a not necessary when child node (100c)'s DU is configured as NA. Therefore, parent node (100b) should know the slots of child nodes (100c) which are configured as NA to avoid this situation.

In another embodiment, following rules are proposed to reduce unnecessary signaling overhead in dynamic signaling of IA or INA:
i. The parent node (100b) needs to know slots where child node (100c)'s DU is configured as NA.
ii. The parent node (100b) should not indicate availability of the resource to a child node (100c) who's DU is configured as NA.

The major points in dynamic signaling are summarized in Table. 2 given below:

TABLE 2

Dynamic Signaling in Multi-hop IAB

| | | Child node's DU | | |
|---|---|---|---|---|
| | | H | S | NA |
| Parent node (100b)'s DU | H | Both links active simultaneously. Conflict avoided by CU. | Ideal scenario. Parent node (100b) indicate IA/INA explicitly. | Ideal for SSB/RACH in parent node (100b). Leads to resource wastage when parent link is inactive |
| | S | Conflict should be avoided by CU/Parent node (100b) | Child node (100c) derives IA/INA implicitly. | Child node (100c) not use the resource even though it can derive IA implicitly. Thus, leads to resource wastage |
| | NA | Ideal for allocating hard to child node (100c) | Odd situation, as soft is not under the control of parent node (100b). Child node (100c) can derive IA implicitly. Create problem when child node (100c) DU is soft-UL. | Leads to resource wastage. Should be avoided by CU |

Figure 12:
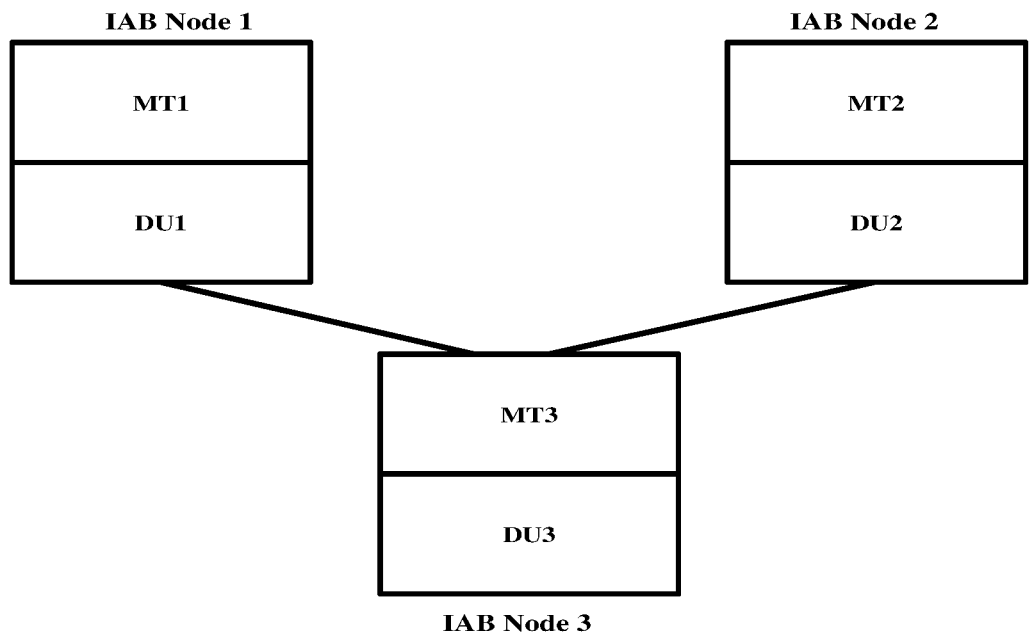
FIG. 12 illustrates a multi parent scenario, where one parent node acts as a backup used to serve the child node, when the link is failed between the child node and other parent node, according to an embodiment as disclosed herein.

FIG. 12 illustrates a multi parent scenario, where one parent node (100b) acts as a backup used to serve the child node (100c), when the link between the child node (100c) and other parent node (100b) fails, according to an embodiment as disclosed herein.

Resource Allocation Rules in Multi-Parent Scenario: In an embodiment, resource allocation for multi parent IAB scenario is considered, where the following rules are proposed:
i. If at least one parent node (100b)'s DU is hard, then:
  a. The child node (100c)'s DU can be active if the hard link is inactive, and thus DU3 can be configured soft.
  b. In case parent link is dedicated for CSSC transmission, then DU3 will be NA.
ii. If both parent node (100b)'s DU's are soft:
  a. Then the child node (100c)'s DU is configured NA, as allocating soft resource to DU's in adjacent hops lead to resource wastage.

iii. If one parent node (100b)'s DU is soft and the other one is NA, then:
  a. Child node (100c)'s MT is configured F, to avoid periodic reference signal transmission.
  b. Child node (100c)'s DU can be soft/NA.
iv. If both parent node (100b)'s DU's are NA:
  a. Then the child node (100c)'s DU can be configured as these points are summarized in Table. 3 below,

TABLE 3

Resource allocation in multi parent

| MT1 | F | F | DL/UL/F depending on parent node (100b) of MT1 | DL/UL/F depending on parent node (100b) of MT1 | DL/UL/F depending on parent node (100b) of MT1 |
|---|---|---|---|---|---|
| DU1 | H | H | S | S | NA |
| MT2 | F | DL/UL/F depending on parent node (100b) of MT2 | DL/UL/F depending on parent node (100b) of MT2 | DL/UL/F depending on parent node (100b) of MT2 | DL/UL/F depending on parent node (100b) of MT2 |
| DU2 | H | S | S | NA | NA |
| MT3 | DL/UL/F depending on DU1/DU2 configuration | DL/UL/F depending on DU1 configuration | F | F | F |
| DU3 | NA/S | NA/S | NA | NA/S | H |

Figure 13:
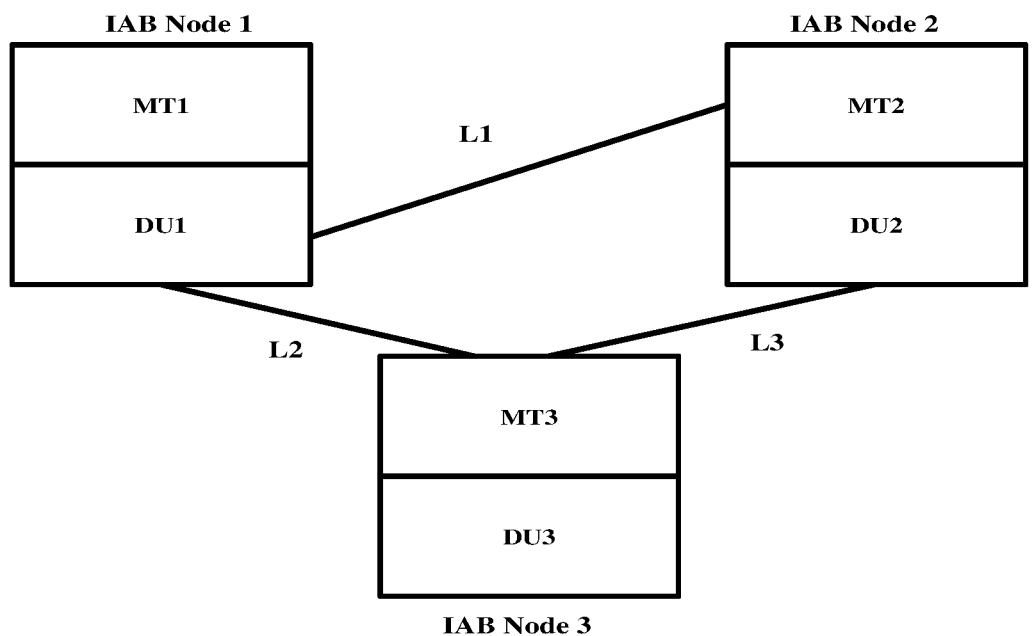
FIG. 13 illustrates a mesh topology in an IAB network where any IAB node may have multiple parents and/or multiple children, according to an embodiment as disclosed herein.

FIG. 13 illustrates a mesh topology in an IAB network (1000) where any IAB node (100) may have multiple parents and/or multiple children, according to an embodiment as disclosed herein.

Resource Allocation Rules in Mesh Topology of IAB nodes (100): In mesh topology all the IAB nodes (100) are interconnected to each other as shown in FIG. 13 below. In this case priority order need to be assigned for different nodes in order to assign resources. Here, IAB1 is considered to have highest priority followed by IAB2 and then IAB3.

In an embodiment, resource allocation for mesh topology is considered, where the following rules are proposed:
 i. If DU1 is configured hard and it doesn't have any cell specific signal and channel (CSSC) for transmission, then:
   a. Link L3 will be conditionally available under the control of IAB1 and DU2 is soft.
   b. Soft resource for DU2 implies DU3 is NA.
 ii. If DU1 is configured hard and it has some CSSC for transmission, then:
   a. Both DU2 and DU3 is configured as NA.
 iii. If DU1 is configured as soft, then:
   a. Both MT2 and MT3 is configured as F to avoid periodic reference signal transmissions.
   b. DU2 and DU3 is configured as NA.
 iv. If DU1 is configured as NA, then:
   a. DU2 is assigned with hard resource as IAB2 is having higher priority over IAB3.
   b. DU3 is assigned with soft/NA configuration depending on the type of signal (cell specific signal and channel (CSSC) or not) scheduled in the hard resource at DU2.

TABLE 4

Resource allocation when IAB nodes (100) in mesh topology

| MT1 | F | DL/UL/F depending on parent node (100b) of MT1 | DL/UL/F depending on parent node (100b) of MT1 |
|---|---|---|---|
| DU1 | H | S | NA |
| MT2 | DL/UL/F depending on DU1 | F | F |
| DU2 | NA/S | NA | H |
| MT3 | DL/UL/F depending on DU1 configuration | F | DL/UL/F depending on DU2 configuration |
| DU3 | NA | NA | NA/S soft when DU2 is free |

Figure 14:
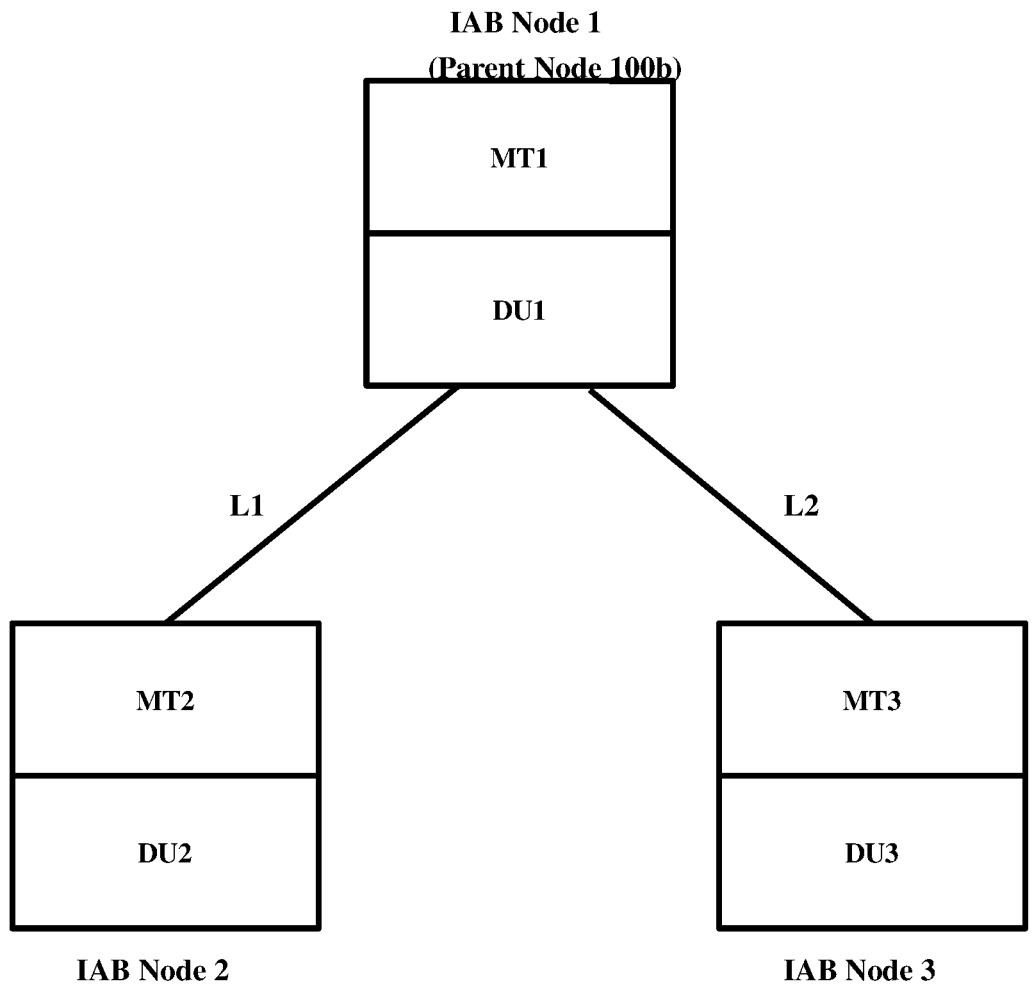
FIG. 14 illustrates a parent node serving multiple child nodes, according to an embodiment as disclosed herein.

The resource allocation pattern in mesh connected IAB network (1000) is summarized in Table. 4 below:

FIG. 14 illustrates a parent node (100b) serving multiple child nodes (100c), according to an embodiment as disclosed herein.

Resource Allocation Rules in Multi-Child Scenario: In multi-child scenario, a single parent node (100b) is serving more than one IAB node (100), as shown in FIG. 14. The resource allocation can be per-child link and per-DU type. In per-DU, same configuration is given to all the child nodes (100c), whereas in per-child link independent configuration is assigned for each child node (100c).

Per-DU Resource Allocation: In per-DU case, the parent node (100b)'s DU configuration is common for all the children. In FIG. 8, if DU1 is configured as hard and has data for transmitting to both the children, then both MT2 and MT3 will be configured accordingly. Both DU2 and DU3 should be NA or soft at the same time to avoid simultaneous transmissions in parent and child links. If DU1 is configured as hard and has data for transmitting to either of the two children, say IAB2, then the MT2 should be configured DL/UL/F according to DU1, and NA or soft with INA should be assigned to DU2. Even though link L2 is free, the resource cannot be assigned to DU3 as the configuration of the parent node (100b)'s DU is common for both children. Thus, DU3 should be NA or soft. Therefore, in per-DU allocation the resource cannot be shared with the child node (100c), even if it is not used in the parent link and thus, leads to resource wastage. Again, the IA/INA are common for all the children. Further, both child node (100c)'s DU's can be configured as NA when parent node (100b)'s DU is soft, and hard when parent node (100b)'s DU is NA.

Per-child link resource allocation: In per-child link independent allocation is given for different child links. In FIG. 14, if DU1 is configured as hard for both the children, then both MT2 and MT3 should be configured according to DU1 and, DU2 and DU3 should be soft/NA. If either of the two links, L1 or L2, is free then the resource can be shared with the corresponding DU, i.e., if parent node (100b) is serving only IAB2 and L2 is free, then parent node (100b) can share the resource with DU3.

If DU1 is configured as hard for child 1 and soft for child 2, then MT2 will DL/UL/F according to the type of hard resource at DU1, whereas the MT3 will be F. If the resource available for L1 is free, then it can be shared with the soft DU associated with link L2 and DU2. Thus, link L2 and child link of IAB2 will be active simultaneously in that scenario. Similar situation occurs when DU1 is hard for child 2 and soft for child 1.

When DU1 is soft for both child node (100c)'s then MT2 and MT3 will be F. Both DU2 and DU3 should be NA to avoid resource wastage, as discussed previously. If DU1 is NA for any child node (100c), then that child node (100c)'s MT should be F, and that DU should be hard.

In an embodiment, in case of per-DU resource allocation, same resource allocation strategy is configured for all the child nodes (100c), leading to resource wastage.

In another embodiment, the dynamic signaling of IA/INA will be group specific for per-DU resource allocation.

In another embodiment, per-child link resource allocation is considered, where the resource allocation strategy is different for different child link.

In another embodiment, the dynamic signaling of IA/INA will be node specific for per-DU resource allocation.

Child Configuration needed at the Parent Side: The semi-static allocation is done by the CU at the donor node (100d), and the dynamic allocation is performed by the parent node (100b) on top of that. For dynamic signaling, parent node (100b) should have information about the configuration of the child node (100c) and is provided by the CU through F1-AP signaling. If all the slot information of the child node (100c) is known at the parent node (100b), then many of the conflicts can be avoided by that parent node (100b) itself, but at the cost of huge signaling overhead over F1-AP interface. On the contrary if parent node (100b) is unaware of the child node (100c) configuration, then there will be unnecessary signaling, which leads to resource wastage.

In an embodiment, usefulness of knowledge of child node (100c)'s resource allocation at the parent node (100b) is considered, where in the following conditions are proposed.

i. If parent node (100b) knows hard resources of child node (100c) following can be done to avoid conflicts and resource wastage.
   a. Parent link won't communicate to child node (100c) irrespective of its slot configuration.
   b. Parent node (100b) won't schedule the child node (100c)'s MT in those slots.
ii. If parent node (100b) knows soft resources of child node (100c), following will be done to avoid conflicts and resource wastage.
   a. Parent node (100b) shares the unused resource with that child node (100c).
   b. If child node (100c)'s DU is soft-UL, then parent node (100b) provides advance explicit signaling to use the resource.
iii. If parent node (100b) knows NA slots of child node (100c), then it will not share the unused resource with the child node (100c) through explicit signaling, as the child link is inactive and that avoids the resource wastage.

In another embodiment, the parent node (100b) will derive the location of hard and NA slots in child node (100c)'s DU implicitly, where, it can be inferred that parent node (100b)'s DU is NA when child node (100c)'s DU is hard, and parent node (100b)'s DU is hard with some cell specific signal and channel (CSSC) for Tx/Rx when child node (100c)'s DU is NA. Once location of hard and NA slots of child node (100c)'s DU are known, the location of soft slots is derived by the parent node (100b) and advance signaling of IA/INA is provided. Hard and soft can be any one of DL, UL and F resource.

In another embodiment, the parent node (100b) is informed by CU about the soft resources and the direction of the soft resources at the child node (100c)'s DU. The direction is any one of DL and UL.

In another embodiment, the parent node (100b) is informed by CU about the hard resources and the direction of the hard resources at the child node (100c)'s DU. The direction is any one of DL and UL.

In another embodiment, the parent node (100b) is informed by CU about the NA resources at the child node (100c)'s DU, in order to avoid explicit IA/INA signaling from parent node (100b)'s DU.

In another embodiment, the parent node (100b) is informed by CU about the configuration of cell specific signal and channel (CSSC) at the child node (100c)'s DU, in order to avoid parent node (100b)'s DU from scheduling child node (100c)'s MT. The configuration includes location, periodicity and duration etc.

Figure 15:
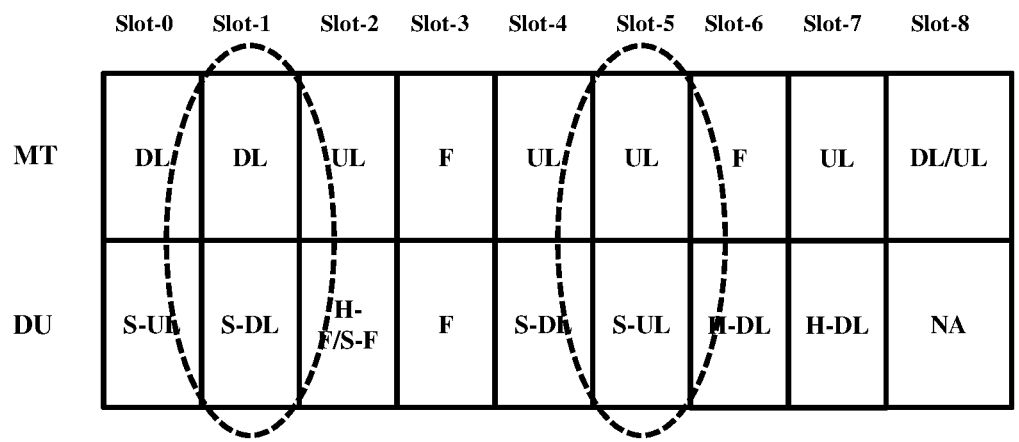
FIG. 15 illustrates a various resource allocation patterns in an IAB node, according to an embodiment as disclosed herein.

FIG. 15 illustrates a various resource allocation patterns in an IAB node (100) with STxDM/SRxDM, according to an embodiment as disclosed herein.

In slot 1, both MT and DU are configured as DL which means that IAB node (100) should receive in the backhaul link and transmit in the access/child link. This configuration violates the HD constraint. Hence, node should operate in TDM even if it has simultaneous Tx/simultaneous Rx capability. Either backhaul or access/child link will be active depending on the hard/soft configuration of its DU. In FIG. 15, the resource allocation satisfies HD constraint in slot 0, slot 4 and slot 7. In slot 0 both MT and DU are configured as DL and UL, respectively. Thus, the IAB node (100) can receive in both backhaul and child/access links in slot 0, if the node has SRxDM capability. Similarly, simultaneous Tx is possible only in slot 4 and slot 7 if the IAB node (100) has STxDM capability, as the MT and DU of the IAB node (100) is configured as UL and DL, respectively. In all other slots the IAB node (100) will work in TDM mode. Further, the activation of simultaneous Tx/simultaneous Rx mode in an IAB node (100) is subject to Tx/Rx capability of the DU of its parent node (100b) and MT of its child node (100c). For example, if parent node (100b) support TDM and its DU is configured NA/soft without IA, then the IAB node (100) cannot Tx/Rx in backhaul link even though it has simultaneous Tx/simultaneous Rx capability and its resource allocation meet HD constraint. Similarly, is the case when child node (100c) follows TDM and has its DU configured as hard. In that case, the MT of the child node (100c) cannot Tx/Rx data/control signals, and thus, the IAB node (100) cannot Tx/Rx in the child/access link. Therefore, the STxDM/SRxDM of an IAB node (100) will be active only when the resource allocation of MT and DU of the IAB node (100) satisfy HD constraint, and the resource allocation of DU of the parent node (100b) and MT of the child nodes (100c) are such that both MT of parent node (100b) and DU of child node (100c) are able to Tx/Rx data/control signals.

The simultaneous Tx/simultaneous Rx mode of operation of an IAB node (100) increases the net throughput in the system, as both backhaul, and child/access links will be active simultaneously. Similarly, FD mode of operation reduces the latency in multi-hop scenario because of the simultaneous Tx and Rx capability. However, there is associated increase in the interference level in both cases, as transmission in one frequency/beam interferes with another frequency/beam at the IAB node (100). Thus, to minimize interference, the IAB node (100) with STxDM/SRxDM/FD capability should work in TDM mode when the system is lightly loaded.

The CU of the donor node (100d) should take care of all the above factors in assigning semi-static configuration to IAB nodes (100). For maximizing the throughput of the system in heavy loaded situation, the CU of the donor node (100d) should allocate resources to IAB nodes (100) in such a way that STxDM/SRxDM/FD mode is active at maximum possible IAB nodes (100) in the network (1000). Again, in case of reduced load, the resource allocation should be in such a way that the nodes with STxDM/SRxDM/FD capability will switch to TDM mode of operation to minimize the interference.

In an embodiment, the CU of the donor node (100d) semi-statically allocates the resources to IAB nodes (100) in the network (1000) based on at least one of the capabilities of an IAB node (100), traffic load at an IAB node (100) and interference level at an IAB node (100) among a set of IAB nodes (100).

In an embodiment, an IAB node (100) informs the CU of the donor node (100d) about its capabilities and the numerology followed in DU link through F1-AP signaling.

In an embodiment, the FD, STxDM, and SRxDM mode are activated in an IAB node (100) based on at least one of capability and configuration of its parent node (100b) and child node (100c).

In another embodiment, the FD mode is activated at an IAB node (100) when DU of the parent node (100b) configured as one of DL Tx and UL Rx and, MT of child node (100c) configured as one of DL Rx and UL Tx are active.

In another embodiment, the STxDM is activated at an IAB node (100) when the DU of the parent node (100b) configured as UL Rx and, one of access UE and MT of child node (100c) configured as DL Rx are active.

In another embodiment, the SRxDM is activated at an IAB node (100) when the DU of the parent node (100b) configured as DL Tx and one of access UE and MT of child node (100c) configured as UL Tx are active.

Consider a scenario in which full duplex/STxDM/SRxDM mode is active in an IAB node (100). In that case, both backhaul, and child/access links will be simultaneously active irrespective of the H/S flavor of its DU resource. Therefore, signaling of H/S resource is not required when full duplex/simultaneous Tx/simultaneous Rx mode is active in an IAB node (100). Thus, the CU of the donor node (100d) with knowledge of capabilities and configuration of all the nodes in the network (1000) should be aware of the time instants in which full duplex/STxDM/SRxDM mode is active in an IAB node (100) and should not signal H/S/NA resources. In other words, the CU of the donor node (100d) should signal H/S/NA for the following nodes:
  i. Nodes with TDM capability.
  ii. Nodes with STxDM and/or SRxDM when HD constraint is not met.

In an embodiment, the CU signals one of H, S and NA resources to DU of the IAB nodes (100) with at least one of TDM capability and HD constraint is not met for at least one of STxDM and SRxDM, where the CU of the donor node (100d) will evaluate the time instants at which one of FD, STxDM and SRxDM mode is active in an IAB node (100) using the knowledge of the capability and resource configuration of all the IAB nodes (100) in the network (1000).

Consider another scenario in which CU of the donor node (100d) is unable to find the instants at which full duplex/STxDM/SRxDM mode is active at an IAB node (100). In this case, the CU of the donor node (100d) signals H/S/NA resources to the IAB node (100). The following scenarios are considered:
  i. The IAB node (100) with FD capability should use the resource (i.e., DL/UL/F) allocated to DU, subject to capability and resource configuration of DU of its child node (100c). For e.g., if DU of an IAB node (100) with FD capability is configured as soft-DL and DU of its child node (100c) with STxDM/SRxDM capability is configured as UL, then IAB node (100) can transmit in the child link despite its soft flavor. However, if the child node (100c) has TDM capability and its DU is configured as hard-UL, then IAB node (100) cannot transmit in child link, as MT of the child node (100c) is not active.
  ii. The IAB node (100) with STxDM/SRxDM capability should use the resource subject to HD constraint and Tx/Rx capability of the IAB node (100) and its child node (100c). For e.g., consider DU of an IAB node (100) with STxDM capability is configured as soft-DL and DU of its child node (100c) with SRxDM capability is configured as hard-UL, then the IAB node (100) can transmit in the child link, despite its soft flavor. However, if child node (100c) has only TDM capability or its DU is configured as hard-DL, then MT of the child node (100c) cannot Tx/Rx data/control signals and hence, the IAB node (100) cannot Tx/Rx in its child link.

In another embodiment, IAB node (100) with FD capability decides to use the DU resource based on at least one of the capabilities and resource configuration of DU of its child node (100c).

In another embodiment, IAB node (100) with STxDM capability, and the MT and DU are configured as UL and S-DL, respectively, then the DU of the IAB node (100) treats the S-DL as H-DL, subject to capability and resource configuration of its child node (100c).

In another embodiment, IAB node (100) with SRxDM capability, and the MT and DU are configured as DL and S-UL, respectively, then the DU of the IAB node (100) treats the S-UL as H-UL, subject to capability and resource configuration of its child node (100c).

The usage of soft resources of DU needs indication from the parent node (100b). This needs additional signaling from the parent node (100b). The slot format indicator (SFI) that is used to configure the flexible resources can also be used as a means to indicate IA/INA. This necessitates that MT resources to be configured as F whenever the DU resources are configured as S.

If the DU resource is configured as NA, then the resource will not be used for Tx/Rx in child/access link. It is not required to satisfy HD constraint for those resources even for STxDM/SRxDM modes. Therefore, MT can be configured as DL/UL based on the traffic load. This is possible only if MT is configured as F in semi static signaling. Configuration of F as DL/UL can be done dynamically using slot format indicator. This provides flexibility in configuration based on load.

In an embodiment, the parent node (100b) configures MT resources of an IAB node (100) as F if the corresponding DU resources of the IAB node (100) is configured as at least one of S and NA. The parent node (100b) uses the RRC signalling to semi-statically configure the MT resources of the IAB node (100).

Figure 16:
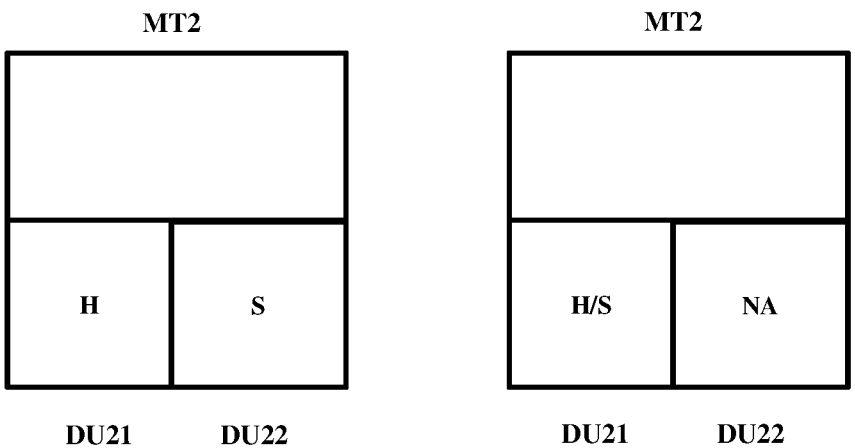
FIG. 16 illustrates the need for reference numerology in semi-static allocation of H/S/NA resources, according to an embodiment as disclosed herein.

FIG. 16 illustrates the need for reference numerology in semi-static allocation of H/S/NA resources, according to an embodiment as disclosed herein.

Notation 'a' indicates that, the slots DU21 and DU22 are configured as hard and soft, respectively. A slot corresponding to DU configured as H implies only DU can use the resource and the MT of the IAB node (100) is inactive for the entire slot duration. This necessitates that the parent node (100b)'s DU is H for the entire slot duration of MT. If other DU slots are configured as soft, then explicit signalling of IA/INA is not possible as the parent node (100*b*)'s DU is configured as NA, and the implicit signalling leads to additional latency. Configuring one slot as NA along with H/S, as in Notation 'b', results in resource wastage. When DU21 is H, it implies that MT2 is inactive for the entire MT slot duration. If DU22 is configured as NA, then both MT2 and DU22 will be inactive at the same time, leading to resource wastage.

Similarly, Notation 'b' indicates that, configuring at least one slot of DU as S implies, the IAB node (100) can use both DU21 and DU22 if backhaul link is free. However, the DU cannot utilize the slot DU22 as it is configured as NA. Hence, both MT2 and DU22 will not be active at the same time in the IAB node (100), leading to resource wastage. Therefore, to avoid resource wastage and increase latency in an IAB node (100) with DU following higher numerology compared to MT, all the DU slots within the MT slot duration should be configured as either H, S, or NA, not a combination of the above. In other words, the allocation of H/S/NA in an IAB node (100), with DU following higher numerology compared to MT, should be based lowest numerology as reference.

Figure 17:
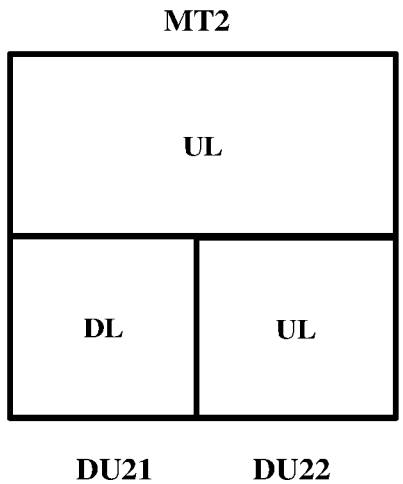
FIG. 17 illustrates a various scenarios where resource allocation violates HD constraint in IAB nodes with different numerologies in MT and DU, according to an embodiment as disclosed herein.
Figure 17:
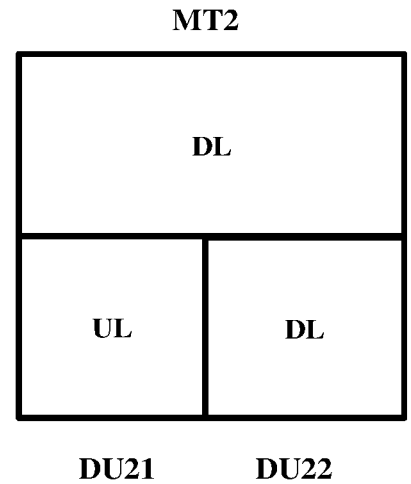
Figure 17:
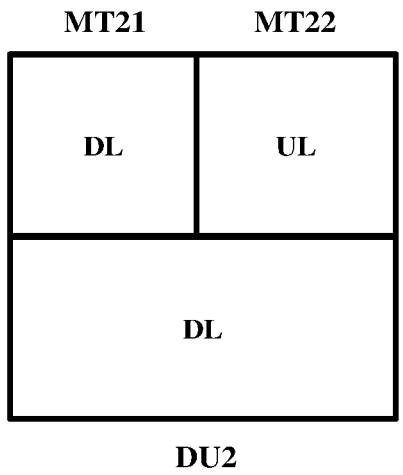
Figure 17:
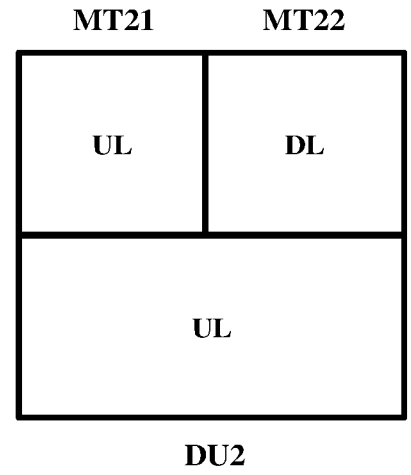

FIG. 17 illustrates a various scenarios where resource allocation violates HD constraint in IAB nodes (100) with different numerologies in MT and DU, according to an embodiment as disclosed herein.

FIG. 17 illustrates the scenario, where an IAB node (100), with any one of STxDM and SRxDM capability and, MT and DU with different numerologies, is semi-statically configured with resources (i.e., DL/UL/F) such that HD constraint is violated in at least in one slot of MT or DU, according to an embodiment as disclosed herein. In FIG. 17 notation 'a', the IAB node (100) with STxDM capability, and DU with higher numerology than MT is semi-statically configured with resources such that HD constraint is violated in DU22. The DU22 is configured as UL-Rx while the MT2 is in UL-Tx mode.

Similarly, resource allocation violating HD constraint in an IAB node (100) with simultaneous Rx capability is illustrated in FIG. 17 notation 'b'.

Violation of HD constraint in an IAB node (100) with MT having higher numerology compared to DU is presented in FIG. 17 notation 'c' and FIG. 17 notation 'd'. In that scenario, it is the internal decision of IAB node (100) to choose anyone of the following alternatives:
  i. The IAB node (100) will simultaneously Tx/simultaneously Rx in those portions of MT and DU slots where the HD constraint is satisfied.
  ii. The IAB node (100) will switch to TDM mode and Tx/Rx in MT or DU.

However, in both cases, there is reduction in resource utilization as at least one slot in MT or DU should be left as blank. To avoid this reduction in resource utilization, the CU of the donor node (100*d*) should be informed about the capability of the IAB node (100) and the numerology followed by MT and DU, so that the CU of the donor node (100*d*) can allocate resources to MT and DU satisfying the HD constraint. For e.g., in FIG. 17 notation 'a', both DU21 and DU22 should be configured as DL so that node can perform simultaneous Tx in all the slots. Thus, the allocation of DL/UL/F resources should be based on reference numerology, and the reference numerology corresponds to the lowest among all the configured numerologies.

In an embodiment, the semi-static allocation of one of DL, UL and F for an IAB node (100) is based on a reference numerology. The reference numerology corresponds to the lowest among all the configured numerologies of the at least one of FR1 carrier and FR2 carrier in the network (1000). Here, the configuration of one of DL, UL and F is one of H, S and NA.

In another embodiment, when the resource allocation violates HD constraint in an IAB node (100) with one of STxDM and SRxDM, the IAB node (100) is switched to TDM mode.

In another embodiment, when the resource allocation violates HD constraint in an IAB node (100) with one of STxDM and SRxDM, the IAB node (100) performs one of simultaneously Tx and simultaneously Rx in those portions of MT and DU slots where the HD constraint is satisfied.

Dynamic resource allocation includes the following aspects:
  i. Configuration of the 'F' resource at MT of the IAB node (100) by the parent node (100*b*).
  ii. Configuration of the 'F' resource at the DU of the IAB node (100) by the scheduler at the IAB node (100).
  iii. The IA/INA signaling for the soft resource at DU from the parent node (100*b*).

Like the semi-static case, the dynamic signaling should take care of various factors to improve the overall throughput and latency of the system, especially in multi-hop scenario with varying node capabilities. Various issues associated in dynamic resource allocation along with possible solutions.

The scheduler at the IAB node (100) dynamically configures the F resource at DU of the IAB node (100) based on its capability as explained below.
  i. For an IAB node (100) with only TDM capability, the F resource at the DU of an IAB node (100) should be assigned configuration (i.e., DL/UL) based on at least one of the following conditions:
    a. Configuration of MT of the IAB node (100).
    b. Tx/Rx occasion of cell specific signal and channel (CSSC) at the DU of the IAB node (100).
    c. Capability of the child node (100*c*).
    d. Semi static configuration of the DU of its child node (100*c*).
    e. Traffic conditions at the node.
  ii. For an IAB node (100) with STxDM/SRxDM capability, the F resource at the DU of an IAB node (100) should be assigned configuration (i.e., DL/UL) based on at least one of the following conditions:
    a. Configuration of MT of the IAB node (100) such that HD constraint is met at the IAB node (100).
    b. Tx/Rx occasion of cell specific signal and channel (CSSC) at the DU of the IAB node (100).
    c. Capability of its child node (100*c*).
    d. Semi-static configuration of the DU of its child node (100*c*).
    e. Traffic conditions at the node.

For e.g., in FIG. 15, the F resource at the DU in slot 2 should be configured as DL irrespective of its H/S flavor for maintaining HD constraint at the IAB node (100). Again, it enables simultaneous Tx in backhaul and child/access links if IAB node (100) has STxDM capability.
  i. For an IAB node (100) with FD capability, the F resource at DU can be assigned DL/UL configuration irrespective of its H/S flavor and the MT configuration. However, the configuration of DU should meet the capability of the child node (100*c*).

In an embodiment, an IAB node (100) informs the parent node (100*b*) about its capabilities and the numerology followed in its DU link through RRC signaling, where capability includes at least one of the FD, STxDM, SRxDM and TDM.

In an embodiment, the F resource at DU of an IAB node (100) with TDM capability is configured as DL when at least one of the following conditions occur:
  i. DU of an IAB node (100) is configured as one of H and soft with IA and has one of data and control signal to Tx in one of child and access link.
  ii. DU of an IAB node (100) is configured to Tx CSSC in one of child and access links.
  iii. MT of the IAB node (100) is configured as F.
  iv. MT of the IAB node (100) is not configured for one of Tx and Rx of CSSC.
  v. DU of the child node (100*c*) with TDM capability is configured as one of NA and soft without IA.
  vi. DU of the child node (100*c*) with one of TDM and STxDM capability is not configured to receive CSSC.
  vii. DU of the child node (100*c*) with one of TDM and SRxDM capability is not configured to transmit CSSC.
  viii. SRxDM capability at the child node (100*c*) is active.
  ix. Child node (100*c*) with FD capability.

In an embodiment, the F resource at DU of an IAB node (100) with TDM capability is configured as UL when at least one of the following conditions occur:
  i. DU of an IAB node (100) is configured as one of H and soft with IA and has one of data and control signal to Rx in one of child and access link.
  ii. DU of an IAB node (100) is configured to Rx CSSC in one of child and access links.
  iii. MT of the IAB node (100) is configured as F.
  iv. MT of the IAB node (100) is not configured to one of Tx and Rx CSSC.
  v. DU of the child node (100*c*) with TDM capability is configured as one of NA and soft without IA.
  vi. DU of the child node (100*c*) with one of TDM and STxDM capability is not configured to receive CSSC.
  vii. DU of the child node (100*c*) with one of TDM and SRxDM capability is not configured to transmit CSSC.
  viii. STxDM capability at the child node (100*c*) is active.
  ix. Child node (100*c*) with FD capability.

In an embodiment, the F resource at DU of an IAB node (100) with STxDM capability is configured as DL when at least one of the following conditions occur:
  i. DU of an IAB node (100) is configured to Tx CSSC in one of child and access links.
  ii. MT of the IAB node (100) is configured to Tx one of data, control and CSSC.
  iii. DU of the child node (100*c*) with TDM capability is configured as one of NA and soft without IA.
  iv. DU of the child node (100*c*) with one of TDM and STxDM capability is not configured to receive CSSC.
  v. DU of the child node (100*c*) with one of TDM and SRxDM capability is not configured to transmit CSSC.
  vi. Child node (100*c*) with FD capability.
  vii. SRxDM capability is active at the child node (100*c*).

In an embodiment, the F resource at DU of an IAB node (100) with STxDM capability is configured as UL when at least one of the following conditions occur:
  i. DU of an IAB node (100) is configured to Rx CSSC in one of child and access links.
  ii. MT of the IAB node (100) is configured as F.
  iii. MT of the IAB node (100) is not configured to one of Tx and Rx CSSC.
  iv. DU of the child node (100*c*) with TDM capability is configured as one of NA and soft without IA.
  v. DU of the child node (100*c*) with one of TDM and STxDM capability is not configured to receive CSSC.
  vi. DU of the child node (100*c*) with one of TDM and SRxDM capability is not configured to transmit CSSC.
  vii. Child node (100*c*) with FD capability.
  viii. STxDM capability is active at the child node (100*c*).

In an embodiment, the F resource at DU of an IAB node (100) with SRxDM capability is configured as DL when at least one of the following conditions occur:
  i. DU of an IAB node (100) is configured to Tx CSSC in one of child and access links.
  ii. MT of the IAB node (100) is configured as F.
  iii. MT of the IAB node (100) is not configured to one of Tx and Rx CSSC.
  iv. DU of the child node (100*c*) with TDM capability is configured as one of NA and soft without IA.
  v. DU of the child node (100*c*) with one of TDM and STxDM capability is not configured to receive CSSC.
  vi. DU of the child node (100*c*) with one of TDM and SRxDM capability is not configured to transmit CSSC.
  vii. Child node (100*c*) with FD capability.
  viii. SRxDM capability is active at the child node (100*c*).

In an embodiment, the F resource at DU of an IAB node (100) with SRxDM capability is configured as UL when at least one of the following conditions occur:
  i. DU of an IAB node (100) is configured to Rx CSSC in one of child and access links.
  ii. MT of the IAB node (100) is configured to Rx one of data, control and CSSC.
  iii. DU of the child node (100*c*) with TDM capability is configured as one of NA and soft without IA.
  iv. DU of the child node (100*c*) with one of TDM and STxDM capability is not configured to receive CSSC.
  v. DU of the child node (100*c*) with one of TDM and SRxDM capability is not configured to transmit CSSC.
  vi. Child node (100*c*) with FD capability.
  vii. STxDM capability is active at the child node (100*c*).

In an embodiment, the F resource at DU of an IAB node (100) with FD capability is configured as DL when at least one of the following conditions occur:
  i. DU of an IAB node (100) is configured to Tx one of data, control signal and CSSC in one of child and access links.
  ii. DU of the child node (100*c*) with TDM capability is configured as one of NA and soft without IA.
  iii. DU of the child node (100*c*) with one of TDM and STxDM is not configured to receive CSSC.
  iv. DU of the child node (100*c*) with one of TDM and SRxDM is not configured to transmit CSSC.
  v. Child node (100*c*) with FD capability.
  vi. SRxDM capability is active at the child node (100*c*).

In an embodiment, the F resource at DU of an IAB node (100) with FD capability is configured as UL when at least one of the following conditions occur:
  i. DU of an IAB node (100) is configured to Rx one of data, control signal and CSSC in one of child and access links.
  ii. DU of the child node (100*c*) with TDM capability is configured as one of NA and soft without IA.
  iii. DU of the child node (100*c*) with one of TDM and STxDM is not configured to receive CSSC.
  iv. DU of the child node (100*c*) with one of TDM and SRxDM is not configured to transmit CSSC.
  v. Child node (100*c*) with FD capability.
  vi. STxDM capability is active at the child node (100*c*).

The configuration for the F resource at MT of an IAB node (100) is done by its parent node (100*b*).

i. For an IAB node (100) with only TDM capability, the configuration of the 'F' resource at MT should be based on at least one of (a) configuration of DU of the parent node (100*b*), (b) configuration of DU of the IAB node (100), and (c) Tx/Rx occasion of cell specific signal and channel (CSSC) at the DU of the parent node (100*b*) and IAB node (100).

ii. For an IAB node (100) with STxDM/SRxDM capability, the configuration of the 'F' resource at MT should be based on at least one of (a) HD constraint at the IAB node (100), (b) configuration of DU of the parent node (100*b*) and IAB node (100), and (c) Tx/Rx occasion of cell specific signal and channel (CSSC) at the DU of the parent node (100*b*) and IAB node (100). For e.g., in FIG. 15 the parent node (100*b*) should configure the F resource in slot 6 as UL for maintaining the HD constraint. This configuration allows simultaneous Tx in backhaul and child/access links if the IAB node (100) supports corresponding timing.

iii. For an IAB node (100) with FD capability, the F resource at MT should be configured irrespective of the DU configuration, as the node can perform simultaneous Tx and Rx. Thus, the parent node (100*b*) need not be aware of the configuration of DU of the IAB node (100).

In an embodiment, the F resource at MT of an IAB node (100) with TDM capability is configured as DL when at least one of the following conditions occur:
  i. MT of the IAB node (100) is configured to Rx one of data, control and CSSC.
  ii. DU of an IAB node (100) is configured as one of NA and soft without IA.
  iii. DU of IAB node (100) is not configured to one of Tx and Rx CSSC in one of child and access links.
  iv. DU of the parent node (100*b*) with TDM capability is configured as one of H-DL and S-DL with IA.
  v. STxDM capability is active at the parent node (100*b*).
  vi. Parent node (100*b*) with FD capability.
  vii. DU of the child node (100*c*) with TDM capability is configured as one of H and S with IA.
  viii. DU of the child node (100*c*) with TDM capability is configured to one of Tx and Rx CSSC.
  ix. DU of the child node (100*c*) with STxDM is configured to receive CSSC.
  x. DU of the child node (100*c*) with SRxDM is configured to transmit CSSC.
  xi. Child node (100*c*) without FD capability.

In an embodiment, the F resource at MT of an IAB node (100) with TDM capability is configured as UL when at least one of the following conditions occur:
  i. MT of the IAB node (100) is configured to Tx one of data, control and CSSC.
  ii. DU of an IAB node (100) is configured as one of NA and soft without IA.
  iii. DU of IAB node (100) is not configured to one of Tx and Rx CSSC in one of child and access links.
  iv. DU of the parent node (100*b*) with TDM capability is configured as one of H-UL and S-UL with IA.
  v. SRxDM capability is active at the parent node (100*b*).
  vi. Parent node (100*b*) with FD capability.
  vii. DU of the child node (100*c*) with TDM capability is configured as one of H and S with IA.
  viii. DU of the child node (100*c*) with TDM capability is configured to one of Tx and Rx CSSC.
  ix. DU of the child node (100*c*) with STxDM is configured to receive CSSC.
  x. DU of the child node (100*c*) with SRxDM is configured to transmit CSSC.
  xi. Child node (100*c*) without FD capability.

In an embodiment, the F resource at MT of an IAB node (100) with STxDM capability is configured as DL when at least one of the following conditions occur:
  i. MT of the IAB node (100) is configured to Rx one of data, control and CSSC.
  ii. DU of IAB node (100) is not configured to one of Tx and Rx CSSC in one of child and access links.
  iii. DU of the parent node (100*b*) with TDM capability is configured as one of H-DL and S-DL with IA.
  iv. DU of the parent node (100*b*) with one of FD capability and STxDM is configured as DL.
  v. DU of the parent node (100*b*) with SRxDM is configured as DL and MT is not active.
  vi. DU of the child node (100*c*) with TDM capability is configured as one of H and S with IA.
  vii. DU of the child node (100*c*) with TDM capability is configured to one of Tx and Rx CSSC.
  viii. DU of the child node (100*c*) with STxDM is configured to receive CSSC.
  ix. DU of the child node (100*c*) with SRxDM is configured to transmit CSSC.
  x. Child node (100*c*) without FD capability.

In an embodiment, the F resource at MT of an IAB node (100) with STxDM capability is configured as UL when at least one of the following conditions occur:
  i. MT of the IAB node (100) is configured to Tx one of data, control and CSSC.
  ii. DU of an IAB node (100) is configured to Tx data, control signal and CSSC.
  iii. DU of IAB node (100) is not configured to Rx CSSC in one of child and access links.
  iv. DU of the parent node (100*b*) with TDM capability is configured as one of H-UL and S-UL with IA.
  v. DU of parent node (100*b*) with SRxDM capability is configured as UL.
  vi. DU of parent node (100*b*) with STxDM capability is configured as UL and MT of the parent node (100*b*) is not active.
  vii. Parent node (100*b*) with FD capability.

In an embodiment, the F resource at MT of an IAB node (100) with SRxDM capability is configured as DL when at least one of the following conditions occur:
  i. MT of the IAB node (100) is configured to Rx one of data, control and CSSC.
  ii. DU of IAB node (100) is configured to Rx one of data, control signal and CSSC in one of child and access links.
  iii. DU of IAB node (100) is not configured to Tx CSSC in one of child and access links.
  iv. Parent node (100*b*) and child nodes (100*c*) with FDC.
  v. DU of parent node (100*b*) with TDM capability is configured as one of H-DL and S-DL with IA.
  vi. STxDM mode is active at the parent node (100*b*).
  vii. DU of the parent node (100*b*) is configured to Tx CSSC.

In an embodiment, the F resource at MT of an IAB node (100) with SRxDM capability is configured as UL when at least one of the following conditions occur:
  i. MT of the IAB node (100) is configured to Tx one of data, control and CSSC.
  ii. DU of IAB node (100) is not configured to one of Tx and Rx CSSC in one of child and access links.
  iii. DU of the parent node (100*b*) with one of FD capability and STxDM is configured as UL.

iv. DU of parent node (100*b*) with TDM capability is configured as one of H-UL and S-UL with IA.
v. DU of the parent node (100*b*) with SRxDM is configured as DL and MT is not active.
vi. DU of the child node (100*c*) with TDM capability is configured as one of H and S with IA.
vii. DU of the child node (100*c*) with TDM capability is configured to one of Tx and Rx CSSC.
viii. DU of the child node (100*c*) with STxDM is configured to receive CSSC.
ix. DU of the child node (100*c*) with SRxDM is configured to transmit CSSC.
x. Child node (100*c*) without FD capability.

In an embodiment, the F resource at MT of an IAB node (100) with FD capability is configured as DL when at least one of the following conditions occur:
i. MT of the IAB node (100) is configured to Rx one of data, control and CSSC.
ii. DU of the parent node (100*b*) with one of FD capability and STxDM is configured as DL.
iii. DU of parent node (100*b*) with TDM capability is configured as one of H-DL and S-DL with IA.
iv. DU of parent node (100*b*) is configured to Tx CSSC.

In an embodiment, the F resource at MT of an IAB node (100) with FD capability is configured as UL when at least one of the following conditions occur:
i. MT of the IAB node (100) is configured to Tx one of data, control and CSSC.
ii. DU of the parent node (100*b*) with one of FD capability and STxDM is configured as UL.
iii. DU of parent node (100*b*) with TDM capability is configured as one of H-UL and S-UL with IA.
iv. DU of parent node (100*b*) is configured to Rx CSSC.

Consider the scenario in which the resource allocation meets the FD/STxDM/SRxDM capability of the IAB node (100), and the DU of an IAB node (100) is configured as soft, then the IAB node (100) can treat the DU resource as hard and can Tx/Rx in the resource. Thus, the IA/INA signaling from the parent node (100*b*) is not required to Tx/Rx in the soft resource in such scenario. For e.g., in slot 0 of FIG. 4, both MT and DU are configured as DL and soft-UL, respectively. An IAB node (100) with SRxDM capability can receive in both backhaul and child/access links in slot 0, irrespective of the fact that it's DU is configured soft. Therefore, the parent node (100*b*) should not signal IA/INA to IAB node (100) in those slots where at least one of FD, STxDM and SRxDM mode is active. It is the internal decision of IAB node (100) to use the soft resource subject to configuration and capability of its child node (100*c*). As discussed in the previous embodiment, the parent node (100*b*) should be informed about the capability and DU configuration of its child nodes (100*c*) for dynamically configuring F resources. The parent node (100*b*) can evaluate the instants at which FD, STxDM or SRxDM mode active at the child node (100*c*) from this capability and DU configuration information.

In an embodiment, the parent node (100*b*) signals one of IA and INA to DU of the IAB nodes (100) with at least one of TDM capability and HD constraint is not met for at least one of STxDM and SRxDM, where the CU of the donor node (100*d*) evaluates the time instants at which one of FD, STxDM and SRxDM mode is active in an IAB node (100) using the knowledge of the capability and resource configuration of all the IAB nodes (100) in the network (1000).

In another embodiment, an IAB node (100) with at least one of STxDM and SRxDM capability implicitly use the soft resource without IA from the parent node (100*b*) subject to HD constraint at IAB node (100), and the capability and configuration of the child node (100*c*).

In another embodiment, an IAB node (100) with FD capability implicitly use the soft resource without IA from the parent node (100*b*) subject to capability and configuration of its child node (100*c*).

Figure 18:
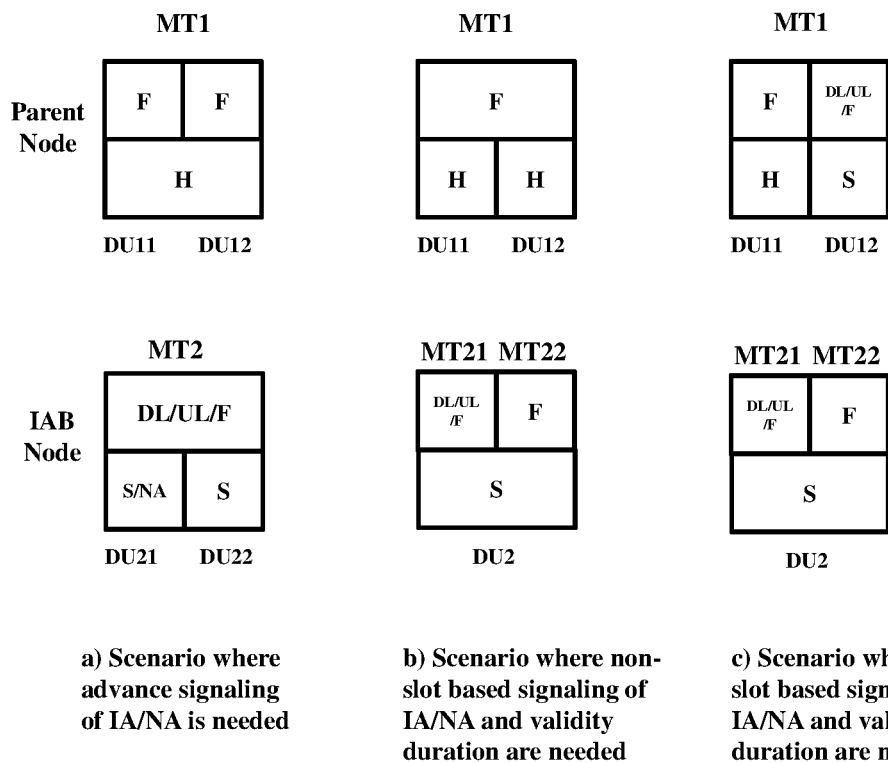
FIG. 18 illustrates the need for non-slot based signaling of IA/INA for S resource and the need for signaling validity duration along with IA/INA in IAB node with multi-numerology, according to an embodiment as disclosed herein.

FIG. 18 illustrates the need for non-slot based signaling of IA/INA for S resource and the need for signaling validity duration along with IA/INA in IAB node (100) with multi-numerology, according to an embodiment as disclosed herein.

Consider a scenario illustrated in FIG. 18 notation 'a', where DU of an IAB node (100) use higher numerology than MT, and the slot of DU at the middle of the slot duration of MT is configured as soft. The IAB node (100) can use the resource only when MT2 is free, and the IA is received from the parent node (100*b*). However, the IA/INA signalling is given in DCI and is scheduled in initial symbols of the slot MT2. Therefore, parent node (100*b*) cannot signal IA/INA for the soft resource in an intermediate slot in DU (i.e., DU22 in FIG. 18 notation 'a').

Consider another scenario illustrated in FIG. 18 notation 'b', where MT of an IAB node (100) with higher numerology than DU, the DU resource is configured as soft. If the parent link is active only in the initial slots (i.e., MT21), it can signal IA for the unused slot (i.e., MT22). But the IA is signaled in the middle of DU slot (i.e., DU22). Thus, DU should consider IA/INA on a non-slot basis.

Consider a multi-hop IAB scenario presented in FIG. 18 notation 'c', where the reference node (100*a*) and its parent node (100*b*) have TDM capability, DU of the parent node (100*b*) have higher numerology compared to DU of the IAB node (100). The initial slot of DU of the parent node (100*b*) is configured as H followed by S. Then the corresponding slot of DU of IAB node (100) will be configured as S/NA. If parent node (100*b*) is not using the H resource in slot DU11, then IA can be signaled to DU of the IAB node (100) to use the resource. However, the parent node (100*b*) cannot signal IA for the soft resource in slot DU12. Hence, the parent node (100*b*) can signal IA for certain symbols in DU of the IAB node (100), not for the entire slot DU2. Therefore, the parent node (100*b*) should specify the duration for which the IA/INA signaling is valid.

In an embodiment, IA/INA for the soft resource at DU of an IAB node (100) is associated with a validity duration. The validity duration is at least one of a fixed value and a configured value. The configuration is done by one of semi-statically and dynamically. The validity duration is based on at least one of numerology of MT and DU.

In another embodiment the DU of an IAB node (100) performs one of non-slot based Tx and non-slot based Rx on the resources indicated as IA by the parent node (100*b*).

The indication of IA/INA should follow a mechanism. It is efficient to use the existing signalling schemes defined for a macro gNB. This will eliminate the need for new signals unnecessarily. In a regular gNB, slot format indicator (SFI) is signalled by the gNB to the UE, in order to configure the F resources for the UE. SFI can take several values and each value of SFI corresponds to a particular combination of DL, UL and F resources. This can be used to indicate IA/INA as well. The parent node (100*b*) signals slot format indicator (SFI) to MT of the IAB node (100) for the semi-statically configured F resources. If the SFI indicates certain symbols as DL/UL, then those symbols will be used for Tx/Rx in that direction. However, if some symbols are made F in SFI, it means that they are not available for MT. If they are not available for MT, it means that the DU can use the resource for Tx/Rx in its child/access link. Therefore, this forms a way of indicating IA.

In an embodiment, the parent node (100b) signals IA for the S resources of the DU of the IAB node (100) in the form of F resources in the SFI.

In configuring cell specific signal and channel (CSSC) DL synchronization and UL random access procedures are mandatory in a network (1000) for initial access, for the UE/child node (100c) to get attached to the parent node (100b). Inter IAB measurements, after connection establishment are also essential. Signals such as synchronization signal blocks (SSB) used for downlink synchronization, random access signals used for uplink synchronization, system information block (SIB) used to provide essential information about the gNB to the newly introduced node etc., are defined for these purposes. Additionally, periodic CSI-RS also would be configured to multiple attached UEs for CSI measurement and reporting purpose. Hence, these signals have higher priority compared to the data signals and are known as cell specific signal and channel (CSSC). The list of cell-specific signals and channels includes:
  i. Resources for SSB transmission at DU.
  ii. Configured random access channel (RACH) occasions for receiving at the DU.
  iii. Periodic CSI-RS transmission at the DU.
  iv. Scheduled resource for receiving scheduling request (SR) at DU.

The CSSC occur at regular intervals independent of the resource allocation of MT and DU, creating conflicts. Various conflicting scenarios are analyzed with proposals for overcoming the conflicts.

Consider a scenario in which DU of an IAB node (100), with STxDM/SRxDM capability, is configured as hard/soft with IA while the MT of an IAB node (100) need to transmit or receive some CSSC. In that case both backhaul, and access/child link will be active if the direction of CSSC meet the HD constraint at the IAB node (100) and the STxDM/SRxDM capability of the IAB node (100). Otherwise, it is the internal decision of IAB node (100) to choose either backhaul or access/child link based on priority of the CSSC and resulting performance degradation.

In an embodiment, a strategy to avoid conflicting time frequency resources when an IAB node (100) with one of STxDM and SRxDM capability with its MT configured to one of Tx and Rx CSSC and its DU configured as one of soft with IA and hard is presented, where the IAB node (100) performs one of Tx and Rx CSSC in backhaul link along with one of the configured data Tx and Rx in one of child and access link if the direction of CSSC and data meet the HD constraint and one of Tx and Rx capability of the IAB node (100), else IAB node (100) implicitly decides to choose one of one of data Tx and Rx in one of child and access link and one of CSSC Tx and Rx in backhaul link.

Consider another scenario in which DU of an IAB node (100) with STxDM/SRxDM capability is configured as NA/soft without IA but needs to transmit or receive some CSSC, and the backhaul link of the IAB node (100) is active. Two conditions arise in that scenario:
  i. When direction of CSSC meet the HD constraint and capability of the IAB node (100), the IAB node (100) can Tx/Rx CSSC in DU link along with the ongoing data Tx/Rx in MT link.
  ii. When STxDM/SRxDM is not possible in backhaul and child/access links due to violation of HD constraint or inability of IAB node (100), then IAB node (100) can treat the soft without IA/NA resource at DU as hard and Tx/Rx CSSC in that resource.

In an embodiment, method to avoid conflict in an IAB node (100) with one of STxDM and SRxDM capability with its DU configured as one of NA and soft without IA and having some CSSC for one of Tx and Rx, and some active data for one of Tx and Rx in MT is presented, where the IAB node (100) either transmits or receives CSSC in a resource configured as one of NA and soft without IA along with one of configured data Tx and Rx in backhaul link, if the direction of CSSC and data meet the HD constraint and one Tx and Rx capability of the IAB node (100), else IAB node (100) drops one of the data Tx and Rx in backhaul link, and treat one of the NA and soft without IA resource in its DU as hard and one of Tx and Rx CSSC in one of the child and access link.

Consider a scenario in which both MT and DU of an IAB node (100) with STxDM/SRxDM capability is configured with CSSC. Conflict arises when directions of CSSC at the MT and DU do not meet HD constraint or Tx/Rx capability of the IAB node (100). For example, MT and DU of an IAB node (100) is configured to transmit RACH and receive SR, respectively. In that case MT is in Tx mode whereas DU is in Rx mode, violating HD constraint. Another conflicting case arises when MT and DU of an IAB node (100) with SRxDM capability is configured to transmit SSB and RACH, respectively. In that case the IAB node (100) needs to Tx CSSC in both links but has only SRxDM capability. In both scenarios, the IAB node (100) will switch to TDM mode of operation and drop backhaul link, as dropping of child/access link may confuse child node (100c)/access UEs.

In an embodiment, strategy to avoid conflict in an IAB node (100) with one of STxDM and SRxDM and configured with CSSC for one of Tx and Rx in both MT and DU is presented, where the IAB node (100) performs one of Tx and Rx of CSSC in both backhaul and one of child and access links if the signals meet the HD constraint and one of simultaneous Tx and simultaneous Rx capability of the node, else the priority is given to DU for one of Tx and Rx of CSSC.

These points are summarized in Table. 5 below.

TABLE 5

Conflict resolution associated with CSSC in IAB node (100) with STxDM/ SRxDM capability

|  |  | IAB node (100) MT | |
|---|---|---|---|
|  |  | CSSC Tx/Rx | Data Tx/Rx |
| IAB node (100) DU | Hard/soft with IA + CSSC Tx/Rx | Both MT and DU Tx/Rx CSSC if the signals meet HD constraint and simultaneous Tx/SRxDM capability of the IAB node (100), else the priority is given to DU | Both MT and DU active if CSSC and data meet HD constraint and simultaneous Tx/SRxDM capability of the IAB node (100), else the IAB node (100) Tx/Rx CSSC in DU as the resource is configured hard |
|  | NA/soft without IA + CSSC Tx/Rx | Both MT and DU Tx/Rx CSSC if the signals meet HD constraint and simultaneous Tx/simultaneous Rx capability of the IAB node (100), else IAB node (100) treats | Both MT and DU Tx/Rx CSSC if CSSC and data meet HD constraint and simultaneous Tx/simultaneous Rx capability of the IAB node (100), else IAB node (100) treats |

TABLE 5-continued

Conflict resolution associated with CSSC in IAB node (100) with STxDM/ SRxDM capability

| | IAB node (100) MT | |
|---|---|---|
| | CSSC Tx/Rx | Data Tx/Rx |
| Hard/soft with IA + Data Tx/Rx | NA/soft without IA resource as hard and Tx/Rx CSSC in DU Both MT and DU active if both CSSC and data meet HD constraint and simultaneous Tx/ simultaneous Rx capability of the IAB node (100), else internal decision of IAB node (100) to choose either MT or DU for Tx/Rx of the CSSC | NA/soft without IA resource as hard and Tx/Rx CSSC in DU Both MT and DU active if data meet HD constraint and simultaneous Tx/ simultaneous Rx capability of the IAB node (100), else priority goes to DU, as the DU resource is configured as hard |
| NA/soft without IA + Data Tx/Rx | Both MT and DU active if both CSSC and data meet HD constraint and simultaneous Tx/ simultaneous Rx capability of the IAB node (100), else priority is given for CSSC Tx/Rx in MT | Both MT and DU active if data Tx/Rx meet HD constraint and simultaneous Tx/ simultaneous Rx capability of the IAB node (100), else priority is given for data Tx/Rx in MT, as the DU resource is NA/soft without IA |

In multi-hop IAB scenario, the timing of the transmission and receptions associated with an IAB node (100) follow different patterns based on the capability of the IAB node (100). The UL and DL Tx occur at same time in case of an IAB node (100) with STxDM capability, whereas receptions from backhaul and child/access links occur at the same time for an IAB node (100) with SRxDM support. However, it is hard to maintain these timing constraints in a practical IAB network (1000), where IAB nodes (100) with various capabilities co-exists. Guard bands need to be inserted in certain situations to avoid timing misalignments. Analyzes such conflicting scenarios and associated guard period requirements.

Figure 2:
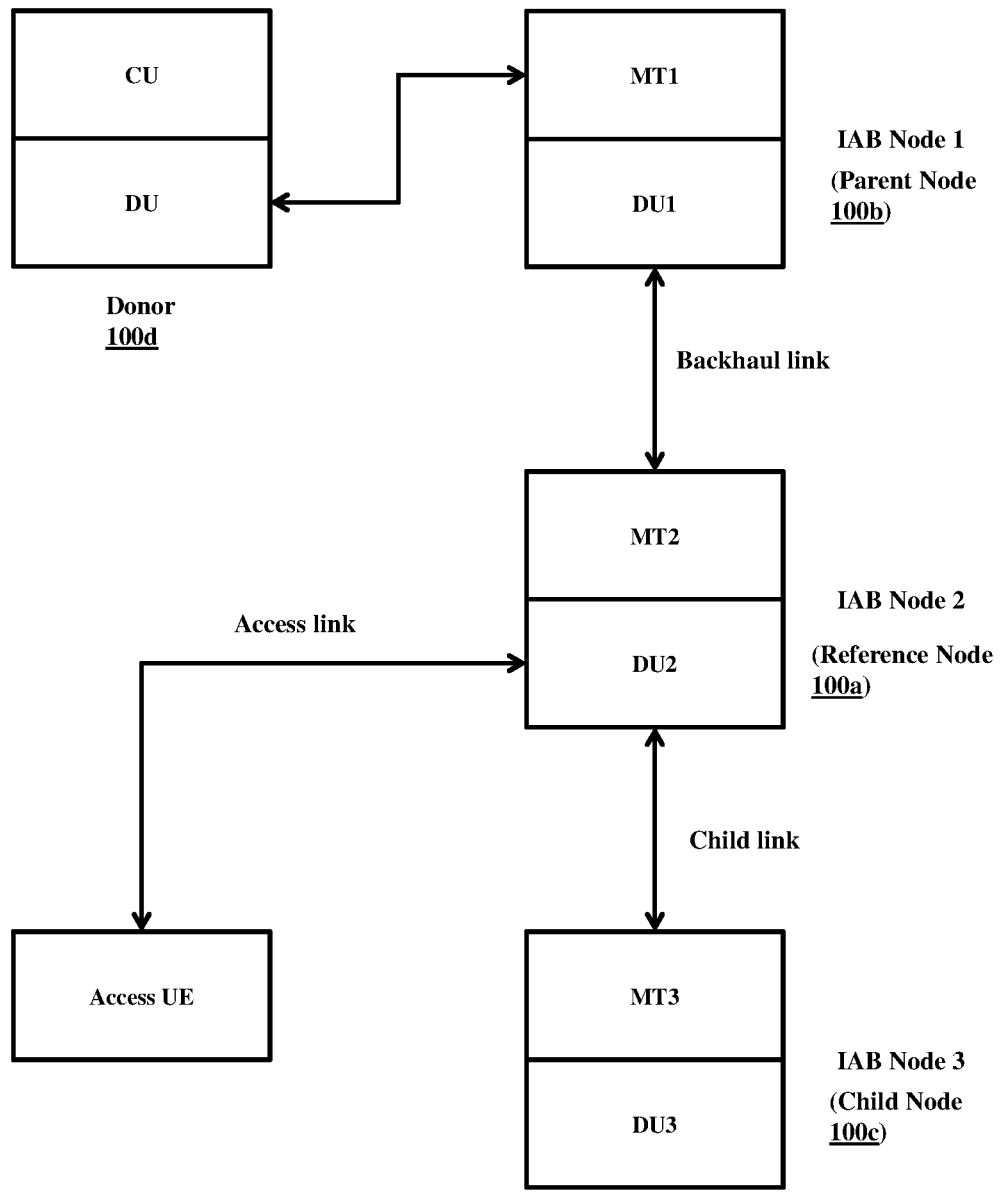
FIG. 2 illustrates a basic block diagram of a multi-hop IAB network (1000), according to a prior art.

In the multi-hop IAB scenario presented in FIG. 2, let the IAB node (100) 2 have STxDM capability and its DU is configured as DL. The MT2 should be configured as UL to satisfy HD constraint and enable simultaneous Tx from IAB node 2 (100). Then MT3 should be configured as DL since it should follow DU2. This implies that DU3 should be UL to satisfy HD constraint at child node (100c). If the child node (100c) (IAB 3) supports simultaneous reception, then all links (corresponding to IAB2 and IAB3) will be active, increasing throughput.

In an embodiment, IAB nodes (100) with one of STxDM and SRxDM capability alternates between hops to ensure all the links are active without reduction in throughput in a multi-hop IAB scenario.

Consider the scenario in which an IAB node (100) with SRxDM capability is serving a child node (100c). The UL transmission time from its child node (100c) should be adjusted in such way that the corresponding UL reception at the IAB node (100) match with the DL reception time at the IAB node (100) (corresponding to the DL Tx from the parent node (100b)). If the child node (100c) has TDM/SRxDM/FD capability, then its UL Tx time can be adjusted as mentioned above. However, for a child node (100c) with STxDM capability, the UL Tx time is fixed and is tied with the DL Tx time. Thus, in such cases, the DL and UL Rx occur at different time instants at the IAB node (100). Certain symbols need to be left blank. In other words, guard bands need to be provided to achieve symbol level alignment in such scenario, leading to reduction in resource utilization.

Figure 19:
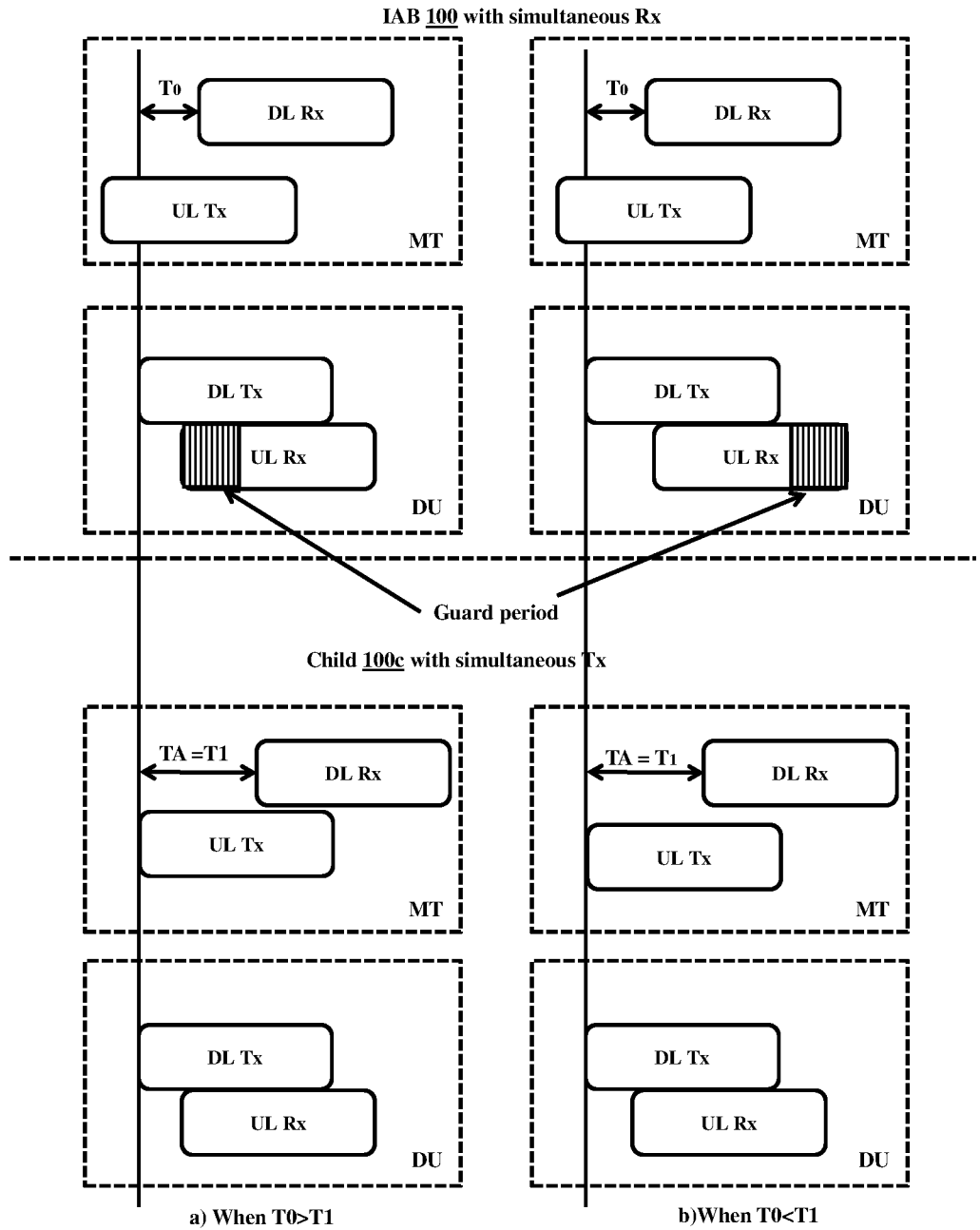
FIG. 19 illustrates the timing misalignment in multi-hop IAB scenario, where the parent node has SRxDM capability and child node has STxDM capability and the usage of guard symbols, according to an embodiment as disclosed herein.

FIG. 19 illustrates the timing misalignment in multi-hop IAB scenario, where the parent node (100b) has SRxDM capability and child node (100c) has STxDM capability and the usage of guard symbols, according to an embodiment as disclosed herein.

FIG. 19 illustrates the use of guard period to achieve timing alignment, in two different cases depending on the DL and UL reception time at the IAB node (100), according to the embodiment disclosed herein. When the UL Rx precedes DL Rx at the IAB node (100), i.e., T0>T1, as in FIG. 19 notation 'a', then the initial symbols of the UL slot should not be scheduled for the child node (100c) for Tx. Similarly, when DL Rx occur before UL Rx, then the last few symbols of the UL slot should be left blank.

In an embodiment, when IAB node (100) with SRxDM is followed by child node (100c) with STxDM capability, guard symbols are provided for the UL Tx from child node (100c) depending on the difference in propagation delays:
  i. No guard symbol is needed when T0=T1
  ii. Guard symbols at the beginning of the slot when T0>T1
  iii. Guard symbols at the end of the slot when T0<T1

Here T0 denotes the propagation delay between parent node (100b) and IAB node (100), and T1 denotes the propagation delay between IAB node (100) and child node (100c).

Figures 3A, 3B:
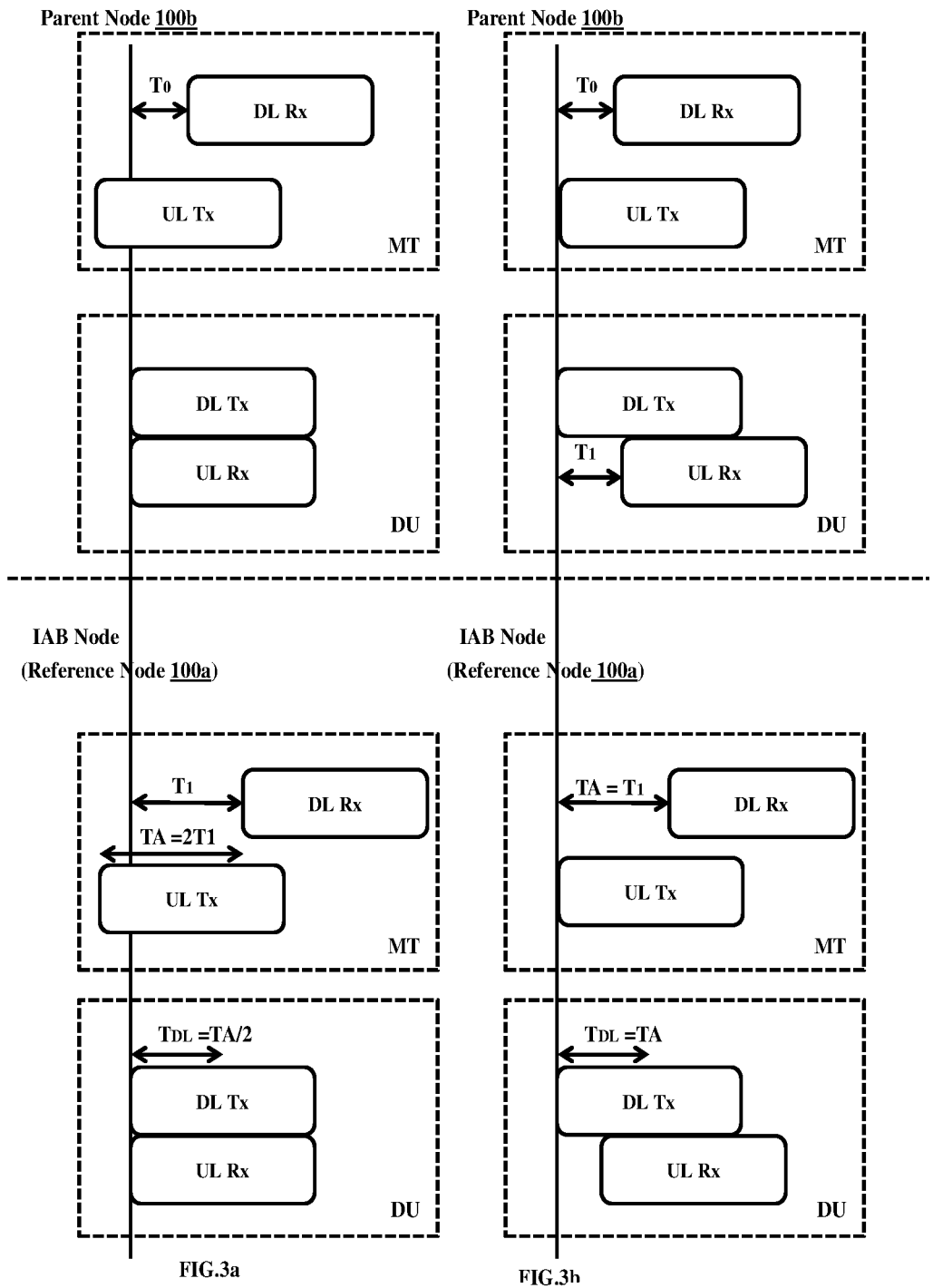
FIG. 3a-3c illustrate a timing of various transmission and reception from an IAB node, for each timing case, according to a prior art.

In IAB nodes (100) with TDM capability, illustrated in FIG. 3a, the node will signal the TA value, equal to twice the propagation delay between the nodes, to its child node (100c). The child node (100c) will advance its UL Tx time from DL Rx time by the TA value, such that DL Tx and UL Rx are time aligned at the IAB node (100). However, in case of IAB nodes (100) with STxDM capability, the DL and UL transmissions are aligned at an IAB node (100) and the child node (100c) cannot perform TA as in TDM scenario. Hence, the DL Tx and UL Rx will not be aligned at the IAB node (100), as illustrated in FIG. 3b.

Figure 20:
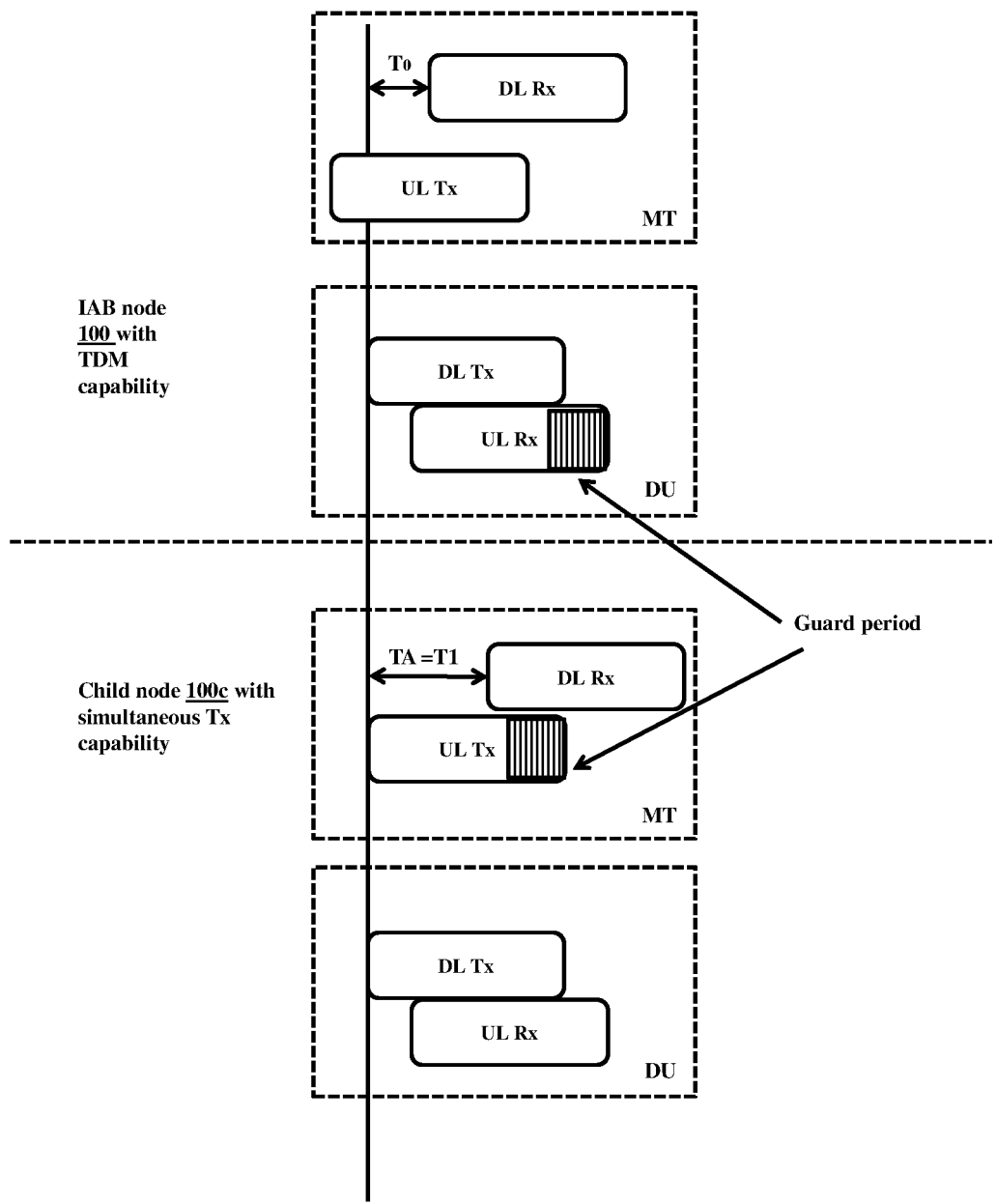
FIG. 20 illustrates a timing misalignment in multi-hop IAB scenario, where the parent node has TDM capability and child node has HD constraint with simultaneous Tx capability and the usage of guard symbols, according to an embodiment as disclosed herein.

FIG. 20 illustrates a timing misalignment in multi-hop IAB scenario, where the parent node (100b) has TDM capability and child node (100c) has HD constraint with simultaneous Tx capability and the usage of guard symbols, according to an embodiment as disclosed herein.

Consider a scenario illustrated in FIG. 20, in which an IAB node (100) with TDM capability is serving an IAB node (100) with STxDM capability, then the child node (100c) cannot perform TA as indicated by the IAB node (100), resulting in misalignment of DL Tx and UL Rx time at the IAB node (100). Two solutions can be proposed in this scenario. Method I: the child node (100c) switch to TDM mode of operation instead of simultaneous Tx and perform TA to achieve proper timing alignment. However, there is a resulting loss of throughput. Method II: Provide guard symbols at the end of the slot for UL Tx from the child node (100c), so that the end of UL Rx is aligned with the end of DL Tx, as illustrated in FIG. 20. The value of the guard period depends on the propagation delay between the parent node (100b) and the child node (100c).

In another embodiment, when IAB node (100) with any one of TDM and STxDM capability is followed by a child node (100c) STxDM, guard symbols are provided at the end of the slot for the UL Tx from child node (100c) depending on the propagation delay between parent node (100b) and child node (100c).

The timing of various Tx and Rx at the IAB node (100) changes with the capability of the IAB node (100) and the capability of its child node (100c). The Rx from the parent node (100b) in the backhaul link is dependent on the propagation delay, while the Tx to the child node (100c)/access UE should be aligned for all nodes in the network (1000). Hence, both DL Rx from parent node (100b) and DL Tx to child node (100c)/UE cannot be controlled at the IAB node (100). However, the IAB node (100) can control the UL Rx time from the child node (100c) based on the TA mechanism and is based on the capability of the IAB node (100) and its child node (100c). Consider the timing diagram illustrated in FIG. 3. Let T0 denotes the propagation delay between parent node (100b) and reference node (100a), and T1 denotes the propagation delay between reference node (100a) and its child node (100c). In case of IAB node (100) with TDM capability, the IAB node (100) should signal TA value to its child node (100c) such that the DL Tx and UL Rx should match at the IAB node (100). So, the IAB node (100) should signal TA as 2×T1, and the child node (100c) should advance its UL Tx from the DL Rx time by factor 2×T1. Similarly, an IAB node (100) with SRxDM capability should signal the TA value to the child node (100c) such that the UL Rx from child node (100c) and DL Rx from the parent node (100b) will be time aligned. Since DL Rx is delayed from DL Tx time by factor T0, the IAB node (100) must signal the TA value as 2×T1-T0. Thus, the TA value signaled by an IAB node (100) with SRxDM capability depends on two factors: 1) propagation delay between the reference node (100a) and its child node (100c) and 2) propagation delay between the reference node (100a) and its parent node (100b). If the child node (100c) has STxDM capability, then its UL Tx is aligned with DL Tx time. Hence, the appropriate TA cannot be performed at the child node (100c), and the UL Rx will not be aligned with DL Tx/DL Rx at the IAB node (100). Additional guard period is required in this case to align the UL Rx with DL Tx/DL Rx.

In an embodiment, an IAB node (100) calculates the TA value depending on the capability of the IAB node (100) and its child node (100c), where the following cases are considered:

i. For child node (100c) with STxDM capability, the IAB node (100) signals TA value as the propagation delay between the two nodes.

ii. For IAB node (100) with one of TDM and STxDM capability and child node (100c) with one of TDM and SRxDM capability, the IAB node (100) signals TA value as the twice of propagation delay between the two nodes.

iii. For IAB node (100) with SRxDM capability and child node (100c) with one of TDM and SRxDM capability, the IAB node (100) signals TA value as the difference between following factors
   a. Twice the propagation delay between the IAB node (100) and its child node (100c).
   b. Propagation delay between the IAB node (100) and its parent node (100b).

Figure 3C:
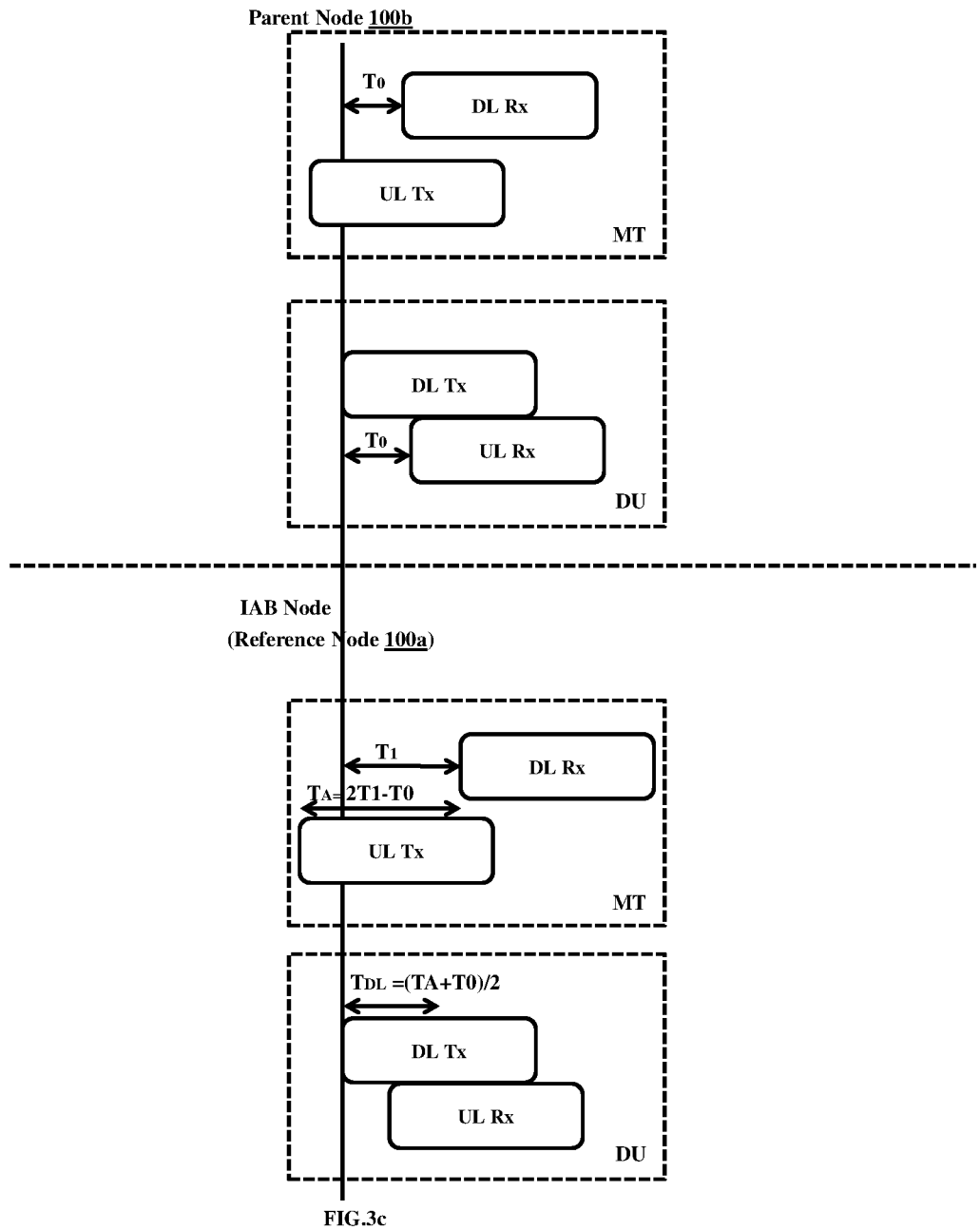

In multi-hop IAB scenario, for achieving synchronization, the IAB node (100) should derive the DL Tx time from the TA value signaled by the parent node (100b). In case of parent node (100b) with TDM/STxDM capability, illustrated in FIG. 3a, the TA value is 2×T1 as mentioned in the last paragraph. Thus, the DL Tx time of the IAB node (100) is obtained as TDL=TA/2=T1 and the IAB node (100) can advance its DL Tx by factor T1 form DL Rx time. However, for a parent node (100b) with SRxDM capability, the TA=2×T1-T0, as illustrated in FIG. 3c. Thus, the IAB node (100) cannot derive the propagation delay T1 directly from the signaled TA value. Thus, the parent node (100b) should either signal the DL Tx time directly to the IAB node (100), or the offset between DL Tx and UL Rx at the parent node (100b) (i.e., T0) to the IAB node (100), in addition to TA value.

In another embodiment, when IAB node (100) with SRxDM capability is followed by child node (100c) with one of TDM and SRxDM capability, the IAB node (100) signals either the offset value T0 or the DL Tx time T1 to the child node (100c), in addition to TA for DL Tx timing estimation. Here T0 denotes the propagation delay between parent node (100b) and IAB node (100), and T1 denotes the propagation delay between IAB node (100) and child node (100c).

These points are summarized in Table. 6 below.

TABLE 6

Timing alignment between IAB node (100) and its child node (100c)

|  |  | Child node (100c) |  |  |
|---|---|---|---|---|
|  |  | TDM | Simultaneous Tx | Simultaneous Rx |
| IAB node | TDM | TA = 2T$_1$. No need of guard symbols. | Child node (100c) cannot adjust the UL Tx time, so TA = T$_1$. Either guard symbols are needed, or child node (100c) should work in TDM. | TA = 2T$_1$. No need of guard symbols. |
|  | Simultaneous Tx | TA = 2T$_1$. No need of guard symbols. | Child node (100c) cannot adjust the UL Tx time, so TA = T$_1$. Either guard symbols are needed, or child node (100c) should work in TDM. | TA = 2T$_1$. No need of guard symbols. |
|  | Simultaneous Rx | TA = 2T$_1$-T$_0$. No guard is required. IAB node (100) should signal offset to child node (100c) in addition to TA value. | Child node (100c) cannot adjust the UL Tx time, so TA = T$_1$. Either guard symbols are needed, or IAB node (100) should work in TDM. | TA=2T$_1$-T$_0$. No guard is required. IAB node (100) should signal offset to child node (100c) in addition to TA value. |

Consider another scenario in which an IAB node (100) is serving an child node (100c), and the IAB node (100) is unaware of the capability of the child node (100c), then the IAB node (100) should signal the TA value according to its capability and the child node (100c) should derive the UL Tx and DL Tx time from the TA value signaled by the IAB node (100) based on its own capability. For e.g., consider an IAB node (100) with TDM capability serving a child node (100c) with STxDM capability, then the IAB node (100) assumes the child node (100c) has TDM capability and signal TA=2T1, as illustrated in FIG. 3a. However, the IAB node (100) with STxDM capability cannot perform TA=2T1, as the DL and UL Tx timings are aligned. Thus, the IAB node (100) will evaluate TA and DL Tx time (TDL) according to its capability, TA_new=TDL=TA/2, and transmit in backhaul and access links.

In an embodiment, an IAB node (100) which is unaware of the capability of the child node (100c) will calculate the TA value depending on the capability of the IAB node (100) and the child node (100c) derives the UL and DL Tx timings from the TA value according to its capability, where the following cases are considered:
  i. For IAB node (100) with TDM capability and child node (100c) with one of TDM and SRxDM capability, IAB node (100) signals TA as twice the propagation delay between the nodes, and the child node (100c) applies the same TA to evaluate its UL and DL Tx timings.
  ii. For IAB node (100) with TDM capability and child node (100c) with STxDM capability the IAB node (100) signals TA value as the twice of propagation delay between the two nodes, and the child node (100c) derives the new TA and DL Tx time values as TA_new=TDL=TA/2.
  iii. For IAB node (100) with STxDM capability and child node (100c) with one of TDM and SRxDM capability then IAB node (100) signals TA as the propagation delay between the nodes and the child node (100c) derives the new TA and DL Tx time values as TA_new=2×TA and TDL=TA, respectively.
  iv. For IAB node (100) with SRxDM capability and child node (100c) with TDM capability, then the IAB node (100) signals TA=2T1−T0, and the additional offset T0 to the child node (100c). The child node (100c) derives the new TA and DL Tx time values as TA_new=(TA+T0) and TDL=(TA+T0)/2, respectively.
  v. For IAB node (100) with SRxDM capability and child node (100c) with STxDM capability, then the IAB node (100) signals TA=2T1−T0, and the additional offset T0 to the child node (100c). The child node (100c) derives the new TA and DL Tx time values as TA_new=TDL=(TA+T0)/2, respectively.

Here T1 denotes the propagation delay between IAB node (100) and child node (100c), and T0 denotes the timing mismatch between DL Tx and UL Rx in an IAB node (100) with SRxDM capability.

The DU and MT resources are not time aligned due to a different propagation delays in backhaul and child links, capabilities of the IAB node (100), a parent node (100b) and a child node (100c) and switching delay in case of switching between reception mode to transmission mode and vice versa.

Figure 21:
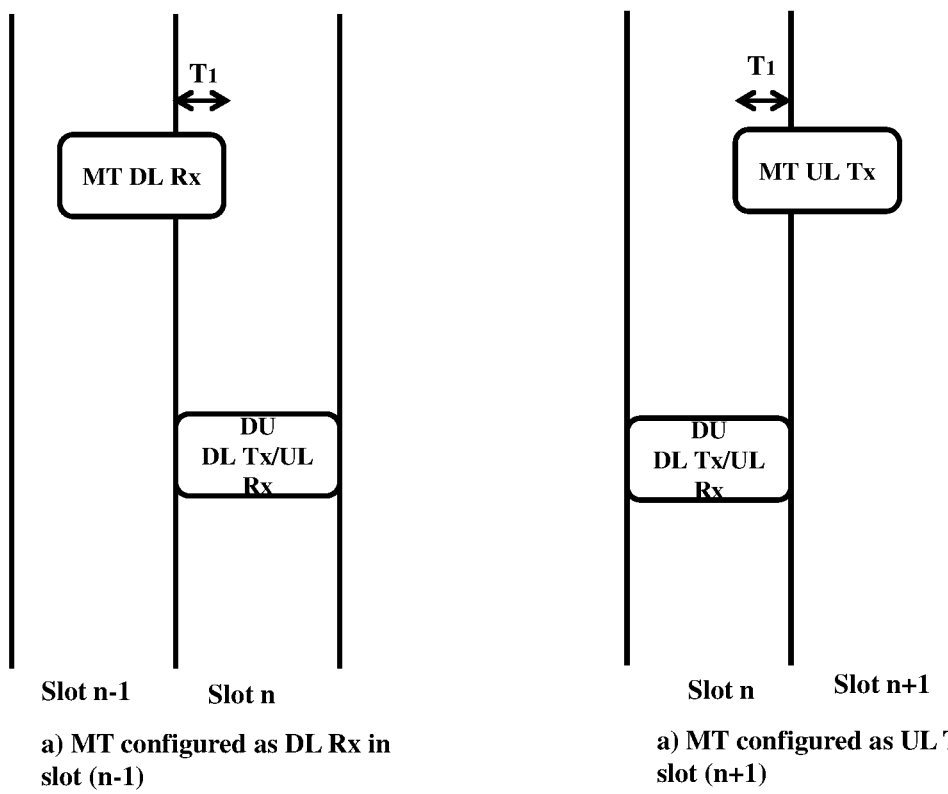
FIG. 21 illustrates a timing mismatch between the MT and DU Tx/Rx, according to an embodiment as disclosed herein.

FIG. 21 illustrates a timing mismatch between the MT and DU Tx/Rx, according to an embodiment as disclosed herein.

FIG. 21 illustrates the two cases of timing misalignment between MT and DU. The DL Rx from the parent node (100b) is delayed at the MT because of propagation delay, as shown in FIG. 21 notation 'a;. Therefore, a part of DL Rx corresponding to slot (n−1) extends to slot n. Similarly, the UL Tx from the MT (TDM/SRxDM) needs to be advanced according to timing alignment. Therefore, the UL Tx from MT corresponding to slot n will start at the tail end if slot (n−1) itself, as shown in FIG. 21 notation 'b'. The transmissions/receptions at DU need to take care of this overlapping period, in order to avoid interference between MT and DU Tx/Rx. Hence, guard period is required to avoid the interference between DU and MT of the IAB node (100). The guard period required at the IAB node (100) for the various switching is summarized in Table. 7. Here, Ts denotes the time required for switching between transmission and reception (and vice versa), whereas T1 and T2 denote the propagation delay in backhaul and child links, respectively.

TABLE 7

The Guard period required at IAB node (100) for various switching

| | | TDM | STxDM | SRxDM |
|---|---|---|---|---|
| MT DL Rx | MT DL Rx | 0 | 0 | 0 |
| | MT UL Tx | Ts + 2 * T1 | Ts + T1 | Ts + 2 * T1 |
| | DU DL Tx | Ts + T1 | Ts + T1 | Ts + T1 |
| | DU UL Rx | T1 | Max(T1 − T2, 0) | 0 |
| MT UL Tx | MT DL Rx | Max(Ts − 2 * T1, 0) | Max(Ts − T1, 0) | Max(Ts − 2 * T1, 0) |
| | MT UL Tx | 0 | 0 | 0 |
| | DU DL Tx | 0 | 0 | 0 |
| | DU UL Rx | Max(Ts − T1, 0) | Max(Ts − T2, 0) | Max(Ts − 2 * T1, 0) |
| DU DL Tx | MT DL Rx | Max(Ts − T1, 0) | Max(Ts − T1, 0) | Max(Ts − T1, 0) |
| | MT UL Tx | T1 | 0 | T1 |
| | DU DL Tx | 0 | 0 | 0 |
| | DU UL Rx | Ts | Max(Ts − T2, 0) | Max(Ts − T1, 0) |
| DU UL Rx | MT DL Rx | 0 | 0 | 0 |
| | MT UL Tx | Ts + T1 | Ts + T2 | Ts + 2 * T1 |
| | DU DL Tx | Ts | Ts + T2 | Ts + T1 |
| | DU UL Rx | 0 | 0 | 0 |

In an embodiment, DU of an IAB node (100) inserts at least one guard symbol when there is a switching from one mode of operation to another and the guard period is greater than zero. The guard period is based on the capabilities of at least one of the IAB node (100), the parent node (100b) and the child node (100c). The insertion of guard symbols is at least one of beginning and end of the DU resources of the IAB node (100). The number of guard symbols is calculated based on the guard period and numerology followed in DU of the IAB node (100).

Figure 22:
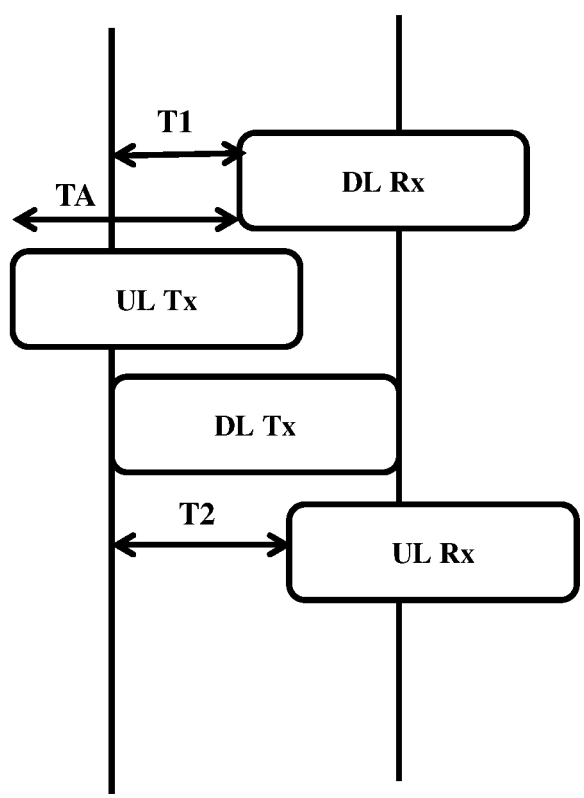
FIG. 22 illustrates timing of various Tx/Rx at MT and DU of the IAB node, according to an embodiment as disclosed herein.

FIG. 22 illustrates timing of various Tx/Rx at MT and DU of the IAB node (100), according to an embodiment as disclosed herein.

The timing of various Tx/Rx at MT and DU of an IAB node (100) is illustrated in FIG. 22. In figure, T1 denotes the propagation delay between IAB node (100) and its parent node (100b), T2 denotes the propagation delay between IAB node (100) and its child node (100c), and TA denotes the timing advance value signaled by the parent node (100b) to align UL-Rx from IAB node (100). The values of T1, T2 and TA varies depending on the capabilities of the IAB node (100), its parent node (100b), and the child node (100c). In case of IAB node (100) with at least one of TDM and SRxDM capabilities, there is no constraint on the UL Tx time at the IAB node (100). Therefore, IAB node (100) directly applies the TA value signaled by parent node (100b) for UL-Tx. A parent node (100b) with at least one of TDM and STxDM capability signals TA=2T1, whereas a parent node (100b) with SRxDM capability signals TA=2T1−T0, where T0 denote the DL-Rx time at the parent node (100b). In case of IAB node (100) with STxDM, both UL-Tx and DL-Tx timings are aligned, and therefore TA=T1 irrespective of the capability of parent node (100b).

Now, if IAB node (100) has at least one of TDM and STxDM capability, and child node (100c) with at least one of TDM and SRxDM capability, then IAB node (100) signals TA values such that UL-Rx from child nodes (100c) align with timing of DL-Tx, and the child node (100c) advances the timing of UL-Tx according to the TA value signaled by the parent node (100b). Therefore, UL-Rx align with DL-Tx at IAB node (100) and T2=0. However, for an IAB node (100) with SRxDM and child node (100c) with at least one of TDM and SRxDM, the IAB node (100) signals TA value such that UL-Rx align with DL-Rx at IAB node (100), and therefore, T2=T1. Finally, child node (100c) with STxDM cannot advance the UL-Tx according to the TA value signaled by the parent node (100b), and hence, T2 will be non-zero at the IAB node (100) and is equal to the propagation delay between IAB node (100) and the child node (100c). The special cases discussed above, and the typical value of the associated parameters are tabulated in Table. 8.

TABLE 8

Special cases based on capability of nodes, and typical value of parameters

| Sl. No. | Capability of IAB node (100) | Capability of Parent node (100b) | Capability of child node (100c) | Typical value of parameters |
|---|---|---|---|---|
| Case 1 | TDM/SRxDM | TDM/STxDM | — | TA = 2T1 |
| Case 2 | TDM/SRxDM | SRxDM | — | TA = 2T1 − T0 |
| Case 3 | STxDM | TDM/STxDM/SRxDM | — | TA = T1 |
| Case 4 | TDM/STxDM | — | TDM/SRxDM | T2=0 |
| Case 5 | SRxDM | — | TDM/SRxDM | T2 = T1 |
| Case 6 | TDM/STxDM/SRxDM | — | STxDM | T2 = Propagation delay between IAB node (100) and child node (100c) |

Based on the above discussions, the timing of various Tx and Rx at MT and DU of an IAB node (100) depends on at least one of the following factors,
  i. Propagation delay between IAB node (100) and its parent node (100b).
  ii. Propagation delay between IAB node (100) and its child node (100c).
  iii. Capability of the IAB node (100), its parent node (100b), and its child node (100c).
  iv. Tx-Rx switching time required at the IAB node (100).

Figure 23:
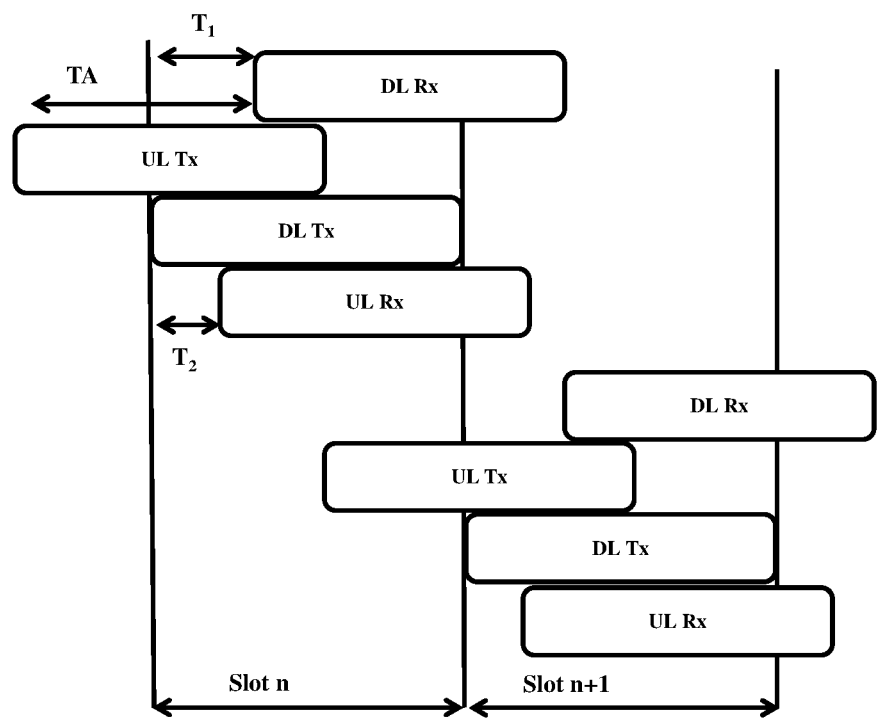
FIG. 23 illustrates all possible transitions from one resource configuration to another between the MT and DU in the IAB node, according to an embodiment as disclosed herein.

FIG. 23 illustrates all possible transitions from one resource configuration to another between the MT and DU in the IAB node (100), according to an embodiment as disclosed herein.

FIG. 23 illustrates all possible transitions from one resource configuration to another between MT and DU of an IAB node (100), and associated overlap between slots. Further, there exist a time delay in switching from Tx mode to Rx mode, and back in IAB nodes (100) and is known as Tx-Rx switching time, Ts. Based on the timing diagram in FIG. 23, the guard period required in switching from one resource configuration to another across slots is evaluated and tabulated in Table. 9. The table indicate the generalized expressions, in terms of T1, T2 and TA, and the typical values, based on the capability of IAB node (100), parent node (100b) and child node (100c), is obtained by substituting corresponding values of T1, T2 and TA from Table. 9. For e.g., for an IAB node (100) with TDM capability and its parent node (100b) with one of TDM and STxDM capability, TA value equals 2T1. Therefore, the guard period required at the IAB node (100) in switching from DL-Rx to UL-Tx is Ts+2T1.

TABLE 9

Guard period required in switching from one configuration to another in an IAB node (100)

| Switching from configuration | Switching to configuration | Guard requirement |
|---|---|---|
| BH DL Rx | BH DL Rx | 0 |
|  | BH UL Tx | $T_s$ + TA |
|  | C DL Tx | $T_s$ + $T_1$ |
|  | C UL Rx | Max [$T_1$ − $T_2$, 0] |
| BH UL Tx | BH DL Rx | Max [$T_s$ − TA, 0] |
|  | BH UL Tx | 0 |
|  | C DL Tx | Max [T1 − TA, 0] |
|  | C UL Rx | Max [$T_s$ − (TA − $T_1$ + T2), 0] |
| CDL Tx | BH DL Rx | Max [$T_s$ − $T_1$, 0] |
|  | BH UL Tx | TA − $T_1$ |
|  | C DL Tx | 0 |
|  | C UL Rx | Max [$T_s$ − $T_2$, 0] |
| CUL Rx | BH DL Rx | Max [$T_2$ − $T_1$, 0] |
|  | BH UL Tx | $T_s$ + TA − $T_1$ + T2 |
|  | C DL Tx | $T_s$ + T2 |
|  | C UL Rx | 0 |

In the Table. 9, the resource transition within MT or DU of an IAB node (100) is managed in semi-static resource allocation by configuring F symbols. For e.g., parent node (100b) configures F symbols between DL-Rx and UL-Tx symbols at MT of IAB node (100) to avoid overlap between configurations. Similarly, CU configures F symbols between DL-Tx and UL-Rx symbols at DU of IAB node (100). However, for transition between MT and DU of an IAB node (100), either MT or DU should leave guard symbols. But, DU of an IAB node (100) configuring guard symbols affects other IAB nodes (100) and access UEs connected to it. For e.g., certain symbols of the DL-Tx slot of DU of IAB node (100) may be configured for Tx of SSBs, and therefore configuring those symbols as guard affects the UEs trying to attach with the IAB node (100). Therefore, guard symbols are configured at MT of the IAB node (100) to avoid overlap between slots. However, the resource configuration for MT of the IAB node (100) is given by the parent node (100b). Therefore, parent node (100b) should be aware of the timing mismatch at the IAB node (100), for configuring slot formats for the MT with enough guard symbols at appropriate time instances. Again, based on Table. 9, the guard period required in switching from one configuration to another depends on at least one of the following factors,
  i. Propagation delay between IAB node (100) and its parent node (100b).
  ii. Propagation delay between IAB node (100) and its child node (100c).
  iii. Capability of the IAB node (100), its parent node (100b), and its child node (100c).
  iv. Tx-Rx switching time required at the IAB node (100).
  v. Numerology used for communication.

Therefore, to leave certain symbols as guard at MT of an IAB node (100), the parent node (100b) should be informed about these factors.

Consider the scenario in which DU of an IAB node (100) is configured as UL-Rx, then the timing UL-Rx slot exactly matches with DL-Tx slot, if the child node (100c) has TDM/SRxDM capability. However, the UL-Rx is delayed by time T2 from DL-Tx, when child node (100c) has STxDM capability. Therefore, the guard symbols needed at the MT of the IAB node (100) depends on the timing of UL-Rx at IAB node (100), which depends on the capability of the child node (100c). To configure guard symbols efficiently, the parent node (100b) should be aware of the timing of the UL-Rx at DU of the IAB node (100). Therefore, IAB node (100) should inform parent node (100b) about the timing of UL-Rx slot or the capability of child node (100c).

In an embodiment, a parent node (100b) schedules the MT of an associated IAB node (100) with guard symbols based on at least one of,
  i. Configurations of DU of associated IAB node (100) in current previous and upcoming slots.
  ii. Propagation delay between parent node (100b) and associated IAB node (100).
  iii. Propagation delay between associated IAB node (100) and its child node (100c).
  iv. Capability of the parent node (100b), associated IAB node (100) and its child node (100c).
  v. Tx-Rx switching time required at the associated IAB node (100).
  vi. Numerology used for communication in backhaul and child/access links of the associated IAB node (100).

In another embodiment, the IAB node (100) informs its parent node (100b) explicitly through RRC signalling at least one of the numerology used for communication in its child link, the semi-static and dynamic resource configuration of DU of the IAB node (100), H/S flavor of the DU resource, the Tx-Rx switching time required at the IAB node (100), and the capability of IAB node (100) and its child node (100c).

Figure 24:
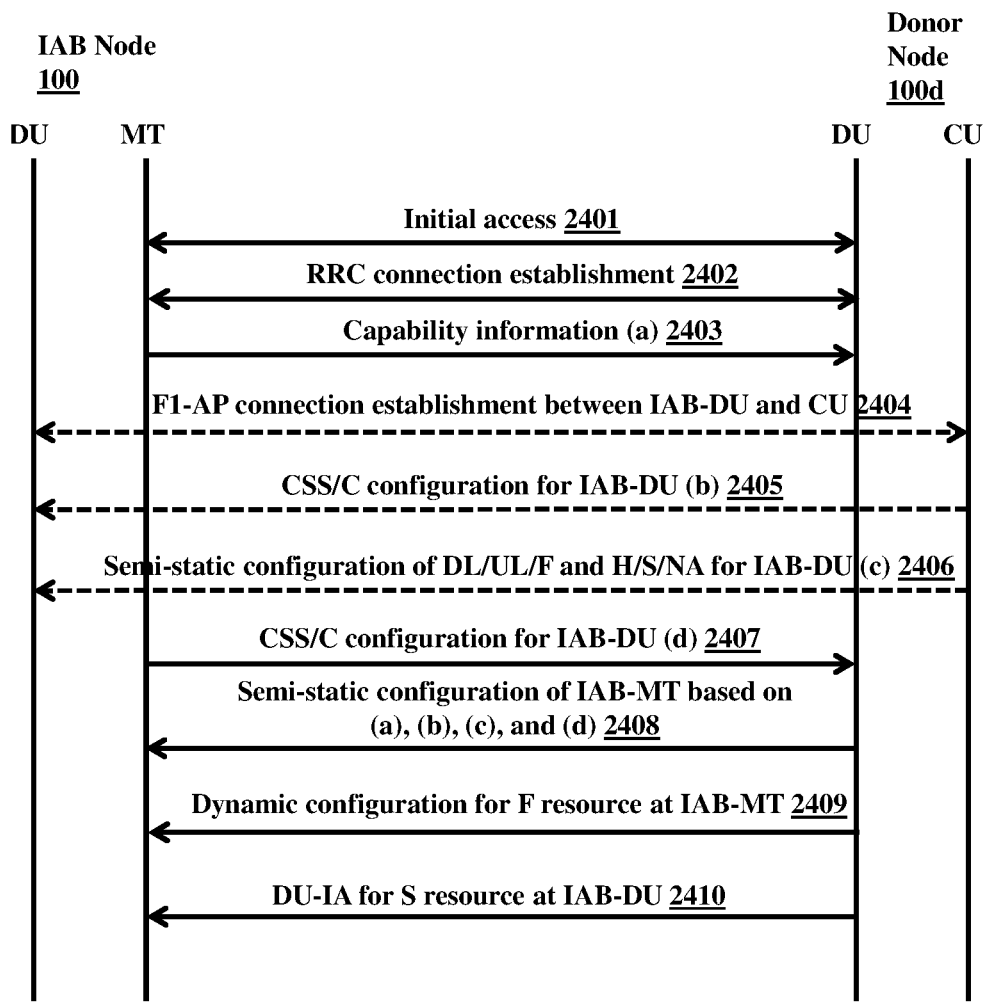
FIG. 24 illustrates a sequence diagram for newly introduced IAB node is connected to a donor node in the IAB network, according to an embodiment as disclosed herein.

FIG. 24 illustrates a sequence diagram for newly introduced IAB node (100) is connected to donor node (100d), according to an embodiment as disclosed herein.

The basic steps involved in introducing a new IAB node (100) to a network (1000) is explained. Several information exchanges are required between donor node (100d), parent node (100b) and newly introduced IAB node (100), before the newly introduced IAB node (100) become active.

Donor node (100d) act as parent node (100b) for the newly introduced IAB node (100): in this scenario, newly introduced IAB node (100) is associated with the donor node (100d). FIG. 24 illustrate various signaling required when a newly introduced IAB node (100) is associated with the donor node (100d) and are briefly explained. At step 2401-2402, initial access and RRC connection establishment, IAB node (100) synchronizes with the donor node (100d) using the relevant synchronization signals, receive necessary system information for communication and request connection through random access channel (RACH). Donor node (100d) provides RRC connection setup.

At step 2403, capability information, IAB node (100) informs the donor node (100d) about its capabilities, including the capable multiplexing scheme used to multiplex resource between backhaul and access links (TDM/FDM/SDM), switching time between transmission and reception, guard period required in switching between its MT and DU. The donor node (100d) responds with the number of guard symbols provided for each MT-DU switching at the IAB node (100).

At step 2404-2405, F1-AP connection establishment and CSSC configuration, a link is established between DU of IAB node (100) and CU of donor node (100d), and CU of the donor node (100d) configure certain cell specific signals and channels (CSSC) for DU of the IAB node (100). Here, CSSC refers to some high priority signal Tx/Rx essential at DU of IAB node (100) to serve child nodes (100c) and access UEs.

At step 2406, semi-static configuration of resources, CU of the donor node (100d) periodically configure resources for DU of the IAB node (100). CU signals the number of slots and symbols, the DU is configured as DL and UL, and DU will be configured as F in the remaining slots and symbols. CU also signals the DL/UL/F resource in a slot as either one of H/S/NA.

At step 2407, CSSC information, in addition to the CSSC signals configured by donor node (100d) in step c, DU of the IAB node (100) themselves configure certain CSSC signals, essential for establishing communication in child/access link. In case of IAB node (100) with TDM capability, the MT of the IAB node (100) should not be configured in those resources. Hence, MT of IAB node (100) informs the parent node (100b) about the configuration of CSSC at the DU of the IAB node (100).

At step 2408, semi-static configuration for MT of IAB node (100), based on the capability of the IAB node (100), and semi-static configuration of resources and CSSC at DU of the IAB node (100), donor node (100d) signals the number of slots and symbols the MT of IAB node (100) is configured as DL and UL. The remaining slots and symbols of MT of IAB node (100) will be configured as F.

At step 2409, dynamic configuration for MT of IAB node (100), donor node (100d) dynamically signals slot formats in DCI that configures the F resources at MT of the IAB node (100) as either DL/UL/F.

At step 2410, indication of availability for soft resource, if donor node (100d) is not scheduling any Tx/Rx in MT of the IAB node (100), donor signals indication of availability (IA) for DU of the IAB node (100), so that DU of the IAB node (100) can use the resource for Tx/Rx in its child/access link.

Figure 25:
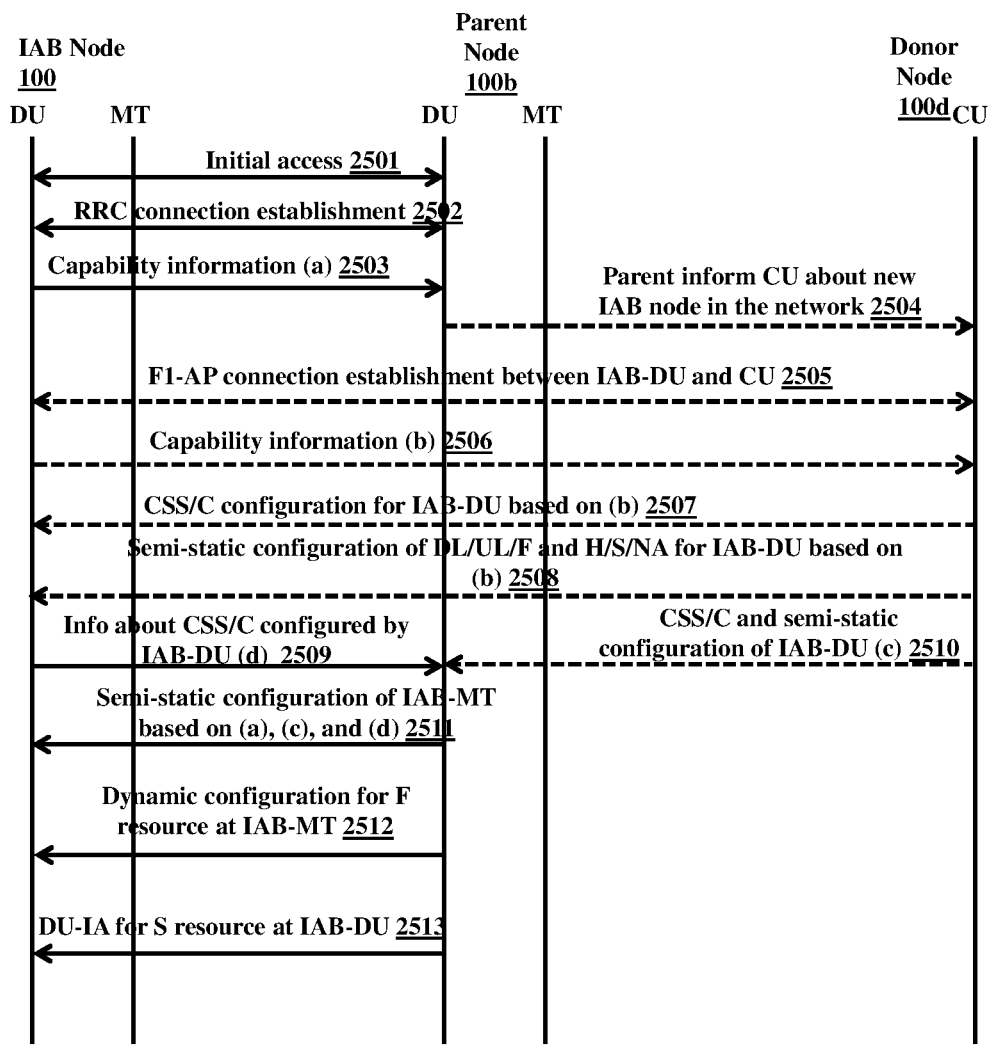
FIG. 25 illustrates a sequence diagram for newly introduced IAB node is connected to another IAB node in the IAB network, according to an embodiment as disclosed herein.

FIG. 25 illustrates a sequence diagram for newly introduced IAB node (100) is connected to another IAB node (100) in the network (1000), according to an embodiment as disclosed herein.

Another IAB node (100) in the network (1000) act as parent node (100b) for the newly introduced node, newly introduced IAB node (100) is associated with another IAB node (100) in the network (1000), leading to multi-hop scenario. Resource allocation and control signaling for MT and DU of the newly introduced IAB node (100) is done by parent node (100b) and donor node (100d), respectively. Therefore, proper exchange of information is essential between IAB node (100), its parent node (100b), and donor node (100d). FIG. 25 illustrates various signaling required when a newly introduced IAB node (100) is associated with another IAB node (100) (parent node (100b)) in the network (1000) and are briefly explained.

At step 2501-2502, initial access and RRC connection establishment, IAB node (100) finds parent node (100b) to associate, receive necessary system information for communication and request connection through random access channel (RACH). Parent node (100b) provides RRC connection setup and.

At step 2503, capability information to parent node (100b), IAB node (100) informs the parent node (100b) about its capabilities, including scheme used to multiplex resource between backhaul and access links, switching time between transmission and reception, guard period required in switching between its MT and DU. The parent node (100b) responds with the number of guard symbols provided for each MT-DU switching at the IAB node (100).

At step 2504, indication of new IAB node (100) in the network (1000) to donor (100d), parent node (100b) informs CU about the IAB node (100) and its capabilities. At step 2505-2506, F1-AP connection establishment and capability information, after receiving intimation about the IAB node (100), CU of the donor node (100d) start F1-AP connection establishment procedure to communicate with DU of IAB node (100). IAB node (100) informs CU about its capabilities.

At step 2507-2508, CSSC configuration and semi-static configuration of resources, once F1-AP link between CU and DU of IAB node (100) is established, CU of the donor node (100*d*) configure certain cell specific signal and channel (CSSC) for DU of the IAB node (100). Also, CU periodically configure resources for DU of the IAB node (100). CU signals the number of slots and symbols, the DU is configured as DL and UL. The DU will be configured as F in the remaining slots and symbols. CU also signals the DL/UL/F resource in a slot as either one of H/S/NA.

At 2509-2510, informing configuration of IAB-DU, after configuring CSSC and resources for DU of the IAB node (100), CU shares the configuration information with DU of the parent node (100*b*). Further, IAB node (100) informs parent node (100*b*) about the CSSC signals configured internally.

At 2511, semi-static configuration for MT of IAB node (100), based on the capability of the IAB node (100), and semi-static configuration of resources and CSSC at DU of the IAB node (100), parent node (100*b*) signals the number of slots and symbols configured as DL/UL at MT of IAB node (100). The remaining slots and symbols at MT of IAB node (100) is configured as F.

At 2512, dynamic configuration for MT of IAB node (100), parent node (100*b*) dynamically signals slot formats in DCI, that configures the F resources at MT of the IAB node (100) as either DL/UL/F.

At 2513, indication of availability for soft resource, if parent node (100*b*) is not scheduling any Tx/Rx in MT of the IAB node (100), parent node (100*b*) signals indication of availability (IA) for DU of the IAB node (100), so that DU of the IAB node (100) can use the resource for Tx/Rx in its child/access link.

Figure 26:
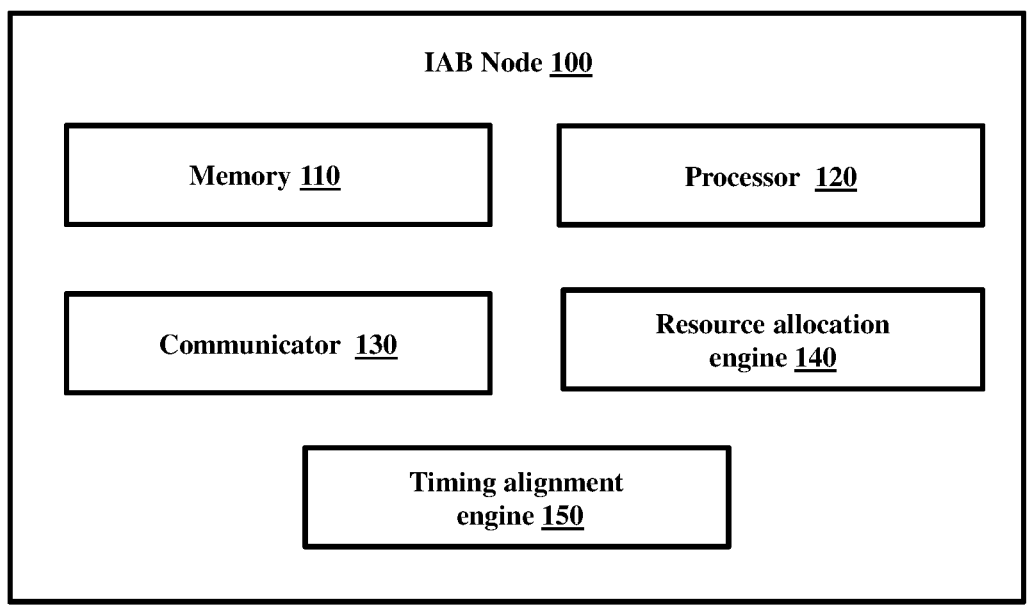
FIG. 26 is a block diagram of the IAB node for resource allocation, timing alignment in the IAB network, according to an embodiment as disclosed herein.

FIG. 26 is a block diagram of the IAB node (100) for resource allocation, timing alignment in the IAB network (1000), according to an embodiment as disclosed herein. The IAB node (100) includes a memory (110), a processor (120), a communicator (130), a resource allocation engine (140), and a timing alignment engine (150).

The memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). In an embodiment, the memory (110) can be an internal storage unit or it can be an external storage unit of the IAB node (100), cloud storage, or any other type of external storage.

The processor (120) is communicated with the memory (110), the resource allocation engine (140), and the timing alignment engine (150). Further, the processor (120) is configured to execute instructions stored in the memory (110) and to perform various processes.

The communicator (130) is configured for communicating internally between internal hardware components and with external devices via one or more networks.

The resource allocation engine (140) is configured to establish a connection with a distributed unit (DU) of a plurality of IAB nodes (100) in the IAB network (1000), where the plurality of IAB nodes (100) comprises a reference node (100*a*), at least one parent node (100*b*), and at least one child node (100*c*). Further, the resource allocation engine (140) is configured to receive at least one parameter associated with each of the IAB nodes (100) from each of the IAB nodes (100). Further, the resource allocation engine (140) is configured to determine resources to be allocated to the DU of each of the IAB nodes (100) based on at least one resource allocation criteria and the at least one parameter, where the resources comprise at least one of a downlink (DL) resource, a uplink (UL) resource and a flexible (F) resource. Further, the resource allocation engine (140) is configured to indicate the resources for the DU of each of the IAB nodes (100) based on the at least one parameter.

The timing alignment engine (150) is configured to signal a timing advance (TA) value to at least one child node (100*c*) of the at least reference node (100*a*) based on a plurality of parameters associated with the at least child node (100*c*). Further, the timing alignment engine (150) is configured to evaluate at least one of a UL-Tx timing and a DL-Tx timing based on the TA value signaled by the at least one reference node (100*a*). Further, the timing alignment engine (150) is configure to detect the reference node (100*a*) is connected with the at least one parent node (100*b*) with varying capability. Further, the timing alignment engine (150) is configure to schedule UL grant to the reference node (100*a*) in non-overlapping time slots. Further, the timing alignment engine (150) is configure to transmit UL transmission to the at least one parent node (100*b*) in the non-overlapping time slots.

Further, the timing alignment engine (150) is configured a first resource configuration for a DU of a reference node (100*a*). Further, the timing alignment engine (150) is configured a second resource configuration for a MT of a reference node (100*a*). Further, the timing alignment engine (150) is configure to detect a transition between the MT and the DU across time slots at the reference node (100*a*). Further, the timing alignment engine (150) is configure to evaluate a required guard period for the transition. Further, the timing alignment engine (150) is configure to signal the required guard period to the at least one parent node (100*b*). Further, the timing alignment engine (150) is configured guard symbols based on the required guard period for transmission or reception at the MT of the reference node (100*a*) at start or end of the time slots.

Although the FIG. 26 shows various hardware components of the IAB node (100) but it is to be understood that other embodiments are not limited thereon. In other embodiments, the IAB node (100) may include less or more number of components. Further, the labels or names of the components are used only for illustrative purpose and does not limit the scope of the invention. One or more components can be combined together to perform same or substantially similar function to resource allocation and timing alignment in the IAB network (1000) by the IAB node (100).

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for resource allocation in an Integrated Access Backhaul (IAB) network, comprising:
    signalling, by a Distributed Unit (DU) of at least one IAB node, multiplexing capability between the DU of the at least one IAB node and a Mobile Terminal (MT) of the at least one IAB node to a Central unit (CU) of a donor node, wherein the multiplexing capability comprises: duplexing constraint between the MT of the at least one IAB node and the DU of the at least one IAB node, whether the at least one IAB-node supports simultaneous reception at the DU and the MT (SRxDM), and whether the at least one IAB-node supports simultaneous transmission at the DU and the MT (STxDM);
    receiving, by the at least one IAB node, at least one resource configuration;
    wherein the at least one resource configuration comprising of at least one of at least one downlink (DL) resource, at least one uplink (UL) resource and at least one flexible (F) resource; and
    performing, by the at least one IAB node, at least one operation based on at least one of the at least one resource configuration and the multiplexing capability.

2. The method as claimed in claim 1, comprises establishing by the DU of the at least one IAB node a connection with the CU of the donor node.

3. The method as claimed in claim 1, receiving the at least one resource configuration comprising:
    receiving by the DU of the at least one IAB node a first resource configuration for the DU of the at least one IAB node from the CU of the donor node; and
    receiving, by the MT of the at least one IAB node, a second resource configuration for the MT of the at least one IAB node from the DU of the at least one parent node of the at least one IAB node.

4. The method as claimed in claim 1, wherein the multiplexing capability further comprises at least one of:
    a. an indication of whether the at least one IAB-node supports simultaneous transmission at the DU and reception at the MT of the at least one IAB-node; and
    b. an indication of whether the at least one IAB-node supports simultaneous reception at the DU and transmission at the MT of the at least one IAB-node.

5. The method as claimed in claim 1, wherein the multiplexing capability comprises an indication of whether the at least one IAB-node supports one of space division multiplexing (SDM), frequency division multiplexing (FDM), code division multiplexing (CDM), time division multiplexing (TDM) and frequency division multiplexing (FDM).

6. The method as claimed in claim 1, wherein the signalling further comprises signalling at least one of a numerology followed in the DU of the at least one IAB node, a numerology followed in the MT of the at least one IAB node, a traffic load at the at least one IAB node, and an interference level at the at least one IAB node.

7. The method as claimed in claim 1, wherein
    a. the at least one DL resource is at least one of the at least one hard (H) resource, the at least one soft (S) resource, and the at least one not available (NA) resource,
    b. the at least one UL resource is at least one of the at least one H resource, the at least one S resource, and the at least one NA resource, and
    c. the at least one F resource is at least one of the at least one H resource, the at least one S resource, and the at least one NA resource.

8. The method as claimed in claim 1, wherein performing comprises:
    a. receiving, by the MT of the at least one IAB node, an indication of availability (IA) for the S resource, and
    b. performing, by the DU of the at least one IAB node, one of transmission and reception in the S resource.

9. The method as claimed in claim 1, wherein the MT of the at least one IAB node is co-located with the DU of the at least one IAB node.

10. The method as claimed in claim 8, wherein receiving the IA using a downlink control information (DCI) format.

11. The method as claimed in claim 10, wherein the DCI format comprises at least one index from a plurality of indices configured in a Radio Resource Control (RRC) message.

12. The method as claimed in claim 10, wherein the DCI format comprises at least one availability index, and wherein the availability index indicate availability of at least one of the DL resource, the UL resource and the F resource in a slot.

13. The method as claimed in claim 8, wherein the IA is based on timing of the at least one resource configuration of the DU of the at least one IAB node.

14. The method as claimed in claim 8, wherein the IA is independent of the at least one resource configuration of the MT of the at least one IAB node and overrides the at least one resource configuration of the MT of the at least one IAB node.

15. The method as claimed in claim 8, wherein one of transmission and reception is non-slot based.

16. The method as claimed in claim 8, wherein the IA indicate availability of the S resource for a set of resources.

17. The method as claimed in claim 16, wherein the set of resources is one of a fixed value and a configured value, and wherein the configured value is indicated using at least one of semi-static and dynamic signalling.

18. The method as claimed in claim 1, wherein performing:
    a. determining, by the at least one IAB node, implicit availability of the S resource based on a condition; and
    b. performing, by the DU of the at least one IAB node, one of transmission and reception in the S resource.

19. The method as claimed in claim 18, wherein the condition comprises at least one of:
    a. no transmission or reception at the MT of the at least one IAB node in the S resource, and
    b. lack of scheduling at the MT of the at least one IAB node in the S resource.

20. The method as claimed in claim 1, wherein performing comprising:
    a. performing, by the DU of the at least one IAB node, one of transmission and reception in a hard resource; and
    b. skipping, by the DU of the at least one IAB node, at least one of transmission and reception in a NA resource.

21. The method as claimed in claim 1, wherein performing comprises:
- receiving, by the DU of the at least one IAB node, configuration for one of transmission and reception of at least one cell-specific signal and channel (CSSC) in at least one resource; and
- performing, by the DU of the at least one IAB node, one of transmission and reception of at least one CSSC in the at least one resource.

22. The method as claimed in claim 21, wherein the CSSC is at least one of:
  i. synchronization signal blocks (SSB) including both cell-defining SSB (CD-SSB) and non-CD-SSB;
  ii. random access channel (RACH);
  iii. periodic Channel State Information Reference Signal (CSI-RS); and
  iv. scheduling request (SR).

23. The method as claimed in claim 21, wherein the performing is irrespective of at least one of:
- the at least one resource is configured as one of the H resource, the S resource and a NA resource; and
- the configuration of the at least one resource at the MT of the at least one IAB node.

24. The method as claimed in claim 21, further comprises dropping one of transmission and reception at the MT of the at least one IAB node in the at least one resource.

25. The method as claimed in claim 24, further comprises indicating by the at least one IAB node about dropping to at least one parent node.

26. The method as claimed in claim 24, wherein dropping is when resource configuration for at least one resource at the MT and the DU of the at least one IAB node is conflicting with multiplexing capability of the at least one IAB node.

27. The method as claimed in claim 24, wherein dropping is when one of:
  a. the at least one IAB node is not capable of simultaneous operation at the DU and the MT of the at least one IAB node, and the MT is configured to one of transmit and receive at least one signal in the at least one resource;
  b. the at least one IAB node is not capable of simultaneous reception at the DU and the MT of the at least one IAB-node, and the MT is configured to receive at least one signal in the at least one resource and the DU is configured to receive at least one CSSC in the at least one resource;
  c. the at least one IAB node is not capable of simultaneous transmission at the DU and the MT of the at least one IAB node, and the MT is configured to transmit at least one signal in the at least one resource and the DU is configured to transmit at least one CSSC in the at least one resource;
  d. the at least one IAB node is not capable of simultaneous transmission at the DU of the at least one IAB node and reception at the MT of the at least one IAB node, and the MT is configured to receive at least one signal in the at least one resource and the DU is configured to transmit at least one CSSC in the at least one resource; and
  e. the at least one IAB node is not capable of simultaneous reception at the DU and transmission at the MT, and the MT is configured to transmit at least one signal in the at least one resource and the DU is configured to receive at least one CSSC in the at least one resource.

28. The method as claimed in claim 1, wherein the at least one resource configuration is based on a reference numerology, and wherein the reference numerology is lowest among all configured numerologies of at least one of a first carrier frequency range and a second carrier frequency range in the at least one IAB node.

29. The method as claimed in claim 1, further comprises activating by the at least one IAB node a mode of operation in at least one resource, wherein the mode of operation is one of full duplex (FD) mode, a simultaneous transmission from the DU and a MT (STxDM) mode, a simultaneous Rx at the DU and a MT (SRxDM) mode, and a TDM mode.

30. The method as claimed in claim 29, wherein the activation is based on at least one of:
  a. an indication from at least one of the CU of the donor node and the DU of the at least one parent node,
  b. the interference level at least one IAB node,
  c. the capability of at least one of at least one IAB node and the at least one parent node; and
  d. the at least one resource configuration of at least one IAB node.

31. The method as claimed in claim 29, wherein the FD mode is activated when at least one of:
  a. the at least one IAB node is capable of full duplex operation,
  b. a resource is configured for transmission at the DU of the at least one IAB node and the resource is configured for reception at the MT of the at least one IAB node
  c. a resource is configured for reception at the DU of the at least one IAB node and the resource is configured for transmission at the MT of the at least one IAB node
  d. a resource is configured for simultaneously transmitting and receiving at the DU of the at least one IAB node; and
  e. a resource is configured for simultaneously transmitting and receiving at the MT of the at least one IAB node.

32. The method as claimed in claim 29, wherein the STxDM mode is activated when
  a. at least one IAB node is capable of transmitting simultaneously from the MT and the DU; and
  b. a resource is configured for transmission at the MT and the DU of the at least one IAB node.

33. The method as claimed in claim 29, wherein the SRxDM mode is activated when:
  a. the at least one IAB node is capable of receiving simultaneously from the MT and the DU of the at least one IAB node; and
  b. a resource is configured for reception at the MT and the DU of the at least one IAB node.

34. The method as claimed in claim 29, wherein the TDM mode is activated when at least one of:
  a. a resource is configured for one of transmission and reception at one of the MT and the DU of the at least one IAB node;
  b. determining, by the at least one IAB node, a conflict between the at least one resource configuration for at least one resource and the capability of the at least one IAB node; and
  c. the interference at one of the MT and the DU of the at least one IAB node is above certain threshold, wherein the threshold is at least one of a fixed value and a configured value.

35. The method as claimed in claim 34, comprises:
  a. prioritizing the at least one resource configuration for the MT of the at least one IAB node over the at least one resource configuration for the DU in the at least one resource; and
  b. performing one of transmission and reception at the MT of the at least one IAB node in the at least one resource according to the at least one resource configuration.

36. The method as claimed in claim 34, further comprises
   a. prioritizing the at least one resource configuration for the DU of the at least one IAB node over the at least one resource configuration for the MT in the at least one resource; and
   b. performing one of transmission and reception at the DU of the at least one IAB node in the at least one resource according to the resource configuration.

37. The method as claimed in claim 1, wherein when the at least one IAB node is capable of at least one of STxDM, SRxDM and FD, performing comprises:
   determining at least one time resource is configured as one of the S resource and a NA resource;
   treating the at least one time resource as the H resource; and
   performing one of transmission and reception in at least one time resource.

38. The method as claimed in claim 1, wherein the at least one operation is one of transmission and reception.

39. The method as claimed in claim 16, wherein the set of resources is based on a numerology of at least one of the MT of the at least one IAB node and the DU of the at least one IAB node.

40. A system for resource allocation in an Integrated Access Backhaul (IAB) network comprising at least one IAB node, comprising:
   a memory;
   a processor that:
   receives by a Distributed Unit (DU) of the at least one IAB node at least one parameter, wherein the at least one parameter comprises at least one of a resource configuration for the DU of the at least one IAB node, a resource configuration of the DU of at least one child node, and capability of the at least one child node; and
   schedules, by the DU of the at least one IAB node, the at least one child node based on the at least one parameter, wherein scheduling comprises signalling indication of availability (IA) for at least one resource to a MT of the at least one child node,
   wherein signalling is in a resource configured as one of:
      H and DL by the resource configuration for DU of the at least one IAB node; and
      DL and S by the resource configuration for DU of the at least one IAB node and an IA signal is received by the at least one IAB node.

41. A method for resource allocation in an Integrated Access Backhaul (IAB) network, wherein the method comprises:
   receiving, by a Distributed Unit (DU) of the at least one IAB node, at least one parameter, wherein the at least one parameter comprises at least one of a resource configuration for the DU of the at least one IAB node, a resource configuration of the DU of at least one child node and capability of the at least one child node; and
   scheduling, by the DU of the at least one IAB node, the at least one child node based on the at least one parameter, wherein scheduling comprises signalling indication of availability (IA) for at least one resource to a MT of the at least one child node,
   wherein signalling is in a resource configured as one of:
      H and DL by the resource configuration for DU of the at least one IAB node; and
      DL and S by the resource configuration for DU of the at least one IAB node and an IA signal is received by the at least one IAB node.

42. The method as claimed in claim 41, wherein the resource configuration for the DU of the at least one IAB node comprising at least one of at least one downlink (DL) resource, at least one uplink (UL) resource, at least one flexible (F) resource, at least one hard (H) resource, at least one soft (S) resource, and at least one not available (NA) resource.

43. The method as claimed in claim 41, wherein the resource configuration of the at least one child node comprises at least one of:
   the H resource and a direction of the H resource at the DU of the at least one child node,
   the S resource and a direction of the S resource at the DU of the at least one child node,
   NA resource at the DU of the at least one child node (100c); and
   configuration of cell specific signal and channel (CSSC) at the DU of the at least one child node (100c).

44. The method as claimed in claim 41, receiving is from at least one of the CU of a donor node and at least one child node.

45. The method as claimed in claim 41, wherein scheduling comprises:
   determining at least one resource is configured as H at the DU of the at least one child node; and
   disabling communication with a MT of the at least one child node in the at least one resource.

46. The method as claimed in claim 41, wherein the scheduling comprises:
   determining at least one resource is configured as one of S resource and NA resource at the DU of the at least one child node;
   configuring the at least one resource for at least one of transmission and reception at a MT of the at least one child node; and
   performing at least one of transmission and reception in the at least one resource with the MT of the at least one child node based on the configuration.

47. The method as claimed in claim 41, wherein the scheduling comprises:
   a. determining at least one resource is configured for one of transmission and reception of CSSC at the DU of the at least one child node, and
   b. disabling communication with a MT of the at least one child node in the at least one resource.

48. The method as claimed in claim 41, wherein the CSSC is at least one of:
   a. synchronization signal blocks (SSB) including both cell-defining SSB (CD-SSB) and non-CD-SSB,
   b. random access channel (RACH),
   c. periodic Channel State Information Reference Signal (CSI-RS), and
   d. scheduling request (SR).

49. The method as claimed in claim 41, wherein the signalling is when at least one of:
   a. determining that the at least one resource is configured as S at the DU of the at least one child node,
   b. the at least one IAB node is not communicating with the MT of the at least one child node in at least one resource, and
   c. performing one of transmission and reception in the at least one resource at the DU of the at least one child node is not impacting the communication with the MT of the at least child node.

50. The method as claimed in claim 41, wherein signalling is using a DCI format.

51. The method as claimed in claim 50, wherein the DCI format comprises at least one index from a plurality of indices configured in a Radio Resource Control (RRC) message.

52. The method as claimed in claim 50, wherein the DCI format comprises at least one availability index, wherein the availability index indicate availability of at least one of DL resource, UL resource and F resource in a slot.

53. The method as claimed in claim 41, wherein the IA is based on timing of the resource configuration of the DU of the at least one child node.

54. The method as claimed in claim 41 wherein the scheduling further comprises:
   a. determining at least one resource is configured as one of H and NA at the DU of the at least one child node, and
   b. skipping signalling of indication of availability (IA) for the at least one resource.

55. The method as claimed in claim 41, wherein the capability of the at least one child node comprise at least one of:
   a. duplexing constraint between a MT of the at least one child node and the DU of the at least one child node,
   b. an indication of whether the at least one child node supports simultaneous reception at the DU and the MT,
   c. an indication of whether the at least one child node supports simultaneous transmission at the DU and the MT,
   d. an indication of whether the at least one child node supports simultaneous transmission at the DU and reception at the MT,
   e. an indication of whether the at least one child node supports simultaneous reception at the DU and transmission at the MT, and
   f. an indication of whether the at least one child node supports one of space division multiplexing (SDM), frequency division multiplexing (FDM), code division multiplexing (CDM), and time division multiplexing (TDM) between the MT and the DU.

56. The method as claimed in claim 55, wherein when at least one child node is capable of simultaneous transmission the scheduling comprises:
   a) determining at least one resource is configured as DL at the DU of the at least one child node,
   b) scheduling the at least one resource at the MT of the at least one child node as UL, and
   receiving at least one signal from the MT of at least one child node in the at least one resource.

57. The method as claimed in claim 55, wherein when at least one child node is capable of simultaneous reception the scheduling comprising:
   determining at least one resource is configured as UL at the DU of the at least one child node,
   scheduling the at least one resource at the MT of the at least one child node as DL; and
   transmitting at least one signal to the MT of the at least one child node in the at least one resource.

58. The method as claimed in claim 57, wherein the MT of the at least one child node is co-located with the DU of the at least one child node.

59. The method as claimed in claim 41, wherein the scheduling comprises:
   a. determining at least one resource is configured for one of transmission and reception of a Cell-Specific Signal and Channel (CSSC) at the DU of the at least one child node, and
   b. skipping scheduling the MT of the at least one child node in the at least one resource.

60. A system for resource allocation in an Integrated Access Backhaul (IAB) network comprising at least one IAB node, comprising:
   a memory;
   a processor that:
   signals by a Distributed Unit (DU) of the at least one IAB node multiplexing capability between the DU of the at least one IAB node and a Mobile Terminal (MT) of the at least one IAB node to a Central Unit (CU) of a donor node, wherein the multiplexing capability comprises:
      duplexing constraint between the MT of the at least one IAB node and the DU of the at least one IAB node,
      whether the at least one IAB-node supports simultaneous reception at the DU and the MT (SRxDM), and
      whether the at least one IAB-node supports simultaneous transmission at the DU and the MT (STxDM);
   receives by the at least one IAB node at least one resource configuration, wherein the resources configuration comprising of at least one of at least one downlink (DL) resource, at least one uplink (UL) resource and at least one flexible (F) resource; and
   performs by the at least one IAB node at least one operation based on the at least one resource configuration and the multiplexing capability.

61. A method for resource allocation in an Integrated Access Backhaul network comprising:
   receiving, by a CU of a donor node, multiplexing capability between a DU of at least one IAB node and a MT of the at least one IAB node, wherein the multiplexing capability comprises:
      duplexing constraint between the MT of the at least one IAB node and the DU of the at least one IAB node,
      whether the at least one IAB-node supports simultaneous reception at the DU and the MT of the at least one IAB-node, and
      whether the at least one IAB-node supports simultaneous transmission at the DU and the MT of the at least one IAB-node;
   determining, by the CU of the donor node, a resource configuration for the DU of the at least one IAB node, wherein the resource configuration comprising at least one of at least one downlink (DL) resource, at least one uplink (UL) resource, at least one flexible (F) resource, at least one hard (H) resource, at least one soft (S) resource, and at least one not available (NA) resource; and
   signaling, by the CU of the donor node, the resource configuration to the at least one IAB node.

62. The method as claimed in claim 61, wherein the MT of the at least one IAB node is co-located with the DU of the at least one IAB node.

63. The method as claimed in claim 61, further comprises establishing by CU of the donor node a connection with the at least one IAB node.

64. The method as claimed in claim 61, wherein the multiplexing capability comprise at least one of:
   a. an indication of whether the at least one IAB-node supports simultaneous transmission at the DU and reception at the MT of the at least one IAB-node, and
   b. an indication of whether the at least one IAB-node supports simultaneous reception at the DU and transmission at the MT of the at least one IAB-node.

65. The method as claimed in claim 61, wherein the multiplexing capability comprises an indication of whether the at least one IAB-node supports one of space division multiplexing (SDM), frequency division multiplexing (FDM), code division multiplexing (CDM), time division multiplexing (TDM) and frequency division multiplexing (FDM).

66. The method as claimed in claim 61, wherein determining is based on a reference numerology, and wherein the reference numerology corresponds to a lowest among all configured numerologies of at least one of a first carrier frequency range and a second carrier frequency range in the at least one IAB node.

67. The method as claimed in claim 61, wherein determining is based on at least one of:
   a. the multiplexing capability of the at least one IAB node
   b. a resource allocation criteria,
   c. a numerology followed in at least one of the DU and the MT of the at least one IAB node,
   d. multiplexing capability of at least one parent node of the at least one IAB node,
   e. resource configuration of at least one parent node of the at least one IAB node,
   f. a traffic load at the at least one IAB node; and
   g. an interference level at the at least one IAB node.

68. The method as claimed in claim 67, wherein the resource allocation criteria comprise at least one of a conflict avoidance criteria, a resource wastage avoidance criteria, an energy efficient criteria, and a latency reduction criteria.

69. The method as claimed in claim 68, wherein the conflict avoidance criteria comprises determining at least one resource at the DU of the at least one IAB node as one of the S resource and NA resource, when the at least one resource is the H resource at the DU of the at least one parent node.

70. The method as claimed in claim 68, wherein the resource wastage avoidance criteria and latency reduction criteria comprise at least one of:
   a. determining at least one resource at the DU of the at least one IAB node as NA resource, when the at least one resource is S resource at the DU of the at least one parent node;
   b. determining at least one resource at the DU of the at least one IAB node as H resource, when the at least one resource is NA resource at the DU of the at least one parent node;
   c. determining at least one resource at the DU of the at least one IAB node as NA resource, when the at least one resource is configured for one of transmission and reception of CSSC the DU of the at least one parent node;
   d. activating simultaneous transmission capability in at least one IAB node in at least one resource when the at least one parent node is in simultaneous reception mode in at least one resource; and
   e. activating simultaneous reception capability in at least one IAB node in at least one resource when the at least one parent node is in simultaneous transmission mode in at least one resource.

71. The method as claimed in claim 68, wherein the energy efficient criteria comprises determining at least one resource as F at MT of at least one IAB node when the at least one resource is configured as one of S resource and NA resource at the DU of the at least one parent node.

72. The method as claimed in claim 61, wherein determining is based on mode of operation of the at least one IAB node in at least one time resource.

73. The method as claimed in claim 72, comprises determining at least one frequency resource as one of the H resource, the S resource and the NA resource, when at least one of:
   a. a mode of operation of the at least one IAB node is one of STxDM mode and the SRxDM mode, and
   b. multiplexing capability of at least one IAB node is FDM.

74. The method as claimed in claim 72, wherein the mode of operation is one of full duplex (FD) mode, a simultaneous transmission from the DU and a MT (STxDM) mode, a simultaneous Rx at the DU and a MT (SRxDM) mode, and a TDM mode.

75. The method as claimed in claim 72, comprises determining at least one time resource as one of the H resource, the S resource and the NA resource, when mode of operation of the at least one IAB node is one of the TDM mode, the STxDM mode for which the half duplexing (HD) constraint is not met and the SRxDM mode for which the HD constraint is not met.

* * * * *